United States Patent
Rice

(10) Patent No.: US 12,534,540 B2
(45) Date of Patent: Jan. 27, 2026

(54) CYP1A1-TARGETED MONOCLONAL ANTIBODY WITH REACTIVITY ACROSS VERTEBRATE TAXA

(71) Applicant: Clemson University Research Foundation, Clemson, SC (US)

(72) Inventor: Charles David Rice, Clemson, SC (US)

(73) Assignee: Clemson University Research Foundation, Clemson, SC (US)

( * ) Notice: Subject to any disclaimer, the term of this patent is extended or adjusted under 35 U.S.C. 154(b) by 0 days.

(21) Appl. No.: 18/420,450

(22) Filed: Jan. 23, 2024

(65) Prior Publication Data

US 2024/0247077 A1 Jul. 25, 2024

Related U.S. Application Data

(60) Provisional application No. 63/481,128, filed on Jan. 23, 2023.

(51) Int. Cl.
| | | |
|---|---|---|
| *C07K 16/40* | (2006.01) | |
| *C07K 16/00* | (2006.01) | |
| *C07K 16/46* | (2006.01) | |
| *C12N 15/00* | (2006.01) | |
| *G01N 33/573* | (2006.01) | |
| *A61K 39/00* | (2006.01) | |
| *A61P 5/24* | (2006.01) | |
| *A61P 35/00* | (2006.01) | |

(52) U.S. Cl.
CPC .......... *C07K 16/40* (2013.01); *G01N 33/573* (2013.01); *A61K 2039/505* (2013.01); *A61P 5/24* (2018.01); *A61P 35/00* (2018.01); *C07K 16/00* (2013.01); *C07K 16/46* (2013.01); *C07K 2317/14* (2013.01); *C07K 2317/33* (2013.01); *C07K 2317/565* (2013.01); *C12N 15/00* (2013.01)

(58) Field of Classification Search
CPC ............... C07K 16/40; C07K 2317/14; C07K 2317/33; C07K 2317/565; G01N 33/573; A61K 2039/505; A61P 5/24; A61P 35/00
See application file for complete search history.

(56) References Cited

U.S. PATENT DOCUMENTS

| | | | |
|---|---|---|---|
| 4,474,893 A | 10/1984 | Reading | |
| 4,501,729 A | 2/1985 | Boucher et al. | |
| 4,676,980 A | 6/1987 | Segal et al. | |
| 4,816,567 A | 3/1989 | Cabilly et al. | |
| 5,459,127 A | 10/1995 | Felgner et al. | |
| 5,545,806 A | 8/1996 | Lonberg et al. | |
| 5,545,807 A | 8/1996 | Surani et al. | |
| 5,569,825 A | 10/1996 | Lonberg et al. | |
| 5,580,859 A | 12/1996 | Felgner et al. | |
| 5,589,466 A | 12/1996 | Felgner et al. | |
| 5,625,126 A | 4/1997 | Lonberg et al. | |
| 5,633,425 A | 5/1997 | Lonberg et al. | |
| 5,661,016 A | 8/1997 | Lonberg et al. | |
| 5,693,622 A | 12/1997 | Wolff et al. | |
| 8,187,601 B2 * | 5/2012 | Weng | A61P 35/00 424/139.1 |
| 8,858,949 B2 * | 10/2014 | Yokoseki | A61P 25/00 530/391.1 |
| 2013/0332133 A1 * | 12/2013 | Horn | G16B 50/00 703/11 |

FOREIGN PATENT DOCUMENTS

| | | |
|---|---|---|
| WO | 9518863 A1 | 7/1995 |
| WO | 9521931 A1 | 8/1995 |
| WO | 9617823 A1 | 6/1996 |
| WO | 9625508 A1 | 8/1996 |

OTHER PUBLICATIONS

Li CH, et al. beta-Endorphin omission analogs: dissociation of immunoreactivity from other biological activities. Proc Natl Acad Sci U S A. Jun. 1980;77(6):3211-4. doi: 10.1073/pnas.77.6.3211. PMID: 6251449; PMCID: PMC349584. (Year: 1980).*

Abaza MS, et al. Effects of amino acid substitutions outside an antigenic site on protein binding to monoclonal antibodies of predetermined specificity obtained by peptide immunization: demonstration with region 94-100 (antigenic site 3) of myoglobin. J Protein Chem. Oct. 1992;11(5):433-44. (Year: 1992).*

Colman PM. Effects of amino acid sequence changes on antibody-antigen interactions. Res Immunol. Jan. 1994;145(1):33-6. doi: 10.1016/s0923-2494(94)80039-1. PMID: 7516563. (Year: 1994).*

Brown M, et al. Tolerance of single, but not multiple, amino acid replacements in antibody VH CDR 2: a means of minimizing B cell wastage from somatic hypermutation? J Immunol. May 1, 1996;156(9):3285-91. PMID: 8617951. (Year: 1996).*

Rice CD, et al. Cross-reactivity of monoclonal antibodies against peptide 277-294 of rainbow trout CYP1A1 with hepatic CYP1A among fish. Mar Env Res. 46:1(5); 87-91. 1998. doi: 10.1016/S0141-1136(97)00122-0. (Year: 1998).*

Vajdos FF, et al. Comprehensive functional maps of the antigen-binding site of an anti-ErbB2 antibody obtained with shotgun scanning mutagenesis. J Mol Biol. Jul. 5, 2002;320(2):415-28. doi: 10.1016/S0022-2836(02)00264-4. PMID: 12079396. (Year: 2002).*

Trier NH, et al. Production and characterization of peptide antibodies. Methods. Feb. 2012;56(2):136-44. doi: 10.1016/j.ymeth.2011.12.001. Epub Dec. 8, 2011. PMID: 22178691. (Year: 2012).*

(Continued)

*Primary Examiner* — Chun W Dahle
*Assistant Examiner* — Alec Jon Peters
(74) *Attorney, Agent, or Firm* — Myers Bigel, P.A.

(57) ABSTRACT

This invention is directed to a monoclonal antibody or an antigen binding fragment thereof targeting the expression and function of CYP1A1 with cross reactivity across the vertebrate taxa. This invention is also directed to nucleic acid molecules, vectors, host cells and compositions comprising the same, as well as methods for use of the same and for producing the same.

16 Claims, 7 Drawing Sheets

Specification includes a Sequence Listing.

(56) References Cited

OTHER PUBLICATIONS

Lederman S, et al. A single amino acid substitution in a common African allele of the CD4 molecule ablates binding of the monoclonal antibody, OKT4. Mol Immunol. Nov. 1991;28(11):1171-81. doi: 10.1016/0161-5890(91)90003-3. PMID: 1961196. (Abstract only) (Year: 1991).*

Lodish, H. F. (2012). Molecular cell biology. 7th ed. W.H. Freeman and Co. Chapter 5 (Year: 2012).*

Anderson AL, et al. Development and Applications of a Zebrafish (*Danio rerio*) CYP1A-Targeted Monoclonal Antibody (CRC4) with Reactivity across Vertebrate Taxa: Evidence for a Conserved CYP1A Epitope. Toxics. Jul. 20, 2022;10(7):404. doi: 10.3390/toxics10070404. PMID: 35878309; PMCID: PMC9320060. (Year: 2022).*

GenBank Accession No. BAB90841.1 "cytochrome P450 1A [Danio rerio]" (www.ncbi.nlm.nih.gov) (2 pages) (Apr. 17, 2002).

Bello, et al., "Acquired Resistance to Ah Receptor Agonists in a Population of Atlantic Killifish (*Fundulus heteroclitus*) Inhabiting a Marine Superfund Site: In Vivo and in Vitro Studies on the Inducibility of Xenobiotic Metabolizing Enzymes", Toxicological Sciences, 60:77-91 (2001).

Binder, et al., "Half-Life Extension of Therapeutic Proteins via Genetic Fusion to Recombinant PEG Mimetics", Therapeutic Proteins: Strategies to Modulate Their Plasma Half-Lives, First Edition. Edited by Roland Kontermann. © 2012 Wiley-VCH Verlag Gmbh & Co. KGaA. Published 2012 by Wiley-VCH Verlag Gmbh & Co. KGaA.

Boerner, et al., "Production of Antigen-Specific Human Monoclonal Antibodies from In Vitro-Primed Human Splenocytes", Journal of Immunology, 147(1), 1991, 86-95.

Clark, et al., "Resistance to teratogenesis by F1 and F2 embryos of PAH-adapted Fundulus heteroclitus is strongly inherited despite reduced recalcitrance of the AHR pathway", Environmental Science and Pollution Research, 21(24):13898-13908 (2014).

Cole, S.P.C., "Monoclonal Antibodies", Canadian Family Physician, 33:369-372 (1987).

Denison, et al., "Exactly the Same but Different: Promiscuity and Diversity in the Molecular Mechanisms of Action of the Aryl Hydrocarbon (Dioxin) Receptor", Toxicological Sciences, 124(1):1-22 (2011).

Denison, et al., "Ligand binding and activation of the Ah receptor", Chemico-Biological Interactions, 141:3-24 (2002).

Dubansky, et al., "Methodology for exposing avian embryos to quantified levels of airborne aromatic compounds associated with crude oil spills", Environmental Toxicology and Pharmacology, 58:163-169 (2018).

Fielder, et al., "Non-Antibody Scaffolds as Therapeutic Agents", Handbook of Therapeutic Antibodies, Second Edition. Edited by Stefan Dubel and Janice M. Reichert. © 2014 Wiley-VCH Verlag Gmbh & Co. KGaA. Published 2014 by Wiley-VCH Verlag Gmbh & Co. KGaA.

Gilbreth, Ryan N., et al., "Structural insights for engineering binding proteins based on nonantibody scaffolds", Current Opinion in Structural Biology, 22, 2012, 413-420.

Gu, et al., "The PAS Superfamily: Sensors of Environmental and Developmental Signals", Annual Review of Pharmacology and Toxicology, 40:519-561 (2000).

Hammond, et al., "More than Meets the Eye: The Aryl Hydrocarbon Receptor is an Environmental Sensor, Physiological Regulator and a Therapeutic Target in Ocular Disease", Frontiers in Toxicology, 4:791082 (2022), 1-12.

Holliger, Philipp, et al., "Engineered antibody fragments and the rise of single domains", Nature Biotechnology, 23(9), 2005, 1126-1136.

Hoogenboom, et al., "By-passing immunisation: Human antibodies from synthetic repertoires of germline VH gene segments rearranged in vitro", Journal of Molecular Biology, 227:381-388 (1991).

Hossler, Patrick, et al., "Optimal and consistent protein glycosylation in mammalian cell culture", Glycobiology, 19(9), 2009, 936-949.

Hu, et al., "Induction of Cyp1a1 Is a Nonspecific Biomarker of Aryl Hydrocarbon Receptor Activation: Results of Large Scale Screening of Pharmaceuticals and Toxicants in Vivo and in Vitro", Molecular Pharmacology, 71:1475-1486 (2007).

Huse, et al., "Generation of a Large Combinatorial Library of the Immunoglobulin Repertoire in PhageLambda", Science, 246(4935), 1989, 1275-1281.

Jones, et al., "Replacing the complementarity-determining regions in a human antibody with those from a mouse", Nature, 321, 1986, 522-525.

Kohle, et al., "Coordinate regulation of Phase I and II xenobiotic metabolisms by the Ah receptor and Nrf2", Biochemical Pharmacology, 73:1853-1862 (2007).

Kontermann, et al., "Bispecific antibodies", Drug Discovery Today, 20(7):838-847 (2015).

Laub, et al., "Responsiveness of a Xenopus laevis cell line to the aryl hydrocarbon receptor ligands 6-formylindolo [3,2-b]carbazole (FICZ) and 2,3,7,8-tetrachlorodibenzo-p-dioxin (TCDD)", Chemico-Biological Interactions, 183(1):202-211 (2010).

Lavine, et al., "Aryl Hydrocarbon Receptors in the Frog Xenopus laevis: Two AhR1 Paralogs Exhibit Low Affinity for 2,3,7,8-Tetrachlorodibenzo-p-Dioxin (TCDD)", Toxicological Sciences, 88(1):60-72 (2005).

Lee, et al., "The microbiome and gut homeostasis", Science, 377(6601), eabp9960 (2022).

Lu, et al., "New insights of CYP1A in endogenous metabolism: a focus on single nucleotide polymorphisms and diseases", Acta Pharmaceutica Sinica B, 10(1):91-104 (2020).

Marks, et al., "By-passing immunization. Human antibodies from V-gene libraries displayed on phage", Journal of Molecular Biology, 222:581-597 (1991).

Nebert, et al., "Role of the Aromatic Hydrocarbon Receptor and [Ah] Gene Battery in the Oxidative Stress Response, Cell Cycle Control, and Apoptosis", Biochemical Pharmacology, 59:65-85 (2000).

Oziolor, et al., "Cross-resistance in Gulf killifish (*Fundulus grandis*) populations resistant to dioxin-like compounds", Aquatic Toxicology, 175:222-231 (2016).

Oziolor, et al., "Evolved resistance to PCB- and PAH-induced cardiac teratogenesis, and reduced CYP1A activity in Gulf killifish (*Fundulus grandis*) populations from the Houston Ship Channel, Texas", Aquatic Toxicology, 150:210-219 (2014).

Pasut, Gianfranco, et al., "State of the art in PEGylation: the great versatility achieved after forty years of research", Journal of Controlled Release, 161(2), 2012, 461-472.

Presta, Leonard G., "Antibody engineering", Current Opinion in Structural Biology, 2:593-596 (1992).

Rannug, Agneta, "How the AHR Became Important in Intestinal Homeostasis—A Diurnal FICZ/AHR/CYP1A1 Feedback Controls Both Immunity and Immunopathology", International Journal of Molecular Sciences, 21:5681 (2020).

Reed, et al., "The role of cytochrome P450 enzymes in carcinogen activation and detoxication: an in vivo-in vitro paradox", Carcinogenesis, 29:851-859 (2018).

Riechmann, Lutz, et al., "Reshaping human antibodies for therapy", Nature, 332, 1988, 323-327.

Rothhammer, et al., "The aryl hydrocarbon receptor: an environmental sensor integrating immune responses in health and disease", Nature Reviews Immunology, 19:184-197 (2019).

Sarasquete, et al., "Cytochrome P4501A (CYP1A) in teleostean fishes. A review of immunohistochemical studies", The Science of the Total Environment, 247:313-332 (2000).

Scott, et al., "AhR2-mediated, CYP1A-independent cardiovascular toxicity in zebrafish (*Danio rerio*) embryos exposed to retene", Aquatic Toxicology, 101:165-174 (2011).

Shreya, et al., "Active Targeting of Drugs and Bioactive Molecules via Oral Administration by Ligand-Conjugated Lipidic Nanocarriers: Recent Advances", AAPS ParmSciTech, 20(1):15 (2019).

Silverman, et al., "Multivalent avimer proteins evolved by exon shuffling of a family of human receptor domains", Nature Biotechnology, 23(12):1556-1561 (2005).

(56) References Cited

OTHER PUBLICATIONS

Van Veld, et al., "Evidence for depression of cytochrome P4501A in a population of chemically resistant mummichogs, (*Fundulus heteroclitus*)", Environmental Sciences, 3(4):221-234 (1995).

Verhoeyen, Martine, et al., "Reshaping human antibodies: grafting an antilysozyme activity", Science, 239 (4847), 1988, 1534-1536.

Vogel, et al., "The aryl hydrocarbon receptor repressor—More than a simple feedback inhibitor of AhR signaling: Clues for its role in inflammation and cancer", Current Opinion in Toxicology, 2:109-119 (2017).

Walker, M. R., et al., "Interaction of human IgG chimeric antibodies with the human FcRI and FcRII receptors: Requirements for antibody-mediated host cell-target cell interaction", Molecular Immunology, 26(4), 1989, 403-411.

Ward, et al., "Hyaluronan in joint cavitation", Biochemical Society Transactions, 27:128-135 (1999).

Wells, et al., "Homeostasis of the gut barrier and potential biomarkers", American Journal of Physiology—Gastrointestinal and Liver Physiology, 312:G171-G193 (2017).

Whitehead, et al., "Genomic and physiological footprint of the Deepwater Horizon oil spill on resident marsh fishes", PNAS, 109(50):20298-20302 (2012).

Wills, et al., "Characterization of the recalcitrant CYP1 phenotype found in Atlantic killifish (*Fundulus heteroclitus*) inhabiting a Superfund site on the Elizabeth River, VA", Aquatic Toxicology, 99:33-41 (2010).

Wincent, et al., "Biological effects of 6-formylindolo[3,2-b]carbazole (FICZ) in vivo are enhanced by loss of CYP1A function in an Ahr2-dependent manner", Biochemical Pharmacology, 110-111:117-129 (2016).

\* cited by examiner

CYP1A1-TARGETED MONOCLONAL ANTIBODY WITH REACTIVITY ACROSS VERTEBRATE TAXA

STATEMENT OF PRIORITY

This application claims the benefit, under 35 U.S.C. § 119(e), of U.S. Provisional Application No. 63/481,128, filed on Jan. 23, 2023, the entire contents of which are incorporated by reference herein.

STATEMENT REGARDING ELECTRONIC FILING OF A SEQUENCE LISTING

A Sequence Listing in XML format, entitled 9662-78_ST26.xml, 34,509 bytes in size, generated on Jan. 23, 2024 and filed herewith, is hereby incorporated by reference in its entirety for its disclosures.

FIELD OF THE INVENTION

This invention is directed to methods and compositions for monoclonal antibodies or an antigen binding fragment thereof targeting the expression and function of CYP1A1.

BACKGROUND OF THE INVENTION

Aryl hydrocarbon receptor (AHR) is a member of the basic helix-loop-helix (bHLH-PAS) superfamily of proteins and functions as a ligand-activated transcription factor for a suite of responsive genes (Gu et al. 2000 *Annu. Rev. Pharmacol. Toxicol.* 40:519-561) in its role in both toxicology and endogenous physiological homeostasis. The AHR is highly expressed in barrier epithelial tissues, and thus is an environmental sensor for a variety of AHR ligands (Hammond et al. 2022 *Front. Toxicol.* 4:791082).

Most notable of the AHR-responsive genes in the fields of toxicology and pharmacology include phase I and II drug-metabolizing enzymes and transporters, as well as the AHR-repressor that functions in a negative feed-back manner to suppress AHR activity (Denison et al. 2002 *Chem. Biol. Interact.* 141:3-24; Nebert et al. 2000 *Biochem. Pharm.* 59:65-85; Kohle C. and Bock, K. W. 2007 *Biochem. Pharm.* 73:18531862; Hu et al. 2007 *Mol. Pharm.* 71:1475-1486; Vogel, C. F. A. and Haarmann-Stemmann, T. 2017 *Curr. Opin. Toxicol.* 2:109-119). Induced expression of CYP1A, a heme-thiolate enzyme associated with the cytochrome P4501A1 monooxygenase system, is an early, yet nonspecific biomarker of AHR activation (Denison et al. 2011 *Toxicol. Sci.* 124:1-22). CYP1A is involved in the metabolism of a wide array of xenobiotic environmental substrates (Urban et al. 2001 *Biochem. Soc. Trans.* 29:128-135) and in recent years it has become clear that the AHR-CYP1A axis is also important to physiological homeostasis by regulating the metabolism and clearance of endogenous substrates such as sex hormones, amine hormones, vitamins, fatty acids, and phospholipids (Lu et al. 2020 *Acta Pharm.* Sin. B 10:91-104; Rothhammer and Quintana, 2019 *Nature Reviews Immunology* 19:184-197). This axis is also important for gut homeostasis by regulating concentrations of the endogenous indole ligand 6-Formylindolo [3,2-b] carbazole (FICZ) (and others) that in turn regulates the tonic expression of pro-inflammatory vs. anti-inflammatory cytokines (Rannug, A. 2020 *Int. J. Mol. Sci.* 21:5681; Wincent et al. 2016 *Biochem.* Pharm. 110:117-129).

In terms of environmental contaminants, adverse effects of exposure to select persistent environmental AHR ligands include immune suppression, reproductive and developmental disorders, as well as metabolic activation of pro-carcinogens and pro-mutagens, and each of these adverse outcomes has CYP1A expression and activity as a key mechanism of action (Reed et al. 2018 Carcinogenesis 29:851-859). Moreover, as an indicator of AHR activation and activity, the expression of CYP1A protein and its enzymatic activity are routine biomarkers of exposure to environmental AHR ligands in environmental species (Sarasquete, C., and Segner, H. 2000 *Sci. Total Environ.* 247:313-332). Likewise, the lack of or reduced CYP1A1 expression in fish during exposure to known environmental AHR ligands is a key indicator of adaptation to contaminants in situ (Veld, P. A. V. and Westbrook, D. J. 1995 *Environ. Sci.* 3:221-234; Oziolor et al. 2014 *Aquat. Toxicol.* 150:210-219; Wills et al. 2010 *Aquat. Toxicol.* 99:33-41; Clark et al. 2014 *Environ. Sci. Pollut.* 21:13898-13908; Bello et al. 2001 *Toxicol. Sci.* 60:77-91).

There is a need in the art for effective compositions to detect, diagnose, and/or treat disorders and conditions associated with CYP1A and the AHR-CYP1A axis.

SUMMARY OF THE INVENTION

One aspect of the invention relates to a monoclonal antibody or an antigen binding fragment thereof that specifically binds CYP1A1 protein.

Another aspect of the invention relates to an isolated nucleic acid molecule comprising a sequence encoding the monoclonal antibody or an antigen binding fragment thereof of the invention. Also provided are vectors, host cells, and compositions comprising the monoclonal antibody or an antigen binding fragment thereof and/or an isolated nucleic acid molecule of the invention. In some embodiments, a composition of the invention may be a pharmaceutical composition, e.g., further comprising a pharmaceutically acceptable carrier, diluent, and/or excipient.

Also provided herein is a method of treating, preventing, or delaying progression of a disease or condition associated with AHR and/or CYP1A in a subject in need thereof, the method comprising administering to the subject an effective amount of the pharmaceutical composition of the invention, thereby treating the disease or condition.

Another aspect of the invention is directed to a method of modulating homeostasis in a subject affected by or at risk of a disease or condition associated with AHR and/or CYP1A, the method comprising administering to the subject an effective amount of the pharmaceutical composition of the invention.

Another aspect of the invention is directed to a method of reducing adverse effects of exposure to an environmental stressor in a subject in need thereof, the method comprising administering to the subject an effective amount of the pharmaceutical composition of the invention, wherein the environmental stress stimulates AHR and/or CYP1A signalling (e.g., the AHR-CYP1A axis).

Another aspect of the invention is directed to the monoclonal antibody or antigen binding fragment thereof, nucleic acid molecule, vector, host cell, and/or composition of the present invention, for use in modulating homeostasis in a subject affected by or at risk of a disease or condition associated with AHR and/or CYP1A.

Another aspect of the invention is directed to the monoclonal antibody or antigen binding fragment thereof, nucleic acid molecule, vector, host cell, and/or composition of the present invention, (i) for use as a medicament, in particular in the treatment of a disease or condition associated with a AHR and/or CYP1A; (ii) for use as a medicament, in particular in modulating homeostasis in a subject affected by or at risk of a disease or condition associated with AHR and/or CYP1A; (iii) for use as a medicament, in particular in reducing adverse effects of exposure to an environmental stressor in a subject in need thereof; (iv) for use in diagnostics; and/or (v) for detection purposes.

Also provided is a method of producing the monoclonal antibody or antigen binding fragment thereof of the present invention, the method comprising: cultivating the host cell of the invention, thereby allowing the monoclonal antibody or antigen binding fragment thereof to be expressed; recovering the monoclonal antibody or antigen binding fragment thereof; and optionally purifying the monoclonal antibody or antigen binding fragment thereof.

Another aspect of the invention is directed to a method of producing the monoclonal antibody or antigen binding fragment thereof of any one of the present invention, the method comprising: (a) contacting a cell-free expression system with a nucleic acid product template, the nucleic acid product template encoding the monoclonal antibody or antigen binding fragment thereof according to any one of the present invention, (b) allowing transcription and translation of the nucleic acid product template to occur, thereby allowing a reaction mixture to be formed; (c) recovering the monoclonal antibody or antigen binding fragment thereof from the reaction mixture; and (d) optionally purifying the monoclonal antibody or antigen binding fragment thereof.

Another aspect of the invention is drawn to a method of diagnosing a disease or disorder associated with activated CYP1A in a subject, the method comprising: (i) contacting a biological sample from the subject with the monoclonal antibody or antigen binding fragment thereof of the present invention under conditions permissive for specific binding of the monoclonal antibody or antigen binding fragment thereof to CYP1A, and (ii) detecting whether a complex between the monoclonal antibody or antigen binding fragment thereof and CYP1A is formed; wherein detection of the complex indicates the presence of activated CYP1A in the subject.

Also provided herein is a kit comprising the monoclonal antibody or antigen binding fragment thereof of the present invention together with a packaged combination of reagents with instructions.

BRIEF DESCRIPTION OF THE DRAWINGS

FIG. 1 panel (A). ELISA results demonstrating reactivity of three primary hybridoma supernatants against zebrafish CYP1A peptide used for immunizations. FIG. 1 panel (B). ELISA results demonstrating that only mAb CRC4 recognizes a conserved peptide sequence common to all vertebrates. FIG. 1 panel (C). ELISA results demonstrating that the conserved CYP1A sequence blocks the binding of mAb CRC4 to ELISA plate-bound peptide used for immunizations. FIG. 1 panel (D). Cross reactivity of mAb CRC4 with induced CYP1A protein in representative vertebrates. MW, molecular weight markers; C (control); T (treated); ZF, zebrafish liver cells; PLHC-1, *Poeciliopsis lucida* hepatoma cell line; RBT, 3-NF induced rainbow trout microsomes; HEPA1C1C7, mouse hepatoma cell line; Rat, liver S9 fractions; frog, XLK-WG cell line; human CYP1A1, recombinant CYP1A1 expressed in HEK cells. Additional information detailed in Table 2.

(FIG. 3 panel A). Control mouse liver; (FIG. 3 panel B). Liver from a PCB-126 treated mouse; (FIG. 3 panel C). Control chicken embryo liver at 18 days post fertilization (DPF); (FIG. 3 panel D). Liver from a crude oil vapor-exposed chicken embryo at 18 DPF; (FIG. 3 panel E). Liver from CYP1A recalcitrant Gulf killifish; (FIG. 3 panel F). Liver from Gulf killifish collected from a crude oil exposed site; (FIG. 3 panel G). Control Rainbow trout liver; (FIG. 3 panel H). Liver from a 3-NF-exposed rainbow trout; (FIG. 3 panel I). Control zebrafish liver; (FIG. 3 panel J). Liver from PCB-126 treated zebrafish. (FIG. 3 panels A, B) are 20× magnification, scale bar=100 μm (FIG. 3 panels C-J) are 40× magnification, scale bar=50 μm. Details of tissue sources, experimental conditions, and procedures are found in Table 2.

DETAILED DESCRIPTION

Figure 1:
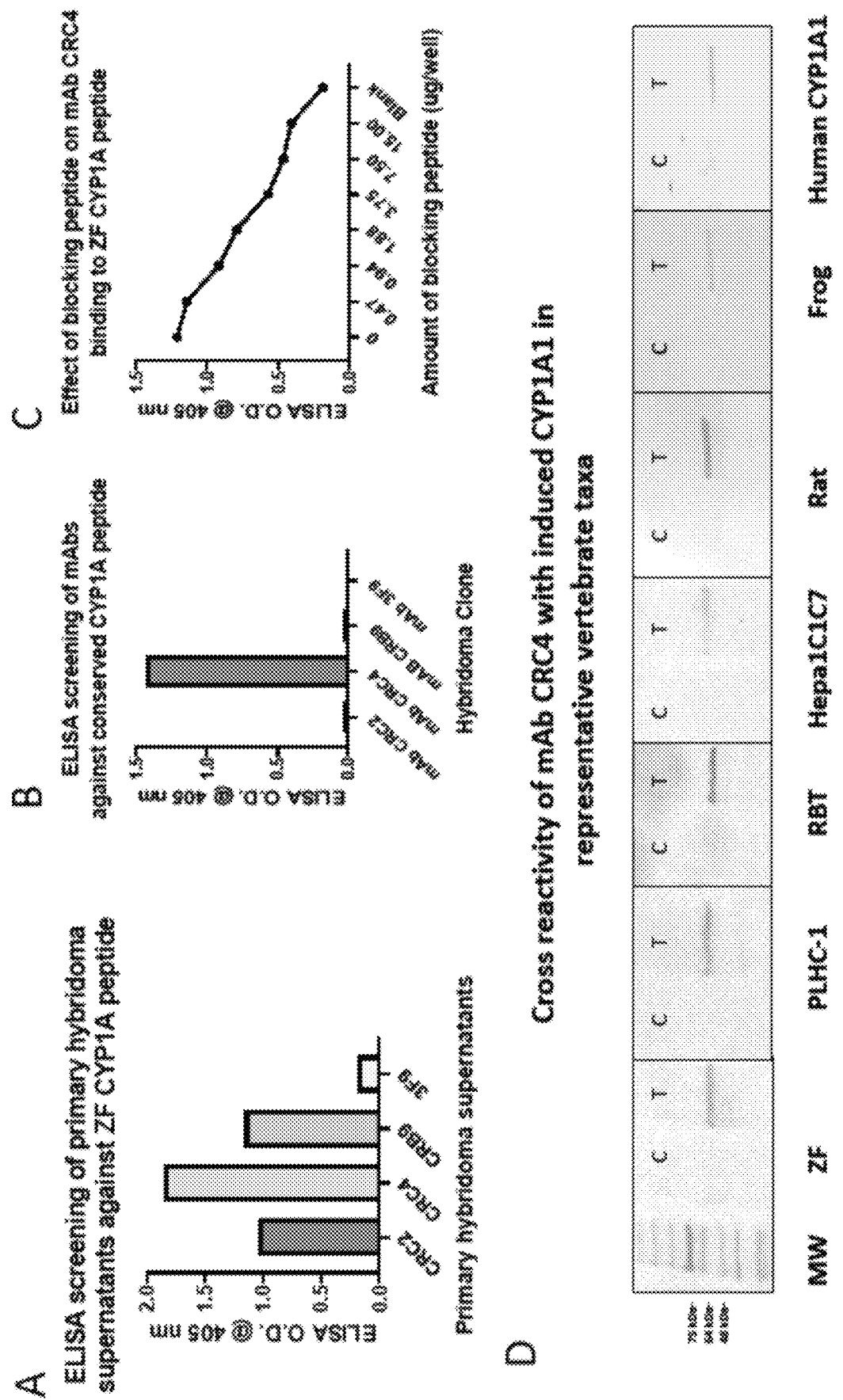
FIG. 1 shows images of data plots and gel images regarding the screening of monoclonal antibodies against the conserved CYP1A peptide.

The present invention now will be described hereinafter with reference to the accompanying drawings and examples, in which embodiments of the invention are shown. This description is not intended to be a detailed catalog of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. Thus, the invention contemplates that in some embodiments of the invention, any feature or combination of features set forth herein can be excluded or omitted. In addition, numerous variations and additions to the various embodiments suggested herein will be apparent to those skilled in the art in light of the instant disclosure, which do not depart from the instant invention. Hence, the following descriptions are intended to illustrate some particular embodiments of the invention, and not to exhaustively specify all permutations, combinations, and variations thereof.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

All publications, patent applications, patents and other references cited herein are incorporated by reference in their entireties for the teachings relevant to the sentence and/or paragraph in which the reference is presented.

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a composition comprises components A, B and C, it is specifically intended that any of A, B or C, or a combination thereof, can be omitted and disclaimed singularly or in any combination.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention. Where the stated range includes one or both of the limits, ranges excluding either or both of those included limits are also included in the invention.

The term "about," as used herein when referring to a measurable value such as an amount or concentration and the like, is meant to encompass variations of ±10%, ±5%, ±1%, ±0.5%, or even ±0.1% of the specified value as well as the specified value. For example, "about X" where X is the measurable value, is meant to include X as well as variations of ±10%, ±5%, ±1%, ±0.5%, or even ±0.1% of X. A range provided herein for a measurable value may include any other range and/or individual value therein.

As used herein, phrases such as "between X and Y" and "between about X and Y" should be interpreted to include X and Y. As used herein, phrases such as "between about X and Y" mean "between about X and about Y" and phrases such as "from about X to Y" mean "from about X to about Y."

The term "comprise," "comprises" and "comprising" as used herein, specify the presence of the stated features, integers, steps, operations, elements, and/or components, but do not preclude the presence or addition of one or more other features, integers, steps, operations, elements, components, and/or groups thereof.

As used herein, the transitional phrase "consisting essentially of" means that the scope of a claim is to be interpreted to encompass the specified materials or steps recited in the claim and those that do not materially affect the basic and novel characteristic(s) of the claimed invention. Thus, the term "consisting essentially of" when used in a claim of this invention is not intended to be interpreted to be equivalent to "comprising."

The term "consists essentially of" (and grammatical variants), as applied to a polynucleotide sequence of this invention, means a polynucleotide that consists of both the recited sequence (e.g., SEQ ID NO) and a total of ten or less (e.g., 1, 2, 3, 4, 5, 6, 7, 8, 9, or 10) additional nucleotides on the 5' and/or 3' ends of the recited sequence such that the function of the polynucleotide is not materially altered. The total of ten or less additional nucleotides includes the total number of additional nucleotides on both ends added together. The term "materially altered," as applied to polynucleotides of the invention, refers to an increase or decrease in ability to inhibit expression of a target mRNA of at least about 50% or more as compared to the expression level of a polynucleotide consisting of the recited sequence.

The term "enhance" or "increase" refers to an increase in the specified parameter of at least about 1.25-fold, 1.5-fold, 2-fold, 3-fold, 4-fold, 5-fold, 6-fold, 8-fold, 10-fold, twelve-fold, or even fifteen-fold.

The term "inhibit" or "reduce" or grammatical variations thereof as used herein refers to a decrease or diminishment in the specified level or activity of at least about 15%, 25%, 35%, 40%, 50%, 60%, 75%, 80%, 90%, 95% or more. In particular embodiments, the inhibition or reduction results in little or essentially no detectable activity (at most, an insignificant amount, e.g., less than about 10% or even 5%).

A "therapeutically effective" amount as used herein is an amount that provides some improvement or benefit to the subject. Alternatively stated, a "therapeutically effective" amount is an amount that will provide some alleviation, mitigation, or decrease in at least one clinical symptom in the subject (e.g., in the case of cancer, reduction in tumor burden, prevention of further tumor growth, prevention of metastasis, or increase in survival time). Those skilled in the art will appreciate that the therapeutic effects need not be complete or curative, as long as some benefit is provided to the subject.

By the terms "treat," "treating," or "treatment of," it is intended that the severity of the subject's condition is reduced or at least partially improved or modified and that some alleviation, mitigation or decrease in at least one clinical symptom is achieved.

"Prevent" or "preventing" or "prevention" refer to prevention or delay of the onset of the disorder and/or a decrease in the severity of the disorder in a subject relative to the severity that would develop in the absence of the methods of the invention. The prevention can be complete, e.g., the total absence of cancer in a subject. The prevention can also be partial, such that the occurrence or severity of cancer in a subject is less than that which would have occurred without the present invention.

As used herein, "nucleic acid," "nucleotide sequence," and "polynucleotide" are used interchangeably and encompass both RNA and DNA, including cDNA, genomic DNA, mRNA, synthetic (e.g., chemically synthesized) DNA or RNA and chimeras of RNA and DNA. The term polynucleotide, nucleotide sequence, or nucleic acid refers to a chain of nucleotides without regard to length of the chain. The nucleic acid can be double-stranded or single-stranded. Where single-stranded, the nucleic acid can be a sense strand or an antisense strand. The nucleic acid can be synthesized using oligonucleotide analogs or derivatives (e.g., inosine or phosphorothioate nucleotides). Such oligonucleotides can be used, for example, to prepare nucleic acids that have altered base-pairing abilities or increased resistance to nucleases. The present invention further provides a nucleic acid that is the complement (which can be either a full complement or a partial complement) of a nucleic acid, nucleotide sequence, or polynucleotide of this invention. When dsRNA is produced synthetically, less common bases, such as inosine, 5-methylcytosine, 6-methyladenine, hypoxanthine and others can also be used for antisense, dsRNA, and ribozyme pairing. For example, polynucleotides that contain C-5 propyne analogues of uridine and cytidine have been shown to bind RNA with high affinity and to be potent antisense inhibitors of gene expression. Other modifications, such as modification to the phosphodiester backbone, or the 2'-hydroxy in the ribose sugar group of the RNA can also be made.

A "recombinant" nucleic acid, polynucleotide or nucleotide sequence is one produced by genetic engineering techniques.

A "recombinant" polypeptide is produced from a recombinant nucleic acid, polypeptide or nucleotide sequence.

An "isolated polynucleotide" is a nucleotide sequence (e.g., DNA or RNA) that is not immediately contiguous with nucleotide sequences with which it is immediately contiguous (one on the 5' end and one on the 3' end) in the naturally occurring genome of the organism from which it is derived. Thus, in one embodiment, an isolated nucleic acid includes some or all of the 5' non-coding (e.g., promoter) sequences that are immediately contiguous to a coding sequence. The term therefore includes, for example, a recombinant DNA that is incorporated into a vector, into an autonomously replicating plasmid or virus, or into the genomic DNA of a prokaryote or eukaryote, or which exists as a separate molecule (e.g., a cDNA or a genomic DNA fragment produced by PCR or restriction endonuclease treatment), independent of other sequences. It also includes a recombinant DNA that is part of a hybrid nucleic acid encoding an additional polypeptide or peptide sequence. An isolated polynucleotide that includes a gene is not a fragment of a chromosome that includes such gene, but rather includes the coding region and regulatory regions associated with the gene, but no additional genes naturally found on the chromosome.

The term "isolated" can refer to a nucleic acid, nucleotide sequence or polypeptide that is substantially free of cellular material, viral material, and/or culture medium (when produced by recombinant DNA techniques), or chemical precursors or other chemicals (when chemically synthesized). Moreover, an "isolated fragment" is a fragment of a nucleic acid, nucleotide sequence or polypeptide that is not naturally occurring as a fragment and would not be found in the natural state. "Isolated" does not mean that the preparation is technically pure (homogeneous), but it is sufficiently pure to provide the polypeptide or nucleic acid in a form in which it can be used for the intended purpose.

An "isolated cell" refers to a cell that is separated from other components with which it is normally associated in its natural state. For example, an isolated cell can be a cell in culture medium and/or a cell in a pharmaceutically acceptable carrier of this invention. Thus, an isolated cell can be delivered to and/or introduced into a subject. In some embodiments, an isolated cell can be a cell that is removed from a subject and manipulated as described herein ex vivo and then returned to the subject.

The term "fragment," as applied to a polynucleotide, will be understood to mean a nucleotide sequence of reduced length relative to a reference nucleic acid or nucleotide sequence and comprising, consisting essentially of, and/or consisting of a nucleotide sequence of contiguous nucleotides identical or almost identical (e.g., 90%, 92%, 95%, 98%, 99% identical) to the reference nucleic acid or nucleotide sequence. Such a nucleic acid fragment according to the invention may be, where appropriate, included in a larger polynucleotide of which it is a constituent. In some embodiments, such fragments can comprise, consist essentially of, and/or consist of oligonucleotides having a length of at least about 8, 10, 12, 15, 20, 25, 30, 35, 40, 45, 50, 75, 100, 150, 200, or more consecutive nucleotides of a nucleic acid or nucleotide sequence according to the invention.

The term "fragment," as applied to a polypeptide, will be understood to mean an amino acid sequence of reduced length relative to a reference polypeptide or amino acid sequence and comprising, consisting essentially of, and/or consisting of an amino acid sequence of contiguous amino acids identical or almost identical (e.g., 90%, 92%, 95%, 98%, 99% identical) to the reference polypeptide or amino acid sequence. Such a polypeptide fragment according to the invention may be, where appropriate, included in a larger polypeptide of which it is a constituent. In some embodiments, such fragments can comprise, consist essentially of, and/or consist of peptides having a length of at least about 4, 6, 8, 10, 12, 15, 20, 25, 30, 35, 40, 45, 50, 75, 100, 150, 200, or more consecutive amino acids of a polypeptide or amino acid sequence according to the invention.

The term "antibody fragment" refers to a portion of an immunoglobulin, often the hypervariable region and portions of the surrounding heavy and light chains that displays specific binding affinity for a particular target, typically a molecule. A hypervariable region is a portion of an immunoglobulin that physically binds to the polypeptide target. An antibody fragment thus includes or consists of one or more portions of a full-length immunoglobulin retaining the targeting specificity of the immunoglobulin. Such antibody fragment may for instance lack at least partially the constant region (Fc region) of the full-length immunoglobulin. In some embodiments, an antibody fragment is produced by digestion of the full-length immunoglobulin. An antibody fragment may also be a synthetic or recombinant construct that contains one or more parts of the immunoglobulin or immunoglobulin chains (see e.g. HOLLIGER, P. and Hudson, J. Engineered antibody fragments and the rise of single domains. Nature Biotechnology 2005, vol. 23, no. 9, p. 1126-1136). Examples of an antibody fragment include, but are not limited to, an scFv, a Fab, a Fv, a Fab', a F(ab')$_2$ fragment, a dAb, a VHH, a nanobody, a V(NAR) or a so called minimal recognition unit.

A "single chain variable fragment" or a "single chain antibody" or an "scFv" are examples of a type of antibody fragment. An scFv is a fusion protein that includes the VH and VL domains of an immunoglobulin connected by a linker. It thus lacks the constant Fc region present in a full-length immunoglobulin.

A "monoclonal antibody or an antigen binding fragment thereof" as used herein refers to a full-length immunoglobulin, an antibody fragment, a proteinaceous non-immunoglobulin scaffold, and/or other binding compound, which has an immunoglobulin-like function.

Typically the monoclonal antibody or an antigen binding fragment thereof is a proteinaceous binding molecule. Such monoclonal antibody or an antigen binding fragment thereof can be monovalent or multivalent, i.e. having one or more antigen binding sites. Non-limiting examples of monovalent binding members include scFv, Fab fragments, dAb, VHH, DARPins, affilins and nanobodies. A multivalent monoclonal antibody or an antigen binding fragment thereof can have two, three, four or more antigen binding sites whereby one or more different antigens can be recognized. Full length immunoglobulins, F(ab')$_2$ fragments, bis-scFv (or tandem scFv) and diabodies are nonlimiting examples of multivalent monoclonal antibody or an antigen binding fragment thereof; in the exemplary multivalent monoclonal antibody or an antigen binding fragment thereof, two binding sites are present, i.e. the monoclonal antibody or an antigen binding fragment thereof is bivalent. In some embodiments, the multivalent monoclonal antibody or an antigen binding fragment thereof is bispecific, i.e. the monoclonal antibody or an antigen binding fragment thereof is directed against two different targets or two different target sites on one target molecule. Bispecific antibodies are, e.g., reviewed in MULLER, D. and Kontermann, R. E. Bispecific antibodies. Edited by DUBEL, S. Weinheim: Wiley-VCH, 2007. ISBN 3527314539. p. 345-378. In some embodiments, the multivalent monoclonal antibody or an antigen binding fragment thereof includes more than two, e.g., three or four different binding sites for three or four, respectively, different antigens. Such monoclonal antibody or an antigen binding fragment thereof is multivalent and multispecific, in particular tri- or tetra-specific, respectively.

"Non-antibody scaffolds" are antigen-binding polypeptides which are e.g. described in FIELDER, M. and Skerra, A. Non-antibody scaffolds. Edited by DUBEL, S. Weinheim: Wiley-VCH, 2007. ISBN 3527314539. p. 467-500; or GILBRETH, R. N. and Koide, S. Structural insights for engineering binding proteins based on non-antibody scaffolds. Curr Opin Struct Biol 2012, vol. 22, p. 4 13-420. Non-limiting examples include affibodies, affilin molecules, an AdNectin, a mutein based on a polypeptide of the lipocalin family (Anticalin®), a DARPin, Knottin, a Kunitz-type domain, an Avimer, a Tetranectin and a trans-body. Avimers contain so called A-domains that occur as strings of multiple domains in several cell surface receptors (Silverman, J., et al., Nature Biotechnology (2005) 23, 1556-1561). Tetranectins, derived from the respective human homotrimeric protein, likewise contain loop regions in a C-type lectin domain that can be engineered for desired binding (ibid.).

Chemical and/or biological modifications may be conducted to optimize pharmacodynamics or water solubility of the protein or to lower its side effects. For example, PEGylation, PASylation and/or HESylation may be applied to slow down renal clearance and thereby increase plasma half-life time of the monoclonal antibody or an antigen binding fragment thereof. Additionally or alternatively, a modification may add a different functionality to the protein, e.g. a toxin to more efficiently combat cancer cells, or a detection molecule for diagnostic purposes.

Glycosylation refers to a process that attaches carbohydrates to proteins. In biological systems, this process is performed enzymatically within the cell as a form of co-translational or post-translational modification. A protein, here the monoclonal antibody or an antigen binding fragment thereof such as an antibody, can also be chemically glycosylated. Typically, but not limited to, glycosylation is (i) N-linked to a nitrogen of asparagine or arginine sidechains; (ii) O-linked to the hydroxy oxygen of serine, threonine, tyrosine, hydroxylysine, or hydroxyproline sidechains; (iii) involves the attachment of xylose, fucose, mannose, and N-acetylglucosamine to a phospho-serine; or (iv) in form of C-mannosylation wherein a mannose sugar is added to a tryptophan residue found in a specific recognition sequence. Glycosylation patterns can, e.g., be controlled by choosing appropriate cell lines, culturing media, protein engineering manufacturing modes and process strategies (HOSSLER, P. Optimal and consistent protein glycosylation in mammalian cell culture. *Glycobiology* 2009, vol. 19, no. 9, p. 936-949).

Protein engineering to control or alter the glycosylation pattern may involve the deletion and/or the addition of one or more glycosylation sites. The creation of glycosylation sites can conveniently be accomplished by introducing the corresponding enzymatic recognition sequence into the amino acid sequence of the monoclonal antibody or an antigen binding fragment thereof or by adding or substituting one or more of the above enumerated amino acid residues.

The terms "immunogen" and "antigen" may be used interchangeably herein and mean any compound (including polypeptides) to which a cellular and/or humoral immune response can be directed. In particular embodiments, an immunogen or antigen can induce a protective immune response against the effects of a disorder and/or disease. A molecule capable of antibody and/or immune response stimulation may be referred to as antigenic/immunogenic, and can be said to have the ability of antigenicity/immunogenicity. The binding site for an antibody within an antigen and/or immunogen may be referred to as an epitope (e.g., an antigenic epitope). The term "vaccine antigen" may be used to refer to such an antigen/immunogen as used as a vaccine, e.g., a prophylactic, preventative, and/or therapeutic vaccine.

A "vector" is any nucleic acid molecule for the cloning of and/or transfer of a nucleic acid into a cell. A vector may be a replicon to which another nucleotide sequence may be attached to allow for replication of the attached nucleotide sequence. A "replicon" can be any genetic element (e.g., plasmid, phage, cosmid, chromosome, viral genome) that functions as an autonomous unit of nucleic acid replication in vivo, i.e., capable of replication under its own control. The term "vector" includes both viral and nonviral (e.g., plasmid) nucleic acid molecules for introducing a nucleic acid into a cell in vitro, ex vivo, and/or in vivo. A large number of vectors known in the art may be used to manipulate nucleic acids, incorporate response elements and promoters into genes, etc. For example, the insertion of the nucleic acid fragments corresponding to response elements and promoters into a suitable vector can be accomplished by ligating the appropriate nucleic acid fragments into a chosen vector that has complementary cohesive termini. Alternatively, the ends of the nucleic acid molecules may be enzymatically modified or any site may be produced by ligating nucleotide sequences (linkers) to the nucleic acid termini. Such vectors may be engineered to contain sequences encoding selectable markers that provide for the selection of cells that contain the vector and/or have incorporated the nucleic acid of the vector into the cellular genome. Such markers allow identification and/or selection of host cells that incorporate and express the proteins encoded by the marker. A "recombinant" vector refers to a viral or non-viral vector that comprises one or more heterologous nucleotide sequences (i.e., transgenes), e.g., two, three, four, five or more heterologous nucleotide sequences.

Viral vectors have been used in a wide variety of gene delivery applications in cells, as well as living animal subjects. Viral vectors that can be used include, but are not limited to, retrovirus, lentivirus, adeno-associated virus, poxvirus, alphavirus, baculovirus, vaccinia virus, herpes virus, Epstein-Barr virus, and/or adenovirus vectors. Non-viral vectors include, but are not limited to, plasmids, liposomes, electrically charged lipids (cytofectins), nucleic acid-protein complexes, and biopolymers. In addition to a nucleic acid of interest, a vector may also comprise one or more regulatory regions, and/or selectable markers useful in selecting, measuring, and monitoring nucleic acid transfer results (delivery to specific tissues, duration of expression, etc.).

Vectors may be introduced into the desired cells by methods known in the art, e.g., transfection, electroporation, microinjection, transduction, cell fusion, DEAE dextran, calcium phosphate precipitation, lipofection (lysosome fusion), use of a gene gun, or a nucleic acid vector transporter (see, e.g., Wu et al., *J. Biol. Chem.* 267:963 (1992); Wu et al., *J. Biol. Chem.* 263:14621 (1988); and Hartmut et al., Canadian Patent Application No. 2,012,311, filed Mar. 15, 1990).

In some embodiments, a polynucleotide of this invention can be delivered to a cell in vivo by lipofection. Synthetic cationic lipids designed to limit the difficulties and dangers encountered with liposome-mediated transfection can be used to prepare liposomes for in vivo transfection of a nucleotide sequence of this invention (Felgner et al., *Proc. Natl. Acad. Sci. USA* 84:7413 (1987); Mackey, et al., *Proc. Natl. Acad. Sci. U.S.A.* 85:8027 (1988); and Ulmer et al., *Science* 259:1745 (1993)). The use of cationic lipids may promote encapsulation of negatively charged nucleic acids, and also promote fusion with negatively charged cell membranes (Felgner et al., *Science* 337:387 (1989)). Particularly useful lipid compounds and compositions for transfer of nucleic acids are described in International Patent Publications WO95/18863 and WO96/17823, and in U.S. Pat. No. 5,459,127. The use of lipofection to introduce exogenous nucleotide sequences into specific organs in vivo has certain practical advantages. Molecular targeting of liposomes to specific cells represents one area of benefit. It is clear that directing transfection to particular cell types would be particularly preferred in a tissue with cellular heterogeneity, such as pancreas, liver, kidney, and the brain. Lipids may be chemically coupled to other molecules for the purpose of targeting (Mackey, et al., 1988, supra). Targeted peptides, e.g., hormones or neurotransmitters, and proteins such as antibodies, or non-peptide molecules can be coupled to liposomes chemically.

In various embodiments, other molecules can be used for facilitating delivery of a nucleic acid in vivo, such as a cationic oligopeptide (e.g., WO95/21931), peptides derived from nucleic acid binding proteins (e.g., WO96/25508), and/or a cationic polymer (e.g., WO95/21931).

It is also possible to introduce a vector in vivo as naked nucleic acid (see U.S. Pat. Nos. 5,693,622, 5,589,466 and 5,580,859). Receptor-mediated nucleic acid delivery approaches can also be used (Curiel et al., *Hum. Gene Ther.* 3:147 (1992); Wu et al., *J. Biol. Chem.* 262:4429 (1987)).

As used herein, the terms "protein" and "polypeptide" are used interchangeably and encompass both peptides and proteins, unless indicated otherwise.

As used herein, the term "chimera," "chimeric," and/or "fusion protein" refer to an amino acid sequence (e.g., polypeptide) generated non-naturally by deliberate human design comprising, among other components, an amino acid sequence of a protein of interest and/or a modified variant and/or active fragment thereof (a "backbone"), wherein the protein of interest comprises modifications (e.g., substitutions such as singular residues and/or contiguous regions of amino acid residues) from different wild type reference sequences (chimera), optionally linked to other amino acid segments (fusion protein). The different components of the designed protein may provide differing and/or combinatorial function. Structural and functional components of the designed protein may be incorporated from differing and/or a plurality of source material. The designed protein may be delivered exogenously to a subject, wherein it would be exogenous in comparison to a corresponding endogenous protein.

A "fusion protein" is a polypeptide produced when two heterologous nucleotide sequences or fragments thereof coding for two (or more) different polypeptides not found fused together in nature are fused together in the correct translational reading frame. Illustrative fusion polypeptides include fusions of a polypeptide of the invention (or a fragment thereof) to all or a portion of glutathione-S-transferase, maltose-binding protein, or a reporter protein (e.g., Green Fluorescent Protein, β-glucuronidase, β-galactosidase, luciferase, etc.), hemagglutinin, c-myc, FLAG epitope, etc.

By the term "express" or "expression" of a polynucleotide coding sequence, it is meant that the sequence is transcribed, and optionally, translated. Typically, according to the present invention, expression of a coding sequence of the invention will result in production of the polypeptide of the invention. The entire expressed polypeptide or fragment can also function in intact cells without purification.

As used herein, the term "over-expression" or "over-expressing" refers to increased levels of a polypeptide being produced and/or increased time of expression (e.g., constitutively expressed) compared to a wild-type cell.

As used herein, the term "gene" refers to a nucleic acid molecule capable of being used to produce mRNA, antisense RNA, miRNA, and the like. Genes may or may not be capable of being used to produce a functional protein. Genes can include both coding and non-coding regions (e.g., introns, regulatory elements, promoters, enhancers, termination sequences and 5' and 3' untranslated regions). A gene may be "isolated" by which is meant a nucleic acid that is substantially or essentially free from components normally found in association with the nucleic acid in its natural state. Such components include other cellular material, culture medium from recombinant production, and/or various chemicals used in chemically synthesizing the nucleic acid.

As used herein, "complementary" polynucleotides are those that are capable of base pairing according to the standard Watson-Crick complementarity rules. Specifically, purines will base pair with pyrimidines to form a combination of guanine paired with cytosine (G:C) and adenine paired with either thymine (A:T) in the case of DNA, or adenine paired with uracil (A:U) in the case of RNA. For example, the sequence "A-G-T" binds to the complementary sequence "T-C-A." It is understood that two polynucleotides may hybridize to each other even if they are not completely complementary to each other, provided that each has at least one region that is substantially complementary to the other.

The terms "complementary" or "complementarity," as used herein, refer to the natural binding of polynucleotides under permissive salt and temperature conditions by base-pairing. Complementarity between two single-stranded molecules may be "partial," in which only some of the nucleotides bind, or it may be complete when total complementarity exists between the single stranded molecules. The degree of complementarity between nucleic acid strands has significant effects on the efficiency and strength of hybridization between nucleic acid strands.

As used herein, the terms "substantially complementary" or "partially complementary" mean that two nucleic acid sequences are complementary at least about 50%, 60%, 70%, 80% or 90% of their nucleotides. In some embodiments, the two nucleic acid sequences can be complementary at least at 85%, 90%, 95%, 96%, 97%, 98%, 99% or more of their nucleotides. In some embodiments, the two nucleic acid sequences can be complementary over at least about 50%, 60%, 70%, 80% or 90% of their consecutive nucleotides. In some embodiments, the two nucleic acid sequences can be complementary over at least about 85%, 90%, 95%, 96%, 97%, 98%, 99% or more of their consecutive nucleotides. The terms "substantially complementary" and "partially complementary" can also mean that two nucleic acid sequences can hybridize under high stringency conditions and such conditions are well known in the art.

As used herein, "heterologous" refers to a nucleic acid sequence that either originates from another species or is from the same species or organism but is modified from either its original form or the form primarily expressed in the cell. Thus, a nucleotide sequence derived from an organism or species different from that of the cell into which the nucleotide sequence is introduced, is heterologous with respect to that cell and the cell's descendants. In addition, a heterologous nucleotide sequence includes a nucleotide sequence derived from and inserted into the same natural, original cell type, but which is present in a non-natural state, e.g., a different copy number, and/or under the control of different regulatory sequences than that found in nature.

As used herein, the terms "contacting," "introducing" and "administering" are used interchangeably, and refer to a process by which monoclonal antibodies or an antigen binding fragment thereof of the present invention or a nucleic acid molecule encoding a monoclonal antibodies or an antigen binding fragment thereof of this invention is delivered to a cell, in order to inhibit or alter or modify the presence and/or activity of a target protein (e.g. a misfolded and/or dysregulated protein especially through post-translational modifications). The monoclonal antibodies or an antigen binding fragment thereof may be administered in a number of ways, including, but not limited to, direct introduction into a cell (i.e., intracellularly) and/or extracellular introduction into a cavity, interstitial space, or into the circulation of the organism.

"Introducing" in the context of a cell or organism means presenting the nucleic acid molecule to the organism and/or cell in such a manner that the nucleic acid molecule gains access to the interior of a cell. Where more than one nucleic acid molecule is to be introduced these nucleic acid molecules can be assembled as part of a single polynucleotide or nucleic acid construct, or as separate polynucleotide or nucleic acid constructs, and can be located on the same or different nucleic acid constructs. Accordingly, these polynucleotides can be introduced into cells in a single transformation event or in separate transformation events. Thus, the term "transformation" as used herein refers to the introduction of a heterologous nucleic acid into a cell. Transformation of a cell may be stable or transient.

"Transient transformation" in the context of a polynucleotide means that a polynucleotide is introduced into the cell and does not integrate into the genome of the cell.

By "stably introducing" or "stably introduced" in the context of a polynucleotide introduced into a cell, it is intended that the introduced polynucleotide is stably incorporated into the genome of the cell, and thus the cell is stably transformed with the polynucleotide.

"Stable transformation" or "stably transformed" as used herein means that a nucleic acid molecule is introduced into a cell and integrates into the genome of the cell. As such, the integrated nucleic acid molecule is capable of being inherited by the progeny thereof, more particularly, by the progeny of multiple successive generations. "Genome" as used herein includes the nuclear and mitochondrial genome, and therefore includes integration of the nucleic acid into, for example, the mitochondrial genome. Stable transformation as used herein can also refer to a transgene that is maintained extrachromasomally, for example, as a minichromosome.

Transient transformation may be detected by, for example, an enzyme-linked immunosorbent assay (ELISA) or western blot, which can detect the presence of a peptide or polypeptide encoded by one or more transgene introduced into an organism. Stable transformation of a cell can be detected by, for example, a Southern blot hybridization assay of genomic DNA of the cell with nucleic acid sequences which specifically hybridize with a nucleotide sequence of a transgene introduced into an organism. Stable transformation of a cell can be detected by, for example, a Northern blot hybridization assay of RNA of the cell with nucleic acid sequences which specifically hybridize with a nucleotide sequence of a transgene introduced into an organism. Stable transformation of a cell can also be detected by, e.g., a polymerase chain reaction (PCR) or other amplification reactions as are well known in the art, employing specific primer sequences that hybridize with target sequence(s) of a transgene, resulting in amplification of the transgene sequence, which can be detected according to standard methods Transformation can also be detected by direct sequencing and/or hybridization protocols well known in the art.

Embodiments of the invention are directed to expression cassettes designed to express the nucleic acids of the present invention. As used herein, "expression cassette" means a nucleic acid molecule having at least a control sequence operably linked to a nucleotide sequence of interest. In this manner, for example, promoters in operable interaction with the nucleotide sequences for the monoclonal antibodies or an antigen binding fragment thereof of the invention are provided in expression cassettes for expression in an organism or cell.

As used herein with respect to nucleic acids, the term "operably linked" refers to a functional linkage between two or more nucleic acids. For example, a promoter sequence may be described as being "operably linked" to a heterologous nucleic acid sequence because the promoter sequence initiates and/or mediates transcription of the heterologous nucleic acid sequence. In some embodiments, the operably linked nucleic acid sequences are contiguous and/or are in the same reading frame.

As used herein, the term "promoter" refers to a region of a nucleotide sequence that incorporates the necessary signals for the efficient expression of a coding sequence. This may include sequences to which an RNA polymerase binds, but is not limited to such sequences and can include regions to which other regulatory proteins bind together with regions involved in the control of protein translation and can also include coding sequences.

Furthermore, a "promoter" of this invention is a promoter capable of initiating transcription in a cell of an organism. Such promoters include those that drive expression of a nucleotide sequence constitutively, those that drive expression when induced, and those that drive expression in a tissue- or developmentally-specific manner, as these various types of promoters are known in the art.

For purposes of the invention, the regulatory regions (i.e., promoters, transcriptional regulatory regions, and translational termination regions) can be native/analogous to the organism or cell and/or the regulatory regions can be native/analogous to the other regulatory regions. Alternatively, the regulatory regions may be heterologous to the organism or cell and/or to each other (i.e., the regulatory regions). Thus, for example, a promoter can be heterologous when it is operably linked to a polynucleotide from a species different from the species from which the polynucleotide was derived. Alternatively, a promoter can also be heterologous to a selected nucleotide sequence if the promoter is from the same/analogous species from which the polynucleotide is derived, but one or both (i.e., promoter and polynucleotide) are substantially modified from their original form and/or genomic locus, or the promoter is not the native promoter for the operably linked polynucleotide.

The choice of promoters to be used depends upon several factors, including, but not limited to, cell- or tissue-specific expression, desired expression level, efficiency, inducibility and selectability. For example, where expression in a specific tissue or organ is desired, a tissue-specific promoter can be used, such as camkII and synapsin for delivery to neurons. In contrast, where expression in response to a stimulus is desired, an inducible promoter can be used. Where continuous expression is desired throughout the cells of an organism, a constitutive promoter can be used. It is a routine matter for one of skill in the art to modulate the expression of a nucleotide sequence (e.g., activating or inhibiting transcription of target gene) by appropriately selecting and positioning promoters and other regulatory regions relative to that sequence.

In addition to the promoters described above, the expression cassette also can include other regulatory sequences. As used herein, "regulatory sequences" means nucleotide sequences located upstream (5' non-coding sequences), within or downstream (3' non-coding sequences) of a coding sequence, and which influence the transcription, RNA processing or stability, or translation of the associated coding sequence. Regulatory sequences include, but are not limited to, enhancers, introns, translation leader sequences and polyadenylation signal sequences.

The expression cassette also can optionally include a transcriptional and/or translational termination region (i.e., termination region) that is functional in the organism. A variety of transcriptional terminators are available for use in expression cassettes and are responsible for the termination of transcription beyond the transgene and correct mRNA polyadenylation. The termination region may be native to the transcriptional initiation region, may be native to the operably linked nucleotide sequence of interest, may be native to the host, or may be derived from another source (i.e., foreign or heterologous to the promoter, the nucleotide sequence of interest, the host, or any combination thereof).

A signal sequence can be operably linked to nucleic acids of the present invention to direct the nucleotide sequence into a cellular compartment or to be secreted from the cell. In this manner, the expression cassette will comprise a nucleotide sequence encoding the monoclonal antibodies or an antigen binding fragment thereof operably linked to a nucleic acid sequence for the signal sequence. The signal sequence may be operably linked at the N- or C-terminus of the monoclonal antibodies or an antigen binding fragment thereof. Similarly, a signal peptide may be operably linked and/or encoded into a polypeptide to direct the polypeptide to a particular destination, e.g., into a particular cellular compartment or to be secreted from a cell.

Regardless of the type of regulatory sequence(s) used, they can be operably linked to the nucleotide sequence of the monoclonal antibodies or an antigen binding fragment thereof. As used herein, "operably linked" means that elements of a nucleic acid construct such as an expression cassette are configured so as to perform their usual function.

Thus, regulatory or control sequences (e.g., promoters) operably linked to a nucleotide sequence of interest are capable of effecting expression of the nucleotide sequence of interest. The control sequences need not be contiguous with the nucleotide sequence of interest, so long as they function to direct the expression thereof. Thus, for example, intervening untranslated, yet transcribed, sequences can be present between a promoter and a coding sequence, and the promoter sequence can still be considered "operably linked" to the coding sequence. A nucleotide sequence of the present invention (i.e., encoding a monoclonal antibodies or an antigen binding fragment thereof) can be operably linked to a regulatory sequence, thereby allowing its expression in a cell and/or subject.

The expression cassette also can include a nucleotide sequence for a selectable marker, which can be used to select a transformed organism or cell. As used herein, "selectable marker" means a nucleic acid that when expressed imparts a distinct phenotype to the organism or cell expressing the marker and thus allows such transformed organisms or cells to be distinguished from those that do not have the marker. Such a nucleic acid may encode either a selectable or screenable marker, depending on whether the marker confers a trait that can be selected for by chemical means, such as by using a selective agent (e.g., an antibiotic or the like), or on whether the marker is simply a trait that one can identify through observation or testing, such as by screening. Of course, many examples of suitable selectable markers are known in the art and can be used in the expression cassettes described herein.

As used herein "sequence identity" refers to the extent to which two optimally aligned polynucleotide or polypeptide sequences are invariant throughout a window of alignment of components, e.g., nucleotides or amino acids. "Identity" can be readily calculated by known methods including, but not limited to, those described in: *Computational Molecular Biology* (Lesk, A. M., ed.) Oxford University Press, New York (1988); Biocomputing: Informatics and Genome Projects (Smith, D. W., ed.) Academic Press, New York (1993); *Computer Analysis of Sequence Data, Part I* (Griffin, A. M., and Griffin, H. G., eds.) Humana Press, New Jersey (1994); *Sequence Analysis in Molecular Biology* (von Heinje, G., ed.) Academic Press (1987); and *Sequence Analysis Primer* (Gribskov, M. and Devereux, J., eds.) Stockton Press, New York (1991).

As used herein, the term "substantially identical" or "corresponding to" means that two nucleic acid sequences have at least 60%, 70%, 80% or 90% sequence identity. In some embodiments, the two nucleic acid sequences can have at least 85%, 90%, 95%, 96%, 97%, 98%, 99% or 100% of sequence identity. In some embodiments, the term "substantially identical" or "corresponding to" means the two nucleic acid sequences have at least 60%, 70%, 80% or 90% sequence identity over consecutive nucleotides. In some embodiments, the term "substantially identical" or "corresponding to" means the two nucleic acid sequences have at least 85%, 90%, 95%, 96%, 97%, 98%, 99% sequence identity over consecutive nucleotides.

An "identity fraction" for aligned segments of a test sequence and a reference sequence is the number of identical components which are shared by the two aligned sequences divided by the total number of components in reference sequence segment, i.e., the entire reference sequence or a smaller defined part of the reference sequence.

As used herein, the term "percent sequence identity" or "percent identity" refers to the percentage of identical nucleotides in a linear polynucleotide sequence of a reference ("query") polynucleotide molecule (or its complementary strand) as compared to a test ("subject") polynucleotide molecule (or its complementary strand) when the two sequences are optimally aligned (with appropriate nucleotide insertions, deletions, or gaps totaling less than 20 percent of the reference sequence over the window of comparison). In some embodiments, "percent identity" can refer to the percentage of identical amino acids in an amino acid sequence.

Optimal alignment of sequences for aligning a comparison window are well known to those skilled in the art and may be conducted by tools such as the local homology algorithm of Smith and Waterman, the homology alignment algorithm of Needleman and Wunsch, the search for similarity method of Pearson and Lipman, and optionally by computerized implementations of these algorithms such as GAP, BESTFIT, FASTA, and TFASTA available as part of the GCG® Wisconsin Package® (Accelrys Inc., Burlington, Mass.). Percent sequence identity is represented as the identity fraction multiplied by 100. The comparison of one or more polynucleotide sequences may be to a full-length polynucleotide sequence or a portion thereof, or to a longer polynucleotide sequence. For purposes of this invention "percent identity" may also be determined using BLASTX version 2.0 for translated nucleotide sequences and BLASTN version 2.0 for polynucleotide sequences.

The percent of sequence identity can be determined using the "Best Fit" or "Gap" program of the Sequence Analysis Software Package™ (Version 10; Genetics Computer Group, Inc., Madison, Wis.). "Gap" utilizes the algorithm of Needleman and Wunsch (Needleman and Wunsch, *J Mol. Biol.* 48:443-453, 1970) to find the alignment of two sequences that maximizes the number of matches and minimizes the number of gaps. "BestFit" performs an optimal alignment of the best segment of similarity between two sequences and inserts gaps to maximize the number of matches using the local homology algorithm of Smith and Waterman (Smith and Waterman, *Adv. Appl. Math.*, 2:482-489, 1981, Smith et al., *Nucleic Acids Res.* 11:2205-2220, 1983).

Useful methods for determining sequence identity are also disclosed in Guide to Huge Computers (Martin J. Bishop, ed., Academic Press, San Diego (1994)), and Carillo, H., and Lipton, D., (*Applied Math* 48:1073(1988)). More particularly, preferred computer programs for determining sequence identity include but are not limited to the Basic Local Alignment Search Tool (BLAST) programs which are publicly available from National Center Biotechnology Information (NCBI) at the National Library of Medicine, National Institute of Health, Bethesda, Md. 20894; see BLAST Manual, Altschul et al., NCBI, NLM, NIH; (Altschul et al., *J. Mol. Biol.* 215:403-410 (1990)); version 2.0 or higher of BLAST programs allows the introduction of gaps (deletions and insertions) into alignments; for peptide sequence BLASTX can be used to determine sequence identity; and, for polynucleotide sequence BLASTN can be used to determine sequence identity.

A "subject" of the invention includes any animal experiencing activation of CYP1A and/or the AHR-CYP1A pathway. Such a subject is generally a mammalian subject (e.g., a laboratory animal such as a rat, mouse, guinea pig, rabbit, primates, etc.), a farm or commercial animal (e.g., a cow, horse, goat, donkey, sheep, etc.), or a domestic animal (e.g., cat, dog, ferret, etc.). In some embodiments, the subject is a primate subject, a non-human primate subject (e.g., a chimpanzee, baboon, monkey, gorilla, etc.) or a human. In some embodiments, the subject may be any vertebrate subject, e.g., a zebrafish, a trout, a salmon, or any other fish.

Subjects may be treated for any purpose, such as for eliciting a protective immune response or for eliciting the production of antibodies in that subject, which antibodies can be collected and used for other purposes such as research or diagnostic purposes or for administering to other subjects to produce passive immunity therein, etc.

Subjects include males and/or females of any age, including neonates, juvenile, mature and geriatric subjects. With respect to human subjects, in representative embodiments, the subject can be an infant (e.g., less than about 12 months, 10 months, 9 months, 8 months, 7 months, 6 months, or younger), a toddler (e.g., at least about 12, 18 or 24 months and/or less than about 36, 30 or 24 months), or a child (e.g., at least about 1, 2, 3, 4 or 5 years of age and/or less than about 14, 12, 10, 8, 7, 6, 5, or 4 years of age). In embodiments of the invention, the subject is a human subject that is from about 0 to 3, 4, 5, 6, 9, 12, 15, 18, 24, 30, 36, 48 or 60 months of age, from about 3 to 6, 9, 12, 15, 18, 24, 30, 36, 48 or 60 months of age, from about 6 to 9, 12, 15, 18, 24, 30, 36, 48 or 60 months of age, from about 9 to 12, 15, 18, 24, 30, 36, 48 or 60 months of age, from about 12 to 18, 24, 36, 48 or 60 months of age, from about 18 to 24, 30, 36, 48 or 60 months of age, or from about 24 to 30, 36, 48 or 60 months of age.

The term "administering" or "administration" of a composition of the present invention to a subject includes any route of introducing or delivering to a subject a compound to perform its intended function (e.g., for use as a vaccine antigen). Administration includes self-administration and the administration by another.

A "sample" or "biological sample" of this invention can be any biological material, such as a biological fluid, an extract from a cell, an extracellular matrix isolated from a cell, a cell (in solution or bound to a solid support), a tissue, a tissue homogenate, and the like as are well known in the art.

Compositions

Figure 4:
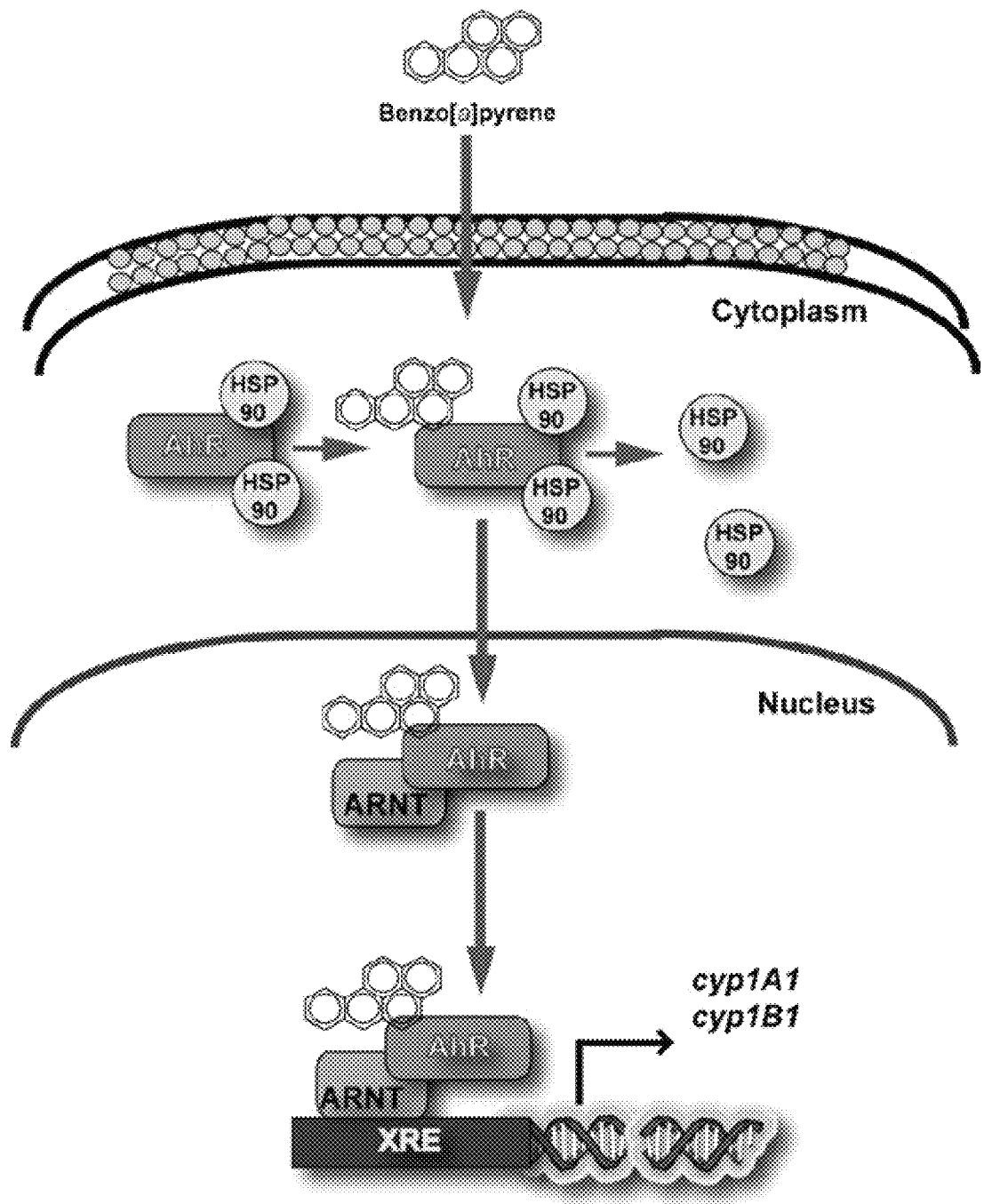
FIG. 4 shows a schematic of the signaling pathway and functioning of AhR and the activation of cyp1A1.
Figure 5:
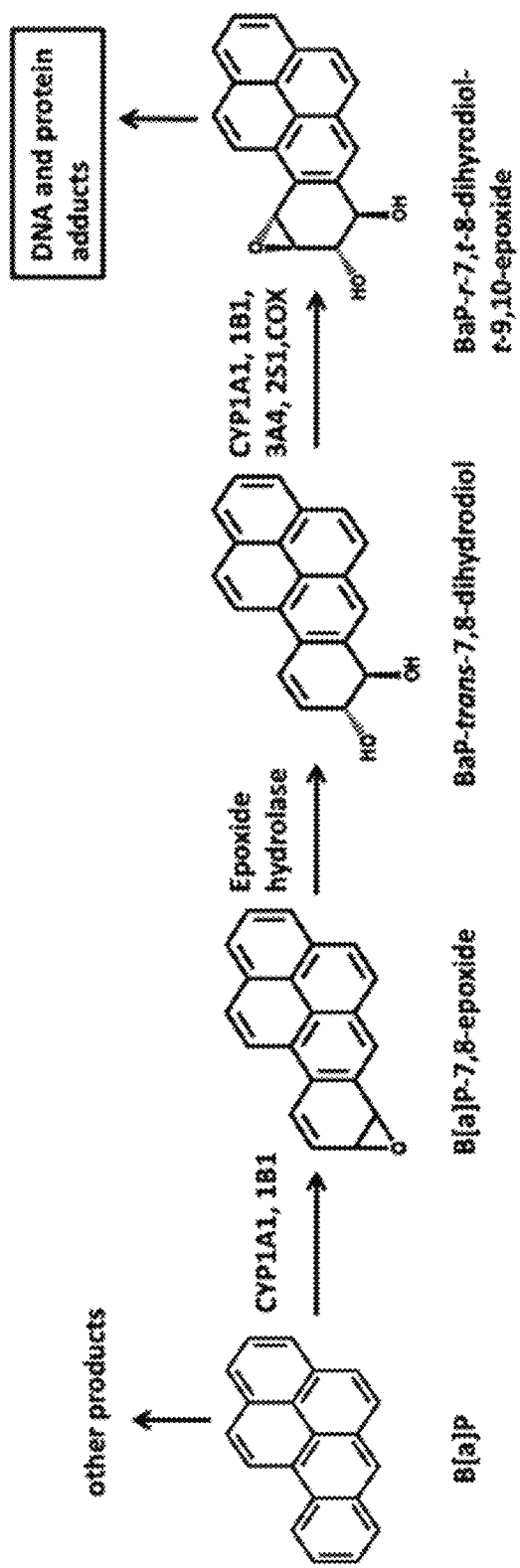
FIG. 5 shows a schematic of the chemical pathway of CYP1A1.

CYP1A is a heme-thiolate enzyme associated with the cytochrome P4501A1 monooxygenase system and is inducible by a wide variety of xenobiotics and endogenous ligands that bind and activate the aryl hydrocarbon receptor (AHR) (FIGS. 4 and 5). The AHR-CYP1A axis is important for detoxification of certain xenobiotics and for homeostatic balance of endogenous sex hormones, amine hormones, vitamins, fatty acids, and phospholipids. The inventors of the present invention generated and described applications of a zebrafish CYP1A-targeted monoclonal antibody (mAb CRC4) that recognizes induced CYP1A across vertebrate taxa, including fish, chicken, mouse, rat, and human. The studies described herein demonstrated that mAb CRC4 targets a highly conserved epitope signature of vertebrate CYP1A. The unique complimentary determining region (CDR) sequences of heavy and light chains were determined, and these Ig sequences allow for the expression of recombinant mAb CRC4, thus superseding the need for long-term hybridoma maintenance. The antibody described herein works well for immunohistochemistry (IHC), as well as whole-mounted IHC such as applicable in zebrafish embryos. Without wishing to be bound to theory, monoclonal antibody CRC4 may be particularly useful for studying the AHR-CYP1A axis in multiple vertebrate species and within the context of Oceans and Human Health research.

Accordingly, the present invention provides a monoclonal antibody or an antigen binding fragment thereof that specifically binds CYP1A1 protein.

The term "antibody" or "antibodies" as used herein refers to all types of immunoglobulins, including IgG, IgM, IgA, IgD, and IgE. The antibody can be monoclonal or polyclonal and can be of any species of origin, including (for example) mouse, rat, rabbit, horse, goat, sheep, camel, or human, or can be a chimeric antibody. See, e.g., Walker et al., Molec. Immunol. 26:403 (1989). The antibodies can be recombinant monoclonal antibodies produced according to the methods disclosed in U.S. Pat. No. 4,474,893 or U.S. Pat. No. 4,816,567. The antibodies can also be chemically constructed according to the method disclosed in U.S. Pat. No. 4,676,980.

Antibody fragments included within the scope of the present invention include, for example, Fab, Fab', F(ab')$_2$, and Fv fragments; domain antibodies, diabodies; vaccibodies, linear antibodies; single-chain antibody molecules; and multispecific antibodies formed from antibody fragments. Such fragments can be produced by known techniques. For example, F(ab')$_2$ fragments can be produced by pepsin digestion of the antibody molecule, and Fab fragments can be generated by reducing the disulfide bridges of the F(ab')$_2$ fragments. Alternatively, Fab expression libraries can be constructed to allow rapid and easy identification of monoclonal Fab fragments with the desired specificity (Huse et al., Science 254:1275 (1989)).

In some embodiments, the monoclonal antibody or an antigen binding fragment thereof that specifically binds CYP1A1 protein conserved sequence SEQ ID NO:15, SEQ ID NO:34 and/or SEQ ID NO:35.

In some embodiments, the monoclonal antibody or an antigen binding fragment thereof that specifically binds CYP1A1 protein comprising, consisting essentially of, and/or consisting of a CDR1, CDR2 and/or a CDR3 sequence that is at least 70% identical (e.g., at least about 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5 or 100% identical) to an amino acid sequence selected from any one of SEQ ID NOs:28-30 and SEQ ID NOs:31-33.

In some embodiments, the monoclonal antibody or antigen binding fragment thereof of the present invention may comprise, consist essentially of, and/or consist of a primary heavy chain or light chain variable sequence that is at least 70% identical (e.g., at least about 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5 or 100% identical) to an amino acid selected from SEQ ID NOs:17 and 20.

In some embodiments, the monoclonal antibody or antigen binding fragment thereof of the present invention may comprise, consist essentially of, and/or consist of a heavy chain or light chain constant sequence that is at least 70% identical (e.g., at least about 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5 or 100% identical) to an amino acid selected from SEQ ID NOs:18 and 21.

In some embodiments, the monoclonal antibody or antigen binding fragment thereof of the present invention may comprise, consist essentially of, and/or consist of a signal peptide that is at least 70% identical (e.g., at least about 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5 or 100% identical) to an amino acid selected from SEQ ID NOs:16 and 19.

In some embodiments of the monoclonal antibody or antigen binding fragment thereof of the present invention, the primary heavy chain or light chain variable sequence may be encoded by a nucleic acid sequence comprising is at least 70% identical (e.g., at least about 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5 or 100% identical) to a nucleic acid sequence selected from any one of SEQ ID NOs:23 and 26.

In some embodiments of the monoclonal antibody or antigen binding fragment thereof of the present invention, the heavy chain or light chain constant sequence may be encoded by a nucleic acid sequence comprising is at least 70% identical (e.g., at least about 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5 or 100% identical) to a nucleic acid sequence selected from any one of SEQ ID NOs:24 and 27.

In some embodiments of the monoclonal antibody or antigen binding fragment thereof of the present invention, the signal peptide sequence may be encoded by a nucleic acid sequence comprising is at least 70% identical (e.g., at least about 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5 or 100% identical) to a nucleic acid sequence selected from any one of SEQ ID NOs:22 and 25.

Antibodies of the invention may be altered or mutated for compatibility with species other than the species in which the antibody was produced. For example, antibodies may be humanized or camelized. Humanized forms of nonhuman (e.g., murine) antibodies are chimeric immunoglobulins, immunoglobulin chains or fragments thereof (such as Fv, Fab, Fab', F(ab')$_2$ or other antigen-binding subsequences of antibodies) which contain minimal sequence derived from non-human immunoglobulin. Humanized antibodies include human immunoglobulins (recipient antibody) in which residues from a complementarity determining region (CDR) of the recipient are replaced by residues from a CDR of a nonhuman species (donor antibody) such as mouse, rat, or rabbit having the desired specificity, affinity, and capacity. In some instances, Fv framework residues of the human immunoglobulin are replaced by corresponding non-human residues. Humanized antibodies may also comprise residues which are found neither in the recipient antibody nor in the imported CDR or framework sequences. In general, the humanized antibody will comprise substantially all of at least one, and typically two, variable domains, in which all or substantially all of the CDR regions correspond to those of a non-human immunoglobulin and all or substantially all of the framework (FR) regions (i.e., the sequences between the CDR regions) are those of a human immunoglobulin consensus sequence. The humanized antibody optimally also will comprise at least a portion of an immunoglobulin constant region (Fc), typically that of a human immunoglobulin (Jones et al., Nature 321:522 (1986); Riechmann et al., Nature, 332:323 (1988); and Presta, Curr Op. Struct. Biol. 2:593 (1992)).

Methods for humanizing non-human antibodies are well known in the art. Generally, a humanized antibody has one or more amino acid residues introduced into it from a source which is non-human. These non-human amino acid residues are often referred to as "import" residues, which are typically taken from an "import" variable domain. Humanization can essentially be performed following the method of Winter and co-workers (Jones et al., Nature 321:522 (1986); Riechmann et al., Nature 332:323 (1988); Verhoeyen et al., Science 239:1534 (1988)), by substituting rodent CDRs or CDR sequences for the corresponding sequences of a human antibody. Accordingly, such "humanized" antibodies are chimeric antibodies (U.S. Pat. No. 4,816,567), wherein substantially less than an intact human variable domain has been substituted by the corresponding sequence from a non-human species. In practice, humanized antibodies are typically human antibodies in which some CDR residues (e.g., all of the CDRs or a portion thereof) and possibly some FR residues are substituted by residues from analogous sites in rodent antibodies.

In some embodiments, the monoclonal antibody or antigen binding fragment thereof of the present invention may be mammalized, e.g., rabbitized, murinized, and/or humanized.

In some embodiments, the monoclonal antibody or antigen binding fragment thereof of the present invention may be chimeric.

In some embodiments, the monoclonal antibody or antigen binding fragment thereof of the present invention may be a fusion protein.

In some embodiments, the monoclonal antibody or antigen binding fragment thereof of the present invention may be an antibody fragment such as a Fab, a Fab', a F(ab)'2, a scFv, a Fv fragment, a nanobody, an intrabody, a VHH, or a minimal recognition unit.

In some embodiments, the monoclonal antibody or antigen binding fragment thereof of the present invention may be a full-length immunoglobulin molecule.

In some embodiments, the monoclonal antibody or antigen binding fragment thereof of the present invention may be a non-immunoglobulin scaffold such as an affibody, an affilin molecule, an AdNectin, a lipocalin mutein, a DARPin, a Knottin, a Kunitz-type domain, an Avimer, a Tetranectin, or a trans-body.

In some embodiments, the monoclonal antibody or antigen binding fragment thereof of the present invention may be monovalent or multivalent, wherein the monoclonal antibody or an antigen binding fragment thereof is optionally bispecific, preferably a diabody, a single-chain diabody, or a tandem scFv.

In some embodiments, the monoclonal antibody or antigen binding fragment thereof of the present invention may be chemically and/or biologically modified (e.g., glycosylated, PEGylated, HESylated, or the like).

It may be desirable to PEGylate the monoclonal antibody or an antigen binding fragment thereof. PEGylation may alter the pharmacodynamic and pharmacokinetic properties of a protein. Polyethylene-glycol (PEG) of an appropriate molecular weight is covalently attached to the protein backbone (see, e.g., PASUT, G. and Veronese, F. State of the art in PEGylation: the great versatility achieved after forty years of research. *J Control Release* 2012, vol. 161, no. 2, p. 461-472). PEGylation may additionally reduce the immunogenicity by shielding the PEGylated protein from the immune system and/or alter its pharmacokinetics by, e.g., increasing the in vivo stability of the monoclonal antibody or an antigen binding fragment thereof, protecting it from proteolytic degradation, extending its half-life time and by altering its biodistribution. Similar effects may be achieved by PEG mimetics, e.g., HESylating or PASylating the antibody. HESylation utilizes hydroxyethyl starch ("HES") derivatives, whereas during PASylation the antibody becomes linked to conformationally disordered polypeptide sequences composed of the amino acids proline, alanine and serine. These PEG mimetics and related compounds are, e.g., described in BINDER, U. and Skerra, A. Half-Life Extension of Therapeutic Proteins via Genetic Fusion to Recombinant PEG Mimetics, in Therapeutic Proteins: Strategies to Modulate Their Plasma Half-Lives. Edited by KONTERMANN, R., Weinheim, Germany: Wiley-VCH, 2012. ISBN: 9783527328499. p. 63-81.

The monoclonal antibody or an antigen binding fragment thereof may include an epitope such as a salvage receptor binding epitope. Such salvage receptor binding epitope typically refers to an epitope of the Fc region of an IgG molecule (e.g., IgG1, IgG2, IgG3, or IgG4) and has the effect of increasing the in vivo half-life of the molecule.

Additionally or alternatively, the monoclonal antibody or an antigen binding fragment thereof is labelled with or conjugated to a second moiety which ascribes ancillary functions following target binding. The second moiety may, e.g., have an additional immunological effector function, be effective in drug targeting or useful for detection, without being limited thereto. The second moiety can, e.g., be chemically linked or fused genetically to the monoclonal antibody or an antigen binding fragment thereof using known methods in the art.

Molecules which may serve as second moiety include, without being limited to, a radionuclide, also called a radioisotope, an apoenzyme, an enzyme, a co-factor, a peptide moiety such as a HIS-tag, a protein, a carbohydrate such as a mannose-6-phosphate tag, a fluorophore such as fluorescein isothiocyanate (FITC), phycoerythrin, a green/blue/red or other fluorescent protein, allophycocyanin (APC), a chromophore, a vitamin such as biotin, a chelator, an antimetabolite such as methotrexate, a liposome, a toxin such as a cytotoxic drug, or a radiotoxin. Illustrative examples of a radionuclide are $^{35}S$, $^{32}P$, $^{14}C$, $^{18}F$, and $^{125}I$. Examples of suitable enzymes include, but are not limited to, alkaline phosphatase, horseradish peroxidase, beta-galactosidase and angiogenin. An illustrative example of a suitable protein is a lectin. Examples of suitable cytotoxic drugs include, but are not limited to, taxol, gramicidin D and colchicine.

A labeled monoclonal antibody or an antigen binding fragment thereof is particularly useful for in vitro and in vivo detection or diagnostic purposes. For example, a monoclonal antibody or an antigen binding fragment thereof labelled with a suitable radioisotope, enzyme, fluorophore or chromophore can be detected by radioimmunoassay (RIA), enzyme-linked immunosorbent assay (ELISA), or flow cytometry-based single cell analysis (e.g., FACS analysis), respectively. Similarly, the nucleic acids and/or vectors disclosed herein can be used for detection or diagnostic purposes, e.g., using labelled fragments thereof as probes in hybridization assays. Labelling protocols may, e.g., be found in JOHNSON, I. and Spence, M. T. Z. Molecular Probes Handbook, A Guide to Fluorescent Probes and Labeling Technologies. Life Technologies, 2010. ISBN: 0982927916.

It is to be understood that the outlined above also applies to T-bodies.

Human antibodies can also be produced using various techniques known in the art, including phage display libraries (Hoogenboom and Winter, J. Mol. Biol. 227:381 (1991); Marks et al., J. Mol. Biol. 222:581 (1991)). The techniques of Cole et al. and Boemer et al. are also available for the preparation of human monoclonal antibodies (Cole et al., Monoclonal Antibodies and Cancer Therapy, Alan R. Liss, p. 77 (1985) and Boemer et al., J. Immunol. 147:86 (1991)). Similarly, human antibodies can be made by introducing human immunoglobulin loci into transgenic animals, e.g., mice in which the endogenous immunoglobulin genes have been partially or completely inactivated. Upon challenge, human antibody production is observed, which closely resembles that seen in humans in all respects, including gene rearrangement, assembly, and antibody repertoire. This approach is described, for example, in U.S. Pat. Nos. 5,545,807; 5,545,806; 5,569,825; 5,625,126; 5,633,425; 5,661, 016, and in the following scientific publications: Marks et al., Bio/Technology 10:779 (1992); Lonberg et al., Nature 368: 856 (1994); Morrison, Nature 368:812 (1994); Fishwild et al., Nature Biotechnol. 14:845 (1996); Neuberger, Nature Biotechnol. 14:826 (1996); Lonberg and Huszar, Intern. Rev. Immunol. 13:65 (1995).

Polyclonal antibodies used to carry out the present invention can be produced by immunizing a suitable animal (e.g., rabbit, goat, etc.) with an antigen to which a monoclonal antibody to the target binds, collecting immune serum from the animal, and separating the polyclonal antibodies from the immune serum, in accordance with known procedures. The polynucleotide sequence and polypeptide sequence of tau is known in the art and can be found in sequence databases such as GenBank. Examples of GenBank sequences include those Accession Numbers provided in Table 1, incorporated herein by reference in their entirety. Monoclonal antibodies used to carry out the present invention can be produced in a hybridoma cell line according to the technique of Kohler and Milstein, *Nature* 265:495 (1975). For example, a solution containing the appropriate antigen can be injected into a mouse and, after a sufficient time, the mouse sacrificed and spleen cells obtained. The spleen cells are then immortalized by fusing them with myeloma cells or with lymphoma cells, typically in the presence of polyethylene glycol, to produce hybridoma cells. The hybridoma cells are then grown in a suitable medium and the supernatant screened for monoclonal antibodies having the desired specificity. Monoclonal Fab fragments can be produced in *E. coli* by recombinant techniques known to those skilled in the art. See, e.g., Huse, *Science* 246:1275 (1989). Antibodies specific to the target polypeptide can also be obtained by phage display techniques known in the art.

Various immunoassays can be used for screening to identify antibodies having the desired specificity for CYP1A. Numerous protocols for competitive binding or immunoradiometric assays using either polyclonal or monoclonal antibodies with established specificity are well known in the art. Such immunoassays typically involve the measurement of complex formation between an antigen and its specific antibody (e.g., antigen/antibody complex formation). A two-site, monoclonal-based immunoassay utilizing monoclonal antibodies reactive to two non-interfering epitopes on the polypeptides or peptides of this invention can be used as well as a competitive binding assay.

Antibodies can be conjugated to a solid support (e.g., beads, plates, slides or wells formed from materials such as latex or polystyrene) in accordance with known techniques. Antibodies can likewise be conjugated to detectable groups such as radiolabels (e.g., $^{15}S$, $^{125}I$, $^{131}I$), enzyme labels (e.g., horseradish peroxidase, alkaline phosphatase), and fluorescence labels (e.g., fluorescein) in accordance with known techniques. Determination of the formation of an antibody/antigen complex in the methods of this invention can be by detection of, for example, precipitation, agglutination, flocculation, radioactivity, color development or change, fluorescence, luminescence, etc., as is well known in the art.

Another aspect of the invention relates to an isolated nucleic acid molecule comprising, consisting essentially of, or consisting of a sequence encoding the monoclonal antibody or an antigen binding fragment thereof of the present invention.

Also provided is a vector comprising the monoclonal antibody or an antigen binding fragment thereof, and/or a nucleic acid molecule of the present invention. Suitable vectors include, but are not limited to, a plasmid, phage, viral vector (e.g., an AAV vector, an adenovirus vector, a herpesvirus vector, an alphavirus vector, or a baculovirus vector), bacterial artificial chromosome (BAC), or yeast artificial chromosome (YAC). For example, the nucleic acid can comprise, consist of, or consist essentially of an AAV vector comprising a 5' and/or 3' terminal repeat (e.g., 5' and/or 3' AAV terminal repeat). In some embodiments, the vector is a viral vector, e.g., a parvovirus vector, e.g., an AAV vector, e.g., an AAV8 or AAV9 vector. The viral vector may further comprise a nucleic acid comprising a recombinant viral template, wherein the nucleic acid is encapsidated by the parvovirus capsid. The invention further provides a recombinant parvovirus particle (e.g., a recombinant AAV particle) comprising the polynucleotides of the invention.

Also provided is a host cell comprising the nucleic acid molecule and/or the vector of the present invention.

Another aspect of the present invention provides a composition comprising the monoclonal antibody or antigen binding fragment thereof, the nucleic acid molecule, the vector and/or the host cell of the present invention. In some embodiments, the composition may further comprise a suitable carrier, diluent, or excipient. In some embodiments, the composition may be a pharmaceutical composition and the carrier may be a pharmaceutically acceptable carrier, diluent, or excipient.

By "pharmaceutically acceptable" it is meant a material that is not biologically or otherwise undesirable, i.e., the material can be administered to a subject without causing any undesirable biological effects such as toxicity.

The formulations of the invention can optionally comprise medicinal agents, pharmaceutical agents, carriers, adjuvants, dispersing agents, diluents, and the like.

One embodiment of the invention is a composition including an isolated polynucleotide sequence encoding a monoclonal antibody or an antigen binding fragment thereof to acetylated tau or a functional fragment thereof, a plasmid or vector containing the isolated polynucleotide sequence, or a transfected cell containing the plasmid or vector or the isolated polynucleotide sequence and a suitable carrier, diluent, or excipient, and optionally a pharmaceutically acceptable carrier, diluent, or excipient. In one embodiment, the composition is in a form suitable for parenteral, oral, rectal, systemic, urogenital, topical, intravitreal, intraocular, otic, intranasal, dermal, sublingual, or buccal administration.

The monoclonal antibody or an antigen binding fragment thereof of the invention can be formulated for administration in a pharmaceutical carrier in accordance with known techniques. See, e.g., Remington, The Science And Practice of Pharmacy (23rd Ed. 2020). In the manufacture of a pharmaceutical formulation according to the invention, the monoclonal antibody or an antigen binding fragment thereof (including the physiologically acceptable salts thereof) is typically admixed with, inter alia, an acceptable carrier. The carrier can be a solid or a liquid, or both, and is preferably formulated with monoclonal antibody or an antigen binding fragment thereof as a unit-dose formulation, for example, a tablet, which can contain from 0.01 or 0.5% to 95% or 99% by weight of the monoclonal antibody or an antigen binding fragment thereof. One or more monoclonal antibody or an antigen binding fragment thereof can be incorporated in the formulations of the invention, which can be prepared by any of the well-known techniques of pharmacy.

A further aspect of the invention is a method of treating subjects in vivo, comprising administering to a subject a pharmaceutical composition comprising a monoclonal antibody or an antigen binding fragment thereof of the invention in a pharmaceutically acceptable carrier, wherein the pharmaceutical composition is administered in a therapeutically effective amount. Administration of the monoclonal antibody or an antigen binding fragment thereof of the present invention to a human subject or an animal in need thereof can be by any means known in the art for administering compounds.

Non-limiting examples of formulations of the invention include those suitable for oral, rectal, buccal (e.g., sublingual), vaginal, parenteral (e.g., subcutaneous, intramuscular including skeletal muscle, cardiac muscle, diaphragm muscle and smooth muscle, intradermal, intravenous, intraperitoneal), topical (i.e., both skin and mucosal surfaces, including airway surfaces), intranasal, transdermal, intraarticular, intracranial, intrathecal, and inhalation administration, administration to the liver by intraportal delivery, as well as direct organ injection (e.g., into the liver, into a limb, into the brain or spinal cord for delivery to the central nervous system, into the pancreas, or into a tumor or the tissue surrounding a tumor). The most suitable route in any given case will depend on the nature and severity of the condition being treated and on the nature of the particular compound which is being used. In some embodiments, it may be desirable to deliver the formulation locally to avoid any side effects associated with systemic administration. For example, local administration can be accomplished by direct injection at the desired treatment site, by introduction intravenously at a site near a desired treatment site (e.g., into a vessel that feeds a treatment site). In some embodiments, the formulation can be delivered locally to ischemic tissue. In certain embodiments, the formulation can be a slow release formulation, e.g., in the form of a slow release depot.

For injection, the carrier will typically be a liquid, such as sterile pyrogen-free water, pyrogen-free phosphate-buffered saline solution, bacteriostatic water, or Cremophor EL[R] (BASF, Parsippany, N.J.). For other methods of administration, the carrier can be either solid or liquid.

For oral administration, the compound can be administered in solid dosage forms, such as capsules, tablets, and powders, or in liquid dosage forms, such as elixirs, syrups, and suspensions. Compounds can be encapsulated in gelatin capsules together with inactive ingredients and powdered carriers, such as glucose, lactose, sucrose, mannitol, starch, cellulose or cellulose derivatives, magnesium stearate, stearic acid, sodium saccharin, talcum, magnesium carbonate and the like. Examples of additional inactive ingredients that can be added to provide desirable color, taste, stability, buffering capacity, dispersion or other known desirable features are red iron oxide, silica gel, sodium lauryl sulfate, titanium dioxide, edible white ink and the like. Similar diluents can be used to make compressed tablets. Both tablets and capsules can be manufactured as sustained release products to provide for continuous release of medication over a period of hours. Compressed tablets can be sugar coated or film coated to mask any unpleasant taste and protect the tablet from the atmosphere, or enteric-coated for selective disintegration in the gastrointestinal tract. Liquid dosage forms for oral administration can contain coloring and flavoring to increase patient acceptance.

Formulations suitable for buccal (sub-lingual) administration include lozenges comprising the compound in a flavored base, usually sucrose and acacia or tragacanth; and pastilles comprising the compound in an inert base such as gelatin and glycerin or sucrose and acacia.

Formulations of the present invention suitable for parenteral administration comprise sterile aqueous and non-aqueous injection solutions of the compound, which preparations are preferably isotonic with the blood of the intended recipient. These preparations can contain anti-oxidants, buffers, bacteriostats and solutes which render the formulation isotonic with the blood of the intended recipient. Aqueous and non-aqueous sterile suspensions can include suspending agents and thickening agents. The formulations can be presented in unit/dose or multi-dose containers, for example sealed ampoules and vials, and can be stored in a freeze-dried (lyophilized) condition requiring only the addition of the sterile liquid carrier, for example, saline or water-for-injection immediately prior to use.

Extemporaneous injection solutions and suspensions can be prepared from sterile powders, granules and tablets of the kind previously described. For example, in one aspect of the present invention, there is provided an injectable, stable, sterile composition comprising a compound of the invention, in a unit dosage form in a sealed container. The compound or salt is provided in the form of a lyophilizate which is capable of being reconstituted with a suitable pharmaceutically acceptable carrier to form a liquid composition suitable for injection thereof into a subject. The unit dosage form typically comprises from about 10 mg to about 10 grams of the compound or salt. When the compound or salt is substantially water-insoluble, a sufficient amount of emulsifying agent which is pharmaceutically acceptable can be employed in sufficient quantity to emulsify the compound or salt in an aqueous carrier. One such useful emulsifying agent is phosphatidyl choline.

Formulations suitable for rectal administration are preferably presented as unit dose suppositories. These can be prepared by admixing the compound with one or more conventional solid carriers, for example, cocoa butter, and then shaping the resulting mixture.

Formulations suitable for topical application to the skin preferably take the form of an ointment, cream, lotion, paste, gel, spray, aerosol, or oil. Carriers which can be used include petroleum jelly, lanoline, polyethylene glycols, alcohols, transdermal enhancers, and combinations of two or more thereof.

Formulations suitable for transdermal administration can be presented as discrete patches adapted to remain in intimate contact with the epidermis of the recipient for a prolonged period of time. Formulations suitable for transdermal administration can also be delivered by iontophoresis (see, for example, Tyle, *Pharm. Res.* 3:318 (1986)) and typically take the form of an optionally buffered aqueous solution of the compound. Suitable formulations comprise citrate or bis\tris buffer (pH 6) or ethanol/water and contain from 0.1 to 0.2M of the compound.

The compound can alternatively be formulated for nasal administration or otherwise administered to the lungs of a subject by any suitable means, e.g., administered by an aerosol suspension of respirable particles comprising the compound, which the subject inhales. The respirable particles can be liquid or solid. The term "aerosol" includes any gas-borne suspended phase, which is capable of being inhaled into the bronchioles or nasal passages. Specifically, aerosol includes a gas-borne suspension of droplets, as can be produced in a metered dose inhaler or nebulizer, or in a mist sprayer. Aerosol also includes a dry powder composition suspended in air or other carrier gas, which can be delivered by insufflation from an inhaler device, for example. See Ganderton & Jones, *Drug Delivery to the Respiratory Tract*, Ellis Horwood (1987); Gonda (1990) *Critical Reviews in Therapeutic Drug Carrier Systems* 6:273-313; and Raeburn et al., *J. Pharmacol. Toxicol. Meth.* 27:143 (1992). Aerosols of liquid particles comprising the compound can be produced by any suitable means, such as with a pressure-driven aerosol nebulizer or an ultrasonic nebulizer, as is known to those of skill in the art. See, e.g., U.S. Pat. No. 4,501,729. Aerosols of solid particles comprising the compound can likewise be produced with any solid particulate medicament aerosol generator, by techniques known in the pharmaceutical art.

Alternatively, one can administer the compound in a local rather than systemic manner, for example, in a depot or sustained-release formulation.

Further, the present invention provides liposomal formulations of the compounds disclosed herein and salts thereof. The technology for forming liposomal suspensions is well known in the art. When the compound or salt thereof is an aqueous-soluble salt, using conventional liposome technology, the same can be incorporated into lipid vesicles. In such an instance, due to the water solubility of the compound or salt, the compound or salt will be substantially entrained within the hydrophilic center or core of the liposomes. The lipid layer employed can be of any conventional composition and can either contain cholesterol or can be cholesterol-free. When the compound or salt of interest is water-insoluble, again employing conventional liposome formation technology, the salt can be substantially entrained within the hydrophobic lipid bilayer which forms the structure of the liposome. In either instance, the liposomes which are produced can be reduced in size, as through the use of standard sonication and homogenization techniques.

The liposomal formulations containing the compounds disclosed herein or salts thereof, can be lyophilized to produce a lyophilizate which can be reconstituted with a pharmaceutically acceptable carrier, such as water, to regenerate a liposomal suspension.

In the case of water-insoluble compounds, a pharmaceutical composition can be prepared containing the water-insoluble compound, such as for example, in an aqueous base emulsion. In such an instance, the composition will contain a sufficient amount of pharmaceutically acceptable emulsifying agent to emulsify the desired amount of the compound. Particularly useful emulsifying agents include phosphatidyl cholines and lecithin.

In particular embodiments, the compound is administered to the subject in a therapeutically effective amount, as that term is defined above. Dosages of pharmaceutically active compounds can be determined by methods known in the art, see, e.g., *Remington's Pharmaceutical Sciences* (Maack Publishing Co., Easton, Pa). The therapeutically effective dosage of any specific compound will vary somewhat from compound to compound, and patient to patient, and will depend upon the condition of the patient and the route of delivery. As a general proposition, a dosage from about 0.001 to about 50 mg/kg will have therapeutic efficacy, with all weights being calculated based upon the weight of the compound, including the cases where a salt is employed. Toxicity concerns at the higher level can restrict intravenous dosages to a lower level such as up to about 10 mg/kg, with all weights being calculated based upon the weight of the compound, including the cases where a salt is employed. A dosage from about 10 mg/kg to about 50 mg/kg can be employed for oral administration. Typically, a dosage from about 0.5 mg/kg to 5 mg/kg can be employed for intramuscular injection. Particular dosages are about 1 μmol/kg to 50 μmol/kg, and more particularly to about 22 μmol/kg and to 33 μmol/kg of the compound for intravenous or oral administration, respectively.

In particular embodiments of the invention, more than one administration (e.g., two, three, four, or more administrations) can be employed over a variety of time intervals (e.g., hourly, daily, weekly, monthly, etc.) to achieve therapeutic effects.

The present invention finds use in veterinary and medical applications. Suitable subjects include both avians and mammals, with mammals being preferred. The term "avian" as used herein includes, but is not limited to, chickens, ducks, geese, quail, turkeys, and pheasants. The term "mammal" as used herein includes, but is not limited to, humans, bovines, ovines, caprines, equines, felines, canines, lagomorphs, etc. Human subjects include neonates, infants, juveniles, and adults. In other embodiments, the subject is an animal model of an environmental stress, homeostasis dysregulation, cancer, or other AHR-CYP1A activating ligand.

Methods

One aspect of the present invention provides a method of treating, preventing, or delaying progression of a disease or condition associated with AHR and/or CYP1A in a subject in need thereof, the method comprising administering to the subject an effective amount of the pharmaceutical composition of the present invention, thereby treating the disease or condition.

Another aspect of the present invention provides a method of modulating (e.g., modifying and/or controlling) homeostasis in a subject affected by or at risk of a disease or condition associated with AHR and/or CYP1A, the method comprising administering to the subject an effective amount of the pharmaceutical composition of the present invention. The homeostasis may be whole-body homeostasis and/or any particular organ system. Whole-body homeostasis may be measured by vital signs such as blood pressure, core body temperature, heart rate, respiratory rate, and oxygen saturation. In some embodiments, the homeostasis is gut homeostasis. In some embodiments, gut homeostasis can be measured, for example, by the presence, absence or change in the presence of one or more microbial species (see, e.g., Lee et al., Science, 2022 July; 77(6601):eabp9960; doi:10.1126/science.abp9960); increase in inflammatory markers and/or intestinal permeability (see, e.g., Wells et al., Am J Physiol Gastrointest Liver Physiol. 2017 Mar. 1; 312(3):G171-G193).

In some embodiments, the disease or condition associated with AHR and/or CYP1A may be cancer, smoking or a sequela thereof (e.g., lung disease, lung cancer, throat cancer, fibrosis, and the like), dysregulation of gut homeostasis (e.g., inflammatory bowel disease, irritable bowel syndrome), metabolic disease, metabolic dysregulation, dysregulation of sex hormones, environmental stress, environmental contaminant (e.g., air pollution, water pollution), immune suppression, reproductive disorders, developmental disorders, or any combination thereof.

Another aspect of the present invention provides a method of reducing adverse effects of exposure to an environmental stressor in a subject in need thereof, the method comprising administering to the subject an effective amount of the pharmaceutical composition of the present invention, wherein the environmental stress stimulates AHR and/or CYP1A signaling (e.g., the AHR-CYP1A axis).

In some embodiments, the environmental stressor may one or more AHR ligands. Non-limiting examples of an AHR ligand include halogenated aromatic hydrocarbons (HAH), polycyclic aromatic hydrocarbons (PAH), flavonoids, resveratrol, tryptophan or a derivative thereof (e.g., FICZ (6-formylindolo[3,2-b]carbazole)), and other xenobiotics.

Also provided herein is a monoclonal antibody or antigen binding fragment thereof, nucleic acid molecule, vector, host cell, or composition of the present invention, for use in the treatment, prevention, or delay of progression of a disease or condition associated with AHR and/or CYP1A.

Also provided herein is a monoclonal antibody or antigen binding fragment thereof, nucleic acid molecule, vector, host cell, or composition of the present invention, for use in modulating homeostasis in a subject affected by or at risk of a disease or condition associated with AHR and/or CYP1A.

Also provided herein is a monoclonal antibody or antigen binding fragment thereof, nucleic acid molecule, vector, host cell, or composition of the present invention, (i) for use as a medicament, in particular in the treatment of a disease or condition associated with a AHR and/or CYP1A; (ii) for use as a medicament, in particular in modulating homeostasis in a subject affected by or at risk of a disease or condition associated with AHR and/or CYP1A; (iii) for use as a medicament, in particular in reducing adverse effects of exposure to an environmental stressor in a subject in need thereof; (iv) for use in diagnostics; and/or (v) for detection purposes.

Any suitable method known in the art may be used to produce the monoclonal antibody or antigen binding fragment thereof of the invention.

As one aspect, the invention provides methods of producing the monoclonal antibody or an antigen binding product thereof comprising cultivating a host cell comprising a nucleic acid encoding the monoclonal antibody or an antigen binding product thereof, thereby allowing the monoclonal antibody or an antigen binding fragment thereof to be expressed, recovering the monoclonal antibody or an antigen binding fragment thereof, and optionally purifying the monoclonal antibody or an antigen binding fragment thereof.

As another aspect, the invention provides methods of producing the monoclonal antibody or an antigen binding product thereof comprising contacting a cell-free expression system with a nucleic acid product template, the nucleic acid product template encoding the monoclonal antibody or an antigen binding fragment thereof, allowing transcription and translation of the nucleic acid product template to occur, thereby allowing a reaction mixture to be formed, recovering the monoclonal antibody or an antigen binding fragment thereof from the reaction mixture, and optionally purifying the monoclonal antibody or an antigen binding fragment thereof.

As another aspect, the invention provides a method of diagnosing a disease or disorder associated with activated CYP1A in a subject, the method comprising: (i) contacting a biological sample from the subject with the monoclonal antibody or antigen binding fragment thereof of the present invention under conditions permissive for specific binding of the monoclonal antibody or antigen binding fragment thereof to CYP1A, and (ii) detecting whether a complex between the monoclonal antibody or antigen binding fragment thereof and CYP1A is formed;

wherein detection of the complex indicates the presence of activated CYP1A in the subject.

The biological sample may be of any vertebrate origin. In some embodiments, the biological sample is of mammalian origin. In some embodiments, the biological sample is of human origin. In some embodiments, the biological sample is at least one of a blood sample, a urine sample, a cerebrospinal fluid sample, a biopsy sample, and a lymph sample.

In some embodiments, the method may be a method for selecting subjects eligible for therapy with the monoclonal antibody or antigen binding fragment thereof of the present invention.

The antibody or antigen binding fragment compositions of the present invention may be administered via any pharmaceutically acceptable routes of administration. Systemic administration, methods of administering to a subject via the bloodstream, is contemplated in accordance with the invention. Localized routes of administration, e.g. administration of the composition at the site where the desired action is required, are also contemplated. Routes of administration include enteral, parenteral and inhalation routes.

Example routes of administration include intranasal, intramuscular, intratracheal, intrathecal, subcutaneous, intradermal, topical, intravenous, intraarterial, rectal, nasal, oral, and other enteral and parenteral routes of administration. The routes of administration can be combined, if desired, or adjusted depending on the desired effect and composition utilized. In an embodiment, the route of administration is parenteral administration, including intravenous, intramuscular, intradermal, intraperitoneal, rectal, intranasal, urogenital, otic, dermal, topical, buccal, vaginal, nasal, sublingual, subcutaneous, spinal cord administration or other parenteral routes of administration, for example by injection or infusion, e.g. intravenously, intramuscularly, intraarterial, subepidural intraperitoneal, intracapsular, intraocular, intracardiac, intradermal, transtracheal, subcutaneous, subepithelial, subcapsular, submucosal, intraspinal, epidural and intrathoracic injections and infusions.

Enteral administration, including oral and rectal administration is contemplated. Administration of the compounds of the present invention may be carried out by any form of oral administration by a tablet, a pill, a capsule, a granule, a powder, a solution, or the like. In some embodiments of the presently-disclosed subject matter, the antibody, or antigen binding fragment thereof, can be provided in an ingestible vehicle, appropriate for administration, particularly oral administration, to the subject. Any ingestible vehicle appropriate for delivering an antibody to a subject as is known to those of ordinary skill in the art can be used. Example delivery of antibodies by oral administration can include ligand-conjugated lipid particles. See, e.g., Shreya et al., AAPS ParmSciTech (2019) 20:15; doi:10.1208/s12249-018-1262-2. Similarly, compositions comprising the antibody, or antigen binding fragment thereof, can be provided for rectal administration in a suppository.

A further aspect of the invention is a method of treating subjects in vivo, comprising administering to a subject a pharmaceutical composition comprising a monoclonal antibody or an antigen binding fragment thereof. Administration of the monoclonal antibody or an antigen binding fragment thereof of the present invention to a human subject or an animal in need thereof can be by any means known in the art for administering compounds.

The antibodies of the present invention can optionally be delivered in conjunction with other therapeutic agents. The additional therapeutic agents can be delivered concurrently with the antibodies of the invention. As used herein, the word "concurrently" means sufficiently close in time to produce a combined effect (that is, concurrently can be simultaneously, or it can be two or more events occurring within a short time period before or after each other).

In particular embodiments, the compound is administered to the subject in a therapeutically effective amount, as that term is defined above. Dosages of pharmaceutically active compounds can be determined by methods known in the art, see, e.g., *Remington's Pharmaceutical Sciences* (Maack Publishing Co., Easton, Pa). The therapeutically effective dosage of any specific compound will vary somewhat from compound to compound, and patient to patient, and will depend upon the condition of the patient and the route of delivery. As a general proposition, a dosage from about 0.001 to about 50 mg/kg will have therapeutic efficacy, with all weights being calculated based upon the weight of the compound, including the cases where a salt is employed. Toxicity concerns at the higher level can restrict intravenous dosages to a lower level such as up to about 10 mg/kg, with all weights being calculated based upon the weight of the compound, including the cases where a salt is employed. A dosage from about 10 mg/kg to about 50 mg/kg can be employed for oral administration. Typically, a dosage from about 0.5 mg/kg to 5 mg/kg can be employed for intramuscular injection. Particular dosages are about 1 µmol/kg to 50 µmol/kg, and more particularly to about 22 µmol/kg and to 33 µmol/kg of the compound for intravenous or oral administration, respectively.

In particular embodiments of the invention, more than one administration (e.g., two, three, four, or more administrations) can be employed over a variety of time intervals (e.g., hourly, daily, weekly, monthly, etc.) to achieve therapeutic effects.

The present invention finds use in veterinary and medical applications. Suitable subjects include both avians and mammals, with mammals being preferred. The term "avian" as used herein includes, but is not limited to, chickens, ducks, geese, quail, turkeys, and pheasants. The term "mammal" as used herein includes, but is not limited to, humans, bovines, ovines, caprines, equines, felines, canines, lagomorphs, etc. Human subjects include neonates, infants, juveniles, and adults. In some embodiments, the subject is an animal research model, e.g., a mouse, a rabbit, a rat, a zebrafish, etc.

A monoclonal antibody or an antigen binding fragment thereof as disclosed herein may be used for detection or diagnostic purposes in vivo and/or in vitro. For example, a wide range of immunoassays involving antibodies for detecting the expression in specific cells or tissues are known to the skilled person.

For such applications the monoclonal antibody or an antigen binding fragment thereof, e.g. the antibody disclosed herein, may include a detectable label. In some embodiments the monoclonal antibody or an antigen binding fragment thereof disclosed herein does not include a detectable label. As an illustrative example, an unlabelled antibody may be used and detected by a secondary antibody specifically binding to an epitope on the monoclonal antibody or an antigen binding fragment thereof, e.g. antibody, described herein.

In some embodiments the monoclonal antibody or an antigen binding fragment thereof is coupled to one or more substances that can be recognized by a detector substance. As an example, the monoclonal antibody or an antigen binding fragment thereof may be covalently linked to biotin, which can be detected by means of its capability to bind to streptavidin.

Likewise, the nucleic acids and/or vectors disclosed herein can be used for detection or diagnostic purposes, e.g., by using labelled fragments thereof as probes in hybridization assays.

In certain embodiments, any of the molecules provided herein, in particular the antibody, is useful for detecting the presence of acetylated tau in a sample, preferably a sample of biological origin. The term "detecting" encompasses quantitative and/or qualitative detection. In certain embodiments a biological sample includes a cell or tissue from human patients. Non limiting examples of biological samples include blood, urine, cerebrospinal fluid, biopsy, lymph and/or non-blood tissues.

A further aspect of the invention relates to kits for use in the methods of the invention. The kit can comprise the antibody of the invention in a form suitable for administration to a subject or in a form suitable for compounding into a formulation. The kit can further comprise other therapeutic agents, carriers, buffers, containers, devices for administration, and the like. The kit can further comprise labels and/or instructions, for treatment of a disorder. Such labeling and/or instructions can include, for example, information concerning the amount, frequency and method of administration of the antibody.

The kit can comprise the antibody, or antigen binding fragment thereof, of the invention in a form suitable for diagnostic use, or suitable for compounding into a diagnostic or detection formulation. The detection compositions can be formulated for administration to a subject or in vitro use with a biological sample. The kit can further comprise other labeling agents, solid supports, carriers, buffers, containers, devices for administration, and the like. The kit can further comprise labels and/or instructions, for detection of a disorder. Such labeling and/or instructions can include, for example, information concerning measurement amount, background corrections, and method of administration of the antibody.

In some embodiments, the present invention may be as defined in any one of the following numbered paragraphs.

1. A monoclonal antibody or an antigen binding fragment thereof that specifically binds CYP1A1 protein.
2. A monoclonal antibody or an antigen binding fragment thereof that specifically binds CYP1A1 protein conserved sequence SEQ ID NO:15, SEQ ID NO:34 and/or SEQ ID NO:35.
3. A monoclonal antibody or an antigen binding fragment thereof that specifically binds CYP1A1 protein comprising a CDR1, CDR2 and/or a CDR3 sequence that is at least 90% identical to an amino acid sequence selected from any one of SEQ ID NOs:28-30 and SEQ ID Nos:31-33.
4. The monoclonal antibody or antigen binding fragment thereof of any one of paragraphs 1-3, comprising a primary heavy chain or light chain variable sequence that is at least 90% identical to an amino acid selected from SEQ ID NOs:17 and 20.
5. The monoclonal antibody or antigen binding fragment thereof of any one of paragraphs 1-4, comprising a heavy chain or light chain constant sequence that is at least 90% identical to an amino acid selected from SEQ ID NOs:18 and 21.
6. The monoclonal antibody or antigen binding fragment thereof of any one of paragraphs 1-5, comprising a signal peptide that is at least 90% identical to an amino acid selected from SEQ ID NOs:16 and 19.
7. The monoclonal antibody or antigen binding fragment thereof of paragraph 4, wherein the primary heavy chain or light chain variable sequence is encoded by a nucleic acid sequence comprising is at least 90% identical to a nucleic acid sequence selected from any one of SEQ ID NOs:23 and 26.
8. The monoclonal antibody or antigen binding fragment thereof of paragraph 5, wherein the heavy chain or light chain constant sequence is encoded by a nucleic acid sequence comprising is at least 90% identical to a nucleic acid sequence selected from any one of SEQ ID NOs:24 and 27.
9. The monoclonal antibody or antigen binding fragment thereof of paragraph 6, wherein the signal peptide sequence is encoded by a nucleic acid sequence comprising is at least 90% identical to a nucleic acid sequence selected from any one of SEQ ID NOs:22 and 25.
10. The monoclonal antibody or antigen binding fragment thereof of any one of paragraphs 1 to 9, being humanized.
11. The monoclonal antibody or antigen binding fragment thereof of any one of paragraphs 1 to 10, being chimeric.
12. The monoclonal antibody or antigen binding fragment thereof of any one of paragraphs 1 to 11, being: (i) an antibody fragment such as a Fab, a Fab', a F(ab)'2, a scFv, a Fv fragment, a nanobody, an intrabody, a VHH, or a minimal recognition unit; (ii) a full-length immunoglobulin molecule; or (iii) a non-immunoglobulin scaffold such as an affibody, an affilin molecule, an AdNectin, a lipocalin mutein, a DARPin, a Knottin, a Kunitz-type domain, an Avimer, a Tetranectin, or a trans-body.
13. The monoclonal antibody or antigen binding fragment thereof of any one of paragraphs 1 to 12, being monovalent or multivalent, wherein the monoclonal antibody or an antigen binding fragment thereof is optionally bispecific, preferably a diabody, a single-chain diabody, or a tandem scFv.
14. The monoclonal antibody or antigen binding fragment thereof of any one of paragraphs 1 to 13, being chemically or biologically modified (e.g., glycosylated, PEGylated, HESylated, or the like).
15. An isolated nucleic acid molecule comprising a sequence encoding the monoclonal antibody or an antigen binding fragment thereof of any one of paragraphs 1 to 14.
16. A vector comprising the nucleic acid molecule of paragraph 15.
17. A host cell comprising the nucleic acid molecule of paragraph 15 or the vector of paragraph 16.
18. A composition comprising the monoclonal antibody or antigen binding fragment thereof of any one of paragraphs 1 to 14, the nucleic acid molecule of paragraph 15, the vector of paragraph 16 or the host cell of paragraph 17 and further a suitable carrier, diluent, or excipient.
19. The composition of paragraph 18, being a pharmaceutical composition and the carrier being a pharmaceutically acceptable carrier, diluent, or excipient.
20. The composition of paragraphs 18 or 19, being in a form suitable for parenteral, oral, rectal, systemic, urogenital, topical, intravitreal, intraocular, otic, intranasal, dermal, sublingual, or buccal administration.
21. A method of treating, preventing, or delaying progression of a disease or condition associated with AHR and/or CYP1A in a subject in need thereof, the method comprising administering to the subject an effective amount of the pharmaceutical composition of paragraphs 18 or 19, thereby treating the disease or condition.
22. A method of modulating homeostasis in a subject affected by or at risk of a disease or condition associated with AHR and/or CYP1A, the method comprising administering to the subject an effective amount of the pharmaceutical composition of paragraphs 18 or 19.
23. The method of paragraph 21, wherein the homeostasis is gut homeostasis.
24. The method of any one of paragraphs 21 to 23, wherein the disease or condition associated with AHR and/or CYP1A is cancer, smoking or a sequela thereof (e.g., lung disease, lung cancer, throat cancer, fibrosis, and the like), dysregulation of gut homeostasis (e.g., inflammatory bowel disease, irritable bowel syndrome), metabolic disease, metabolic dysregulation, dysregulation of sex hormones, environmental stress, environmental contaminant (e.g., air pollution, water pollution), immune suppression, reproductive disorders, developmental disorders, or any combination thereof.
25. A method of reducing adverse effects of exposure to an environmental stressor in a subject in need thereof, the method comprising administering to the subject an effective amount of the pharmaceutical composition of paragraphs 17 or 18, wherein the environmental stress stimulates AHR and/or CYP1A signaling (e.g., the AHR-CYP1A axis).
26. The method of paragraph 25, wherein the environmental stressor is an AHR ligand such as halogenated aromatic hydrocarbons (HAH), polycyclic aromatic hydrocarbons (PAH), flavonoids, resveratrol, tryptophan or a derivative thereof (e.g., FICZ (6-formylindolo[3,2-b]carbazole)), and other xenobiotics.
27. The monoclonal antibody or antigen binding fragment thereof of any one of paragraphs 1 to 14, the nucleic acid molecule of paragraph 15, the vector of paragraph 16, the host cell of paragraph 17, or the composition of paragraphs 18 or 19, for use in the treatment, prevention, or delay of progression of a disease or condition associated with AHR and/or CYP1A.
28. The monoclonal antibody or antigen binding fragment thereof of any one of paragraphs 1 to 14, the nucleic acid molecule of paragraph 15, the vector of paragraph 16, the host cell of paragraph 17, or the composition of paragraphs 18 or 19, for use in modulating homeostasis in a subject affected by or at risk of a disease or condition associated with AHR and/or CYP1A.
29. The monoclonal antibody or antigen binding fragment thereof, nucleic acid molecule, vector, host cell or composition for use of paragraphs 27 or 28, wherein the disease or condition associated with AHR and/or CYP1A is cancer, smoking or a sequela thereof (e.g., lung disease, lung cancer, throat cancer, fibrosis, and the like), dysregulation of gut homeostasis (e.g., inflammatory bowel disease, irritable bowel syndrome), metabolic disease, metabolic dysregulation, dysregulation of sex hormones, environmental stress, environmental contaminant (e.g., air pollution, water pollution), immune suppression, reproductive disorders, developmental disorders, or any combination thereof.
30. The monoclonal antibody or antigen binding fragment thereof of any one of paragraphs 1 to 14, the nucleic acid molecule of paragraph 15, the vector of paragraph 16, the host cell of paragraph 17, or composition of paragraphs 18 or 19, (i) for use as a medicament, in particular in the treatment of a disease or condition associated with a AHR and/or CYP1A; (ii) for use as a medicament, in particular in modulating homeostasis in a subject affected by or at risk of a disease or condition associated with AHR and/or CYP1A; (iii) for use as a medicament, in particular in reducing adverse effects of exposure to an environmental stressor in a subject in need thereof; (iv) for use in diagnostics; and/or (v) for detection purposes.

31. A method of producing the monoclonal antibody or antigen binding fragment thereof of any one of paragraphs 1 to 14, the method comprising: cultivating the host cell of paragraph 17 thereby allowing the monoclonal antibody or antigen binding fragment thereof to be expressed; recovering the monoclonal antibody or antigen binding fragment thereof; and optionally purifying the monoclonal antibody or antigen binding fragment thereof.

32. A method of producing the monoclonal antibody or antigen binding fragment thereof of any one of paragraphs 1 to 14, the method comprising: (a) contacting a cell-free expression system with a nucleic acid product template, the nucleic acid product template encoding the monoclonal antibody or antigen binding fragment thereof according to any one of paragraphs 1 to 14; (b) allowing transcription and translation of the nucleic acid product template to occur, thereby allowing a reaction mixture to be formed; (c) recovering the monoclonal antibody or antigen binding fragment thereof from the reaction mixture; and (d) optionally purifying the monoclonal antibody or antigen binding fragment thereof.

33. A method of diagnosing a disease or disorder associated with activated CYP1A in a subject, the method comprising: (i) contacting a biological sample from the subject with the monoclonal antibody or antigen binding fragment thereof of any one of paragraphs 1 to 14 under conditions permissive for specific binding of the monoclonal antibody or antigen binding fragment thereof to CYP1A, and (ii) detecting whether a complex between the monoclonal antibody or antigen binding fragment thereof and CYP1A is formed; wherein detection of the complex indicates the presence of activated CYP1A in the subject.

34. The method of paragraph 33, wherein the biological sample is of mammalian origin.

35. The method of paragraph 34, wherein the biological sample is of human origin.

36. The method of any one of paragraphs 33-35, wherein the biological sample is at least one of a blood sample, a urine sample, a cerebrospinal fluid sample, a biopsy sample, and a lymph sample.

37. The method of any one of paragraphs 33 to 36, wherein the method is a method for selecting subjects eligible for therapy with the monoclonal antibody or antigen binding fragment thereof of any one of paragraphs 1 to 14.

38. A kit comprising the monoclonal antibody or antigen binding fragment thereof of any one of paragraphs 1 to 14 together with a packaged combination of reagents with instructions.

The invention will now be described with reference to the following examples. It should be appreciated that these examples are not intended to limit the scope of the claims to the invention but are rather intended to be exemplary of certain embodiments. Any variations in the exemplified methods that occur to the skilled artisan are intended to fall within the scope of the invention.

EXAMPLES

Example 1: Development and Applications of Zebrafish CYP1A-Targeted Monoclonal Antibody (CRC4) with Reactivity Across Vertebrate Taxa Immunogen Design: A synthetic polypeptide comprising internal amino acids 264-294 zebrafish CYP1A was designed from a full-length zebrafish cDNA sequence (NCBI Accession #BAB90841.1) and conjugated with keyhole limpet hemocyanin (KLH) (GinoSys-Sigma-Aldrich) for immunizations and as an unconjugated peptide for screening assays. This specific sequence was chosen because several amino acids of the polypeptide differ slightly from other vertebrates and there is an asn/asp difference near the C-terminus (Table 1). The zebrafish peptide also has core sequences shared with other fish and sequences common to all vertebrates.

Monoclonal Antibody Generation: Six-week-old female Balb/c mice (Charles River) were used for immunizations and housed at the Clemson Institute for Environmental Toxicology, Pendleton, SC USA, a Clemson University IACUC approved facility under IACUC-approved protocols. Hybridoma production and screening followed standard methods and procedures from other studies with slight modifications (Rice et al. 1998 *Mar. Environ. Res.* 46:87-91). Mice were given a sub-cutaneous (s.c.) injection with 50 μg in 0.9% saline containing TiterMax Gold® adjuvant on Day 1. Fourteen days later mice received a second s.c. immunization using Freund's incomplete adjuvant. Subsequent boosters at 21-day intervals were given in saline via s.c. immunizations, and the final booster was given intraperitoneally. Five days after the last booster immunization, mice were sacrificed using slow lethal $CO_2$ hypoxia, bled by cardiac puncture, and their spleens removed using aseptic methods. Procedures for fusion of splenocytes with Sp02-14 myelomas (ATCC, Manassas, VA, USA), and for screening and cloning of the resulting hybridomas have been described elsewhere. Hybridomas were typically grown in Dulbecco's Modified Eagle Medium (Cellgro, Lincoln, NE, USA) supplemented with 10% fetal bovine serum (FBS), 20 mM HEPES, 10 mM L-glutamine, 100 μg/mL penicillin, 100 μg/mL streptomycin, 110 μg/mL sodium pyruvate, 1% non-essential amino acids (from a 100×stock), 4.5 g/L glucose, 10 μg/mL gentamycin, and 5 μg/mL nystatin.

Primary hybridoma supernatants were then screened by ELISA against unconjugated peptide for a minimal signal of three-fold optical density readings above wells probed with an irrelevant antibody (mAb 3F9 against major vault protein), then cloned by limiting dilution for further testing. Hybridomas were grown to confluence and the supernatants collected by centrifugation, then treated with 0.05% $NaN_3$ and stored at 4° C. Initial isotyping of the antibodies in hybridoma supernatants was carried out using Pierce Rapid Antibody Isotyping Kits for mouse (Thermo Fisher). Antibodies were subsequently used as confluent supernatants for most techniques, or further purified if needed. Preliminary studies demonstrated that only three hybridomas secreted antibodies specific to the immunizing peptide. Of these, only one secreted an antibody (mAb CRC4) that recognizes induced zebrafish CYP1A in immunoblotting and other assays, reacts with induced CYP1A in other vertebrates, and recognized the core vertebrate CYP1A sequence IRDITDSLI (SEQ ID NO:15) (also noted as IRDITSLI (SEQ ID NO:35) and IRIDITSLI (SEQ ID NO:34)). Immunoglobulin (Ig) genes of the hybridoma expressing mAb CRC4 were then sequenced (Absolute Antibody, Boston, MA, USA)

using Next Generation Sequencing (NGS) to verify the presence of a single Ig and of the appropriate isotype. The unique complimentary determining region (CDR) sequences of heavy and light chains were determined, and these Ig sequences will allow for the expression of recombinant mAb CRC4.

Screening mAbs against cell line lysates: To determine the reactivity of mAb CRC4 with zebrafish CYP1A protein, zebrafish liver cells (ZFL) were obtained from ATCC (Manassas, VA, USA) and grown in appropriate media and conditions as directed by the supplier, then transitioned to Leibovitz-15 $CO_2$-independent media (L15 media) containing 10% FBS, 4 mM L-glutamine, and antibiotics. Under these conditions the cells grew well for the short duration of the study, but do not grow well over the long term (personal observations by CDR). This medium also supports the growth of frog XLK-WG cells (ATCC, Manassas, VA, USA). Other cells and tissues used for testing and screening are outlined in Table 2. Arochlor 1254-induced and non-induced rat liver S9 fractions were thawed immediately upon receipt from the supplier and prepared for SDS-PAGE-immunoblotting by boiling for 7 min in reducing sample buffer (Thermo Fisher J61337.AD) containing 50 μM PMSF. Commercially sourced HEK cell lysates over-expressing recombinant human CYP1A1 (Origene, Rockville, MD, USA) were prepared similarly.

ZFL, PLHC-1, and HEPA1C1C7 cells were grown to near confluence in 6-well plates (Primavera, Corning). Plates seeded with ZFL cells and PLHC-1 cells were sealed with parafilm and kept in sealed containers to avoid external $CO_2$. Cells were treated for 48 h with 10 μM PCB-126 (CAS 57465-28-8, Ultra Scientific) dissolved in DMSO or 0.01% DMSO as a carrier control. XLK-WG cells were grown to near confluence in sealed T-75 flasks, then treated for 12 h with 50 nM of the AHR ligand 6-Formylindolo [3,2-b] carbazole (FICZ) (CAS 172922-91-7, Tocris Biosciences, Bristol, UK) in DMSO or 0.01% DMSO, and again for an additional 12 h with the same. HEK cells were grown in media only as a cell-specific source of control cell lysate for comparison with over-expressed recombinant CYP1A1 in HEK cell lysates from the supplier.

Media was then removed from cells, replaced with 0.25% trypsin, and incubated until cells lifted from attachment. Cells were then pelleted by centrifugation to obtain a dry pellet, covered with ice-cold 300-400 μL RIPA buffer (Thermo Fisher, Waltham, MA, USA) supplemented with 2×HALT protease inhibitor cocktail (Pierce), followed by resuspension using a vortex device and placement on ice for 20 min. Suspensions were then sonicated, transferred to 1.5 mL tubes, and centrifuged 12,000×g for 20 min. Overlying supernatants were removed and transferred to clean tubes and the protein content quantified. Lysate protein concentration for each cell line, rat S9 fractions, and rainbow trout microsomes were matched between treated and controls, then boiled in reducing sample buffer for 7 min. Forty micrograms of each sample was then subjected to SDS-PAGE using 10-lane, 50 μL well capacity 4-20% pre-cast gels (Biorad, Richmond, CA, USA) and immunoblotting using standard procedures incorporating PDVF membranes. Immunoblots were blocked overnight with 10% horse serum (Gibco) in 0.01 M phosphate buffered saline (PBS) containing 0.05% tween twenty (PBS-T). Membranes were washed once for 10 min with PBS-T, then probed for 2 h at room temperature (RT) with mAbs as confluent supernatants diluted 1:10 in PBS-T containing a final nominal concentration of 3 ug/mL antibody. The membranes were washed 3×fr 10 min with PBS-T, then incubated for 2 h with goat-anti-mouse IgG conjugated with alkaline phosphatase (AP) (Invitrogen #31320) (1:2000 in PBS-T). After 3× washes with PBS-T, membranes were incubated with NBT-BCIP (Fisher Scientific, Pittsburgh, PA, USA) as the AP substrate and activity was visualized as dark blue banding of CYP1A at the expected size of approximately 55 kDa. Blots were dried at room temperature and documented using a ChemiDoc™ imaging system (Biorad) to compare samples from each represented vertebrate.

Whole mount embryo immunohistochemistry: Specific pathogen-free 5D zebrafish were reared in accordance with Institutional Animal Care and Use Committee protocols. Fish were housed on a recirculating water system kept at 28±1° C. under a 14 h light: 10 h dark cycle in brood stock tanks (50 or 100 gallon). Water was supplemented with Instant Ocean salts (Spectrum Brands, Blacksburg, VA, USA) and sodium bicarbonate to maintain pH 7.4. Fish were fed twice daily with Gemma Micro (Skretting, Inc., Fontaine Les Vervins, France).

Embryos were collected on the day of exposure, sorted by developmental stage, and kept in E2 embryo medium (15 mM NaCl, 0.5 mM KCl, 1 mM $CaCl_2$, 1 mM $MgSO_4$, 0.15 mM $KH_2PO_4$, 0.05 mM $Na_2HPO_4$, and 0.7 mM $NaHCO_3$ buffered with 1 M NaOH to pH 7.2), hereafter referred to as EM, in a temperature-controlled incubator at 28±1° C. until dechorionation. At 4 h post-fertilization (hpf), embryos were dechorionated enzymatically. Following dechorionation, embryos were screened for enzymatic or mechanical damage under a dissecting microscope and robotically loaded into 96-well plates pre-filled with 100 μL EM.

CYP1A expression was induced in vivo by exposure to retene (CAS 483-65-8, Santa Cruz Biotechnology, 97% purity), a potent AHR activator (Scott et al. 2011 *Aquat. Toxicol.* 101:165-174; Whitehead et al. 2012 *PNAS* 109: 20298-20302). Retene and 100% dry dimethyl sulfoxide (DMSO control) were dispensed directly into 96-well plates pre-loaded with 6 hpf embryos and 100 μL EM using an D300e Digital Dispenser to achieve 0 or 30 μM retene concentration normalized to 0.1% DMSO. Plates were immediately sealed with pressure-sensitive silicone adhesive backed polyolefin plastic PCR film (ThermalSeal RTS, Excel Scientific) and incubated overnight at 28±1° C. in the dark on an orbital shaker at 235 RPM.

At 24 hpf, the plates were removed from the shaker and incubated in the dark at 28° C. until 48 hpf. At 48 hpf, embryos were transferred to 1.5 mL microcentrifuge tubes and anesthetized on ice in groups of 10. Embryos were euthanized with buffered Tricaine® and the solution was immediately removed and replaced with 500 μL 4% paraformaldehyde in PBS. Tubes were kept on a rocker overnight at 4° C. to fix tissues. The following morning, fish were rinsed 3 times with PBS then stored in 0.02% $NaN_3$ in PBS (PBS-$NaN_3$) preservative at 4° C. until immunohistochemistry was performed.

For whole-mount-IHC, fish were transported to mesh-bottom well plate inserts in a 24-well plate and the solution was removed. Fish were then washed 3 times for 15 min each in PBS with 0.1% Tween® 20 detergent (PBST). For each wash step throughout the procedure, fish were kept in solution with gentle manual agitation for the designated duration. Well inserts containing fish were moved to a new well with fresh solution for the subsequent step.

Fish tissue was permeabilized using freshly made 0.005% trypsin in PBS for 8 min on ice. Following permeabilization, fish were washed 3 times for 5 min each in PBST then post-fixed with 4% PFA for 10 min at room temperature and washed again twice for 5 min with PBST. Ten percent normal goat serum in PBST with 0.01% triton X-100 (PBSTx) was used to block non-specific protein binding for 10 min at room temperature. Following the blocking step, fish were transferred to 1.5 mL microcentrifuge tubes and NGS-PBSTx solutions were removed. Primary antibody (mAb CRC4) as confluent hybridoma supernatant was diluted 1:10 in NGS-PBSTx to yield a nominal concentration of 3 µg/mL and added to tubes and incubated overnight at 4° C.

After overnight incubation, the primary antibody was removed, and fish were transferred to well plate inserts and rinsed in PBST twice for 5 min and 4 times for 30 min each. Fish were then incubated with goat anti-mouse IgG1-Alexa Fluor 594 (1:1000, Invitrogen A-21125) secondary antibody for 2 h at room temperature. The secondary antibody was removed, and fish were rinsed in PBST twice for 5 min and 4 times for 30 min each then stored in PBS-$NaN_3$ until imaging. To assess CYP1A protein localization, fish were imaged in a 12-well glass bottom plate using a Keyence BZ-X710 fluorescence microscope (Keyence, Osaka, Japan) using a Texas Red filter cube. Representative fish from each group were mounted on 35 mm glass bottom dishes (Matsunami Glass, Bellingham, WA, USA) and imaged in the same manner. Images were then converted to 32-bit gray scale and recorded for demonstration of CYP1A expression.

Tissue immunohistochemistry: Archived tissues used in previous studies examining AHR ligand activation were re-analyzed using mAb CRC4 (Table 2). Grossly dissected archived tissues (fixed and stored at 4° C. in 70% ethanol) were processed and embedded in ParaPlast Extra. Newly embedded tissues were then sectioned and affixed to charged slides for immunohistochemistry. Mouse liver tissues used for this study were from previous studies wherein mice were exposed to 1 mg/kg PCB-126 prior to tissue fixation. Archived rainbow trout livers (and microsomes stored at −80° C. from beta-naphthoflavone (0-NF)-treated animals from a previous study (Rice et al. 1998 Mar. environ. Res. 46:87-91) were used for immunohistochemistry and immunoblotting. Archived liver tissue from Gulf killifish collected from sites affected by the Deepwater Horizon spill (DHOS) were analyzed for CYP1A alongside livers from a lab-held colony of CYP1A-recalcitrant Gulf killifish, which is used as a molecular control (naturally acquired CYP1A knockdown) (Oziolor et al. 2016 Aquat. Toxicol. 175:222-231). Finally, previously analyzed embryonic chicken livers exposed to airborne volatiles from DHOS oil were included for additional species comparison.

Zebrafish (strain AB) exposed to PCB-126 (Ulra Scientific) were also used for this study. Zebrafish were housed at the former Clemson Institute of Environmental Toxicology, Pendleton SC and maintained under Clemson University IACUC approved methods. Two juvenile male and two juvenile female zebrafish (40 dpf) were exposed for 48 h to either 10 µM PCB-126 or 0.10% DMSO in 1 L glass bottles containing maintenance water from the recirculating system and supplied with gentle aeration. Following exposure, the 4 fish per treatment were euthanized on ice with buffered Tricaine®, their abdominal cavities opened, and placed in in 10% aqueous buffered zinc formalin (Z-Fix, Anatech, Ltd., Battle Creek, MI, USA) for 2 days, and the fixative replaced with 70% ethanol and stored at 4° C. Prior to processing, zebrafish were decalcified in 0.35 M EDTA, pH 7.8 at room temperature (RT) for 6 days, then processed for microtomy as above. Fish and chicken tissue IHC was performed using a horse-anti-mouse IgG VectaLabs ABC-Elite kit (PK-6102), while mouse tissue IHC was performed using the mouse-on-mouse (M.O.M.) anti-mouse IgG VectaLabs ABC-Ultra kit (BMK-2202)

Whole zebrafish tissues were sectioned at 7-9 µm and mouse, trout, killifish, and chicken tissues were sectioned at 4-5 µm on a Microm 325 rotary microtome. Prior to antibody labeling, antigen retrieval studies were carried out to determine the optimal conditions for mAb CRC4 binding using zebrafish tissues. A moderate heat cycle with an alkaline pH was determined to be ideal. Subsequently, slides were immersed in pH 9 Tris-EDTA buffer while heating by microwave on 100% power for 5 min followed by cooling for 5 min, followed by a final 5 min 100% power, then a final 20 min cool-down period in the container at room temperature. After antigen retrieval, tissues on slides were encircled with a Liquid Blocker Super mini pen to isolate tissue slices. Thus, each slide was divided into sections where one section can act as a reagent control by withholding a primary antibody. Additional screening assays included isotype controls. Once slides were divided, all sections were treated to quench endogenous peroxidase activity for 30 min using 3% $H_2O_2$ in water. Following quenching, a 30 min blocking step was conducted using PBS, pH 7.4 with horse serum provided in the horse-anti-mouse IgG VectaLabs ABC-Elite kit (PK-6102) plus 1% fetal bovine serum (FBS). After blocking, avidin-then biotin-blocking steps (15 min each) were conducted to allow specificity to target molecules only for the avidin-biotin binding. Next, the antibody, as a hybridoma supernatant diluted 1:10 in PBS with 0.5% FBS, was added dropwise to the slides and incubated overnight at 4° C. or for 2 h at RT. After incubation, the slides were washed prior to addition of the secondary (biotinylated) antibody for a 30 min incubation at RT. After washing, Vectastain ABC reagent was added for 30 min prior to staining. Following the manufacturer's instructions, ImmPACT Nova Red (SK-4805) was then used to visualize mAb CRC4 distribution. Since mAb CRC4 is a mouse antibody, the M.O.M anti-mouse IgG Vectalabs ABC-Ultra kit (BMK-2202) was used to detect CYP distribution in mouse tissues. Mouse tissue IHC followed the same general protocol for probing and visualization, but with some slight changes directed by the M.O.M. kit (VectaLabs). To complement ImmPact® Nova Red® staining for CYP1A, tissues were counter-stained with hematoxylin Q.S. (Vector Labs).

Stained slides were imaged using a NanoZoomer 2.0-HT slide scanner (Hamamatsu). Slide areas were scanned at 40× resolution and images from scans were exported into TIFF format. All liver tissue images were adjusted for levels in Adobe Photoshop, with RAW images preserved in native format. Histogram normalization of micrographs was used to enhance contrast.

Results:

Generation of monoclonal antibodies: Three hybridomas secreting monoclonal antibodies (mAb) meeting selection criteria were developed and characterized as mAb CRC2 ($IgG_{2a}$ κ), mAb CRC4 ($IgG_1$ κ), and mAb CRC9 ($IgG_1$ κ) (FIG. 1 panel A). Subsequent studies demonstrated that only mAb CRC4 recognized induced zebrafish CYP1A protein by immunoblotting. Using additional screening approaches, ELISAs were carried out to determine if either of the three mAbs would recognize the core vertebrate CYP1A sequence IRDITSLI (SEQ ID NO:35)). Only mAb CRC4 recognized this peptide sequence by ELISA (FIG. 1 panel B). An additional ELISA system was used to determine if this conserved peptide could be used to block the binding of mAb CRC4 to the zebrafish CYP1A peptide used for immunizations. Based on the general rule of thumb that confluent supernatants contain approximately 30 µg/mL of specific antibody, a total of 60 µg of the peptide in 100 µL PBS as the highest concentration was serially diluted and 50 µL of each dilution were mixed with 50 µL confluent supernatants to yield 100 µL of total mixture for screening ELISA plates coated with the original zebrafish peptide. This mixture of hybridoma supernatant and peptide dilutions was allowed to incubate overnight at 4° C. The next day these mixtures of 100 µL total sample were mixed by gentle agitation and added to zebrafish CYP1A1 peptide-pre-coated ELISA plates and incubated for 2 h at RT. After extensive washings with PBST, the plates were incubated with goat anti-mouse IgG conjugated with alkaline phosphatase for 2 h, washed extensively, and developed and quantified at 405 nm and the data recorded. The estimated ratio of 1:1 conserved peptide and antibody (15 µg peptide:15 µg antibody) resulted in the most inhibition of activity (FIG. 1 panel C), thus providing additional evidence that this sequence contains the epitope recognized by the antibody.

Cross reactivity of mAb CRC4 against induced CYP1A1 across vertebrate taxa: Treatment ("T")-induced CYP1A protein was recognized by mAb CRC4 across all vertebrate taxa examined (FIG. 1 panel D). No CYP1A protein was detected in either of the controls ("C").

Figure 2:
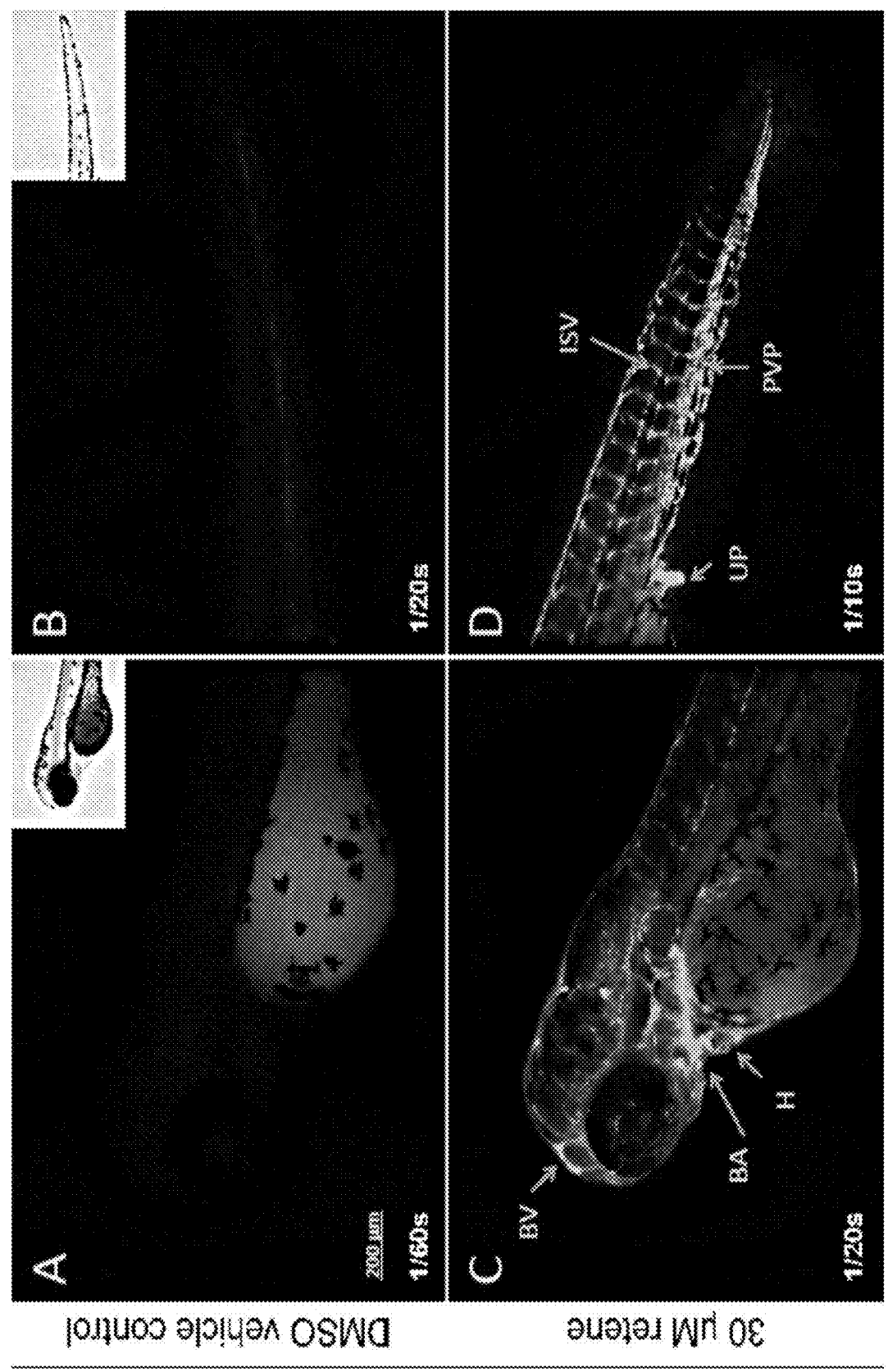
FIG. 2 shows microscopy images of whole-mount immunolocalization of zebrafish CYP1A protein in a representative DMSO vehicle (control) larva (FIG. 2 panels A, B) and 30 μM retene-exposed (FIG. 2 panels C, D) larvae at 48 hpf using mAb CRC2. Each larva was exposed to their respective treatment from 4 hpf through 48 hpf. BA, brachial vasculature; BV, brain vasculature; H, heart; UP, urogenital pore; PVP, posterior vascular plexus; ISV, intersegmental vessel.

Detecting induced embryonic expression of zebrafish CYP1A using mAb CRC4: Using detailed methods for whole-embryo immunohistochemistry, we showed that mAb CRC4 detects retene-induced CYP1A expression in the vasculature throughout the embryo, with intense staining near the heart and branchial artery, but also in the tail region and urogenital pore (FIG. 2, panels A-D).

Figure 3:
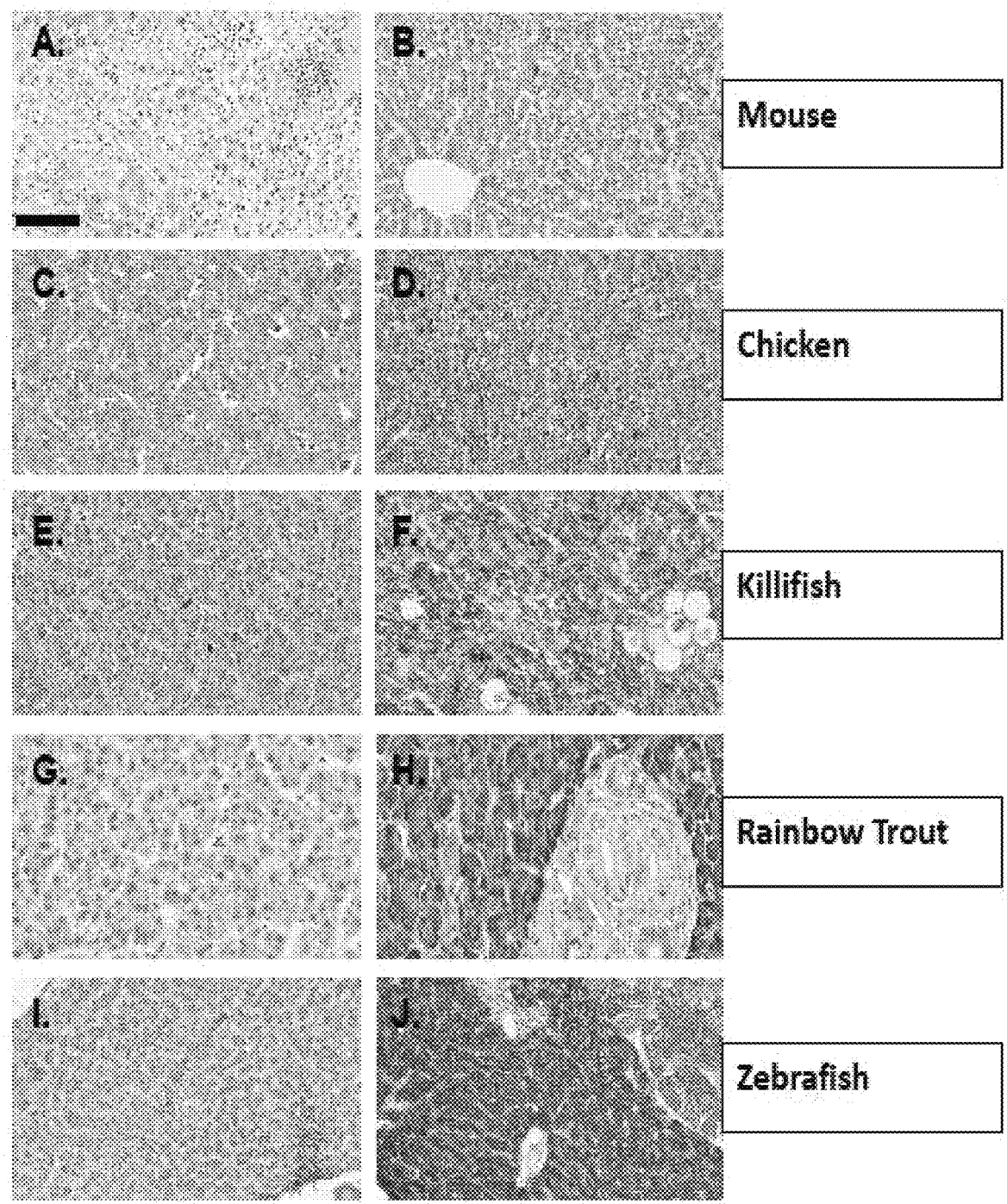
FIG. 3 shows images of immunohistochemical detection of CYP1A protein expression using mAb CRC4 in liver tissues from representative vertebrates.
Figure 6:
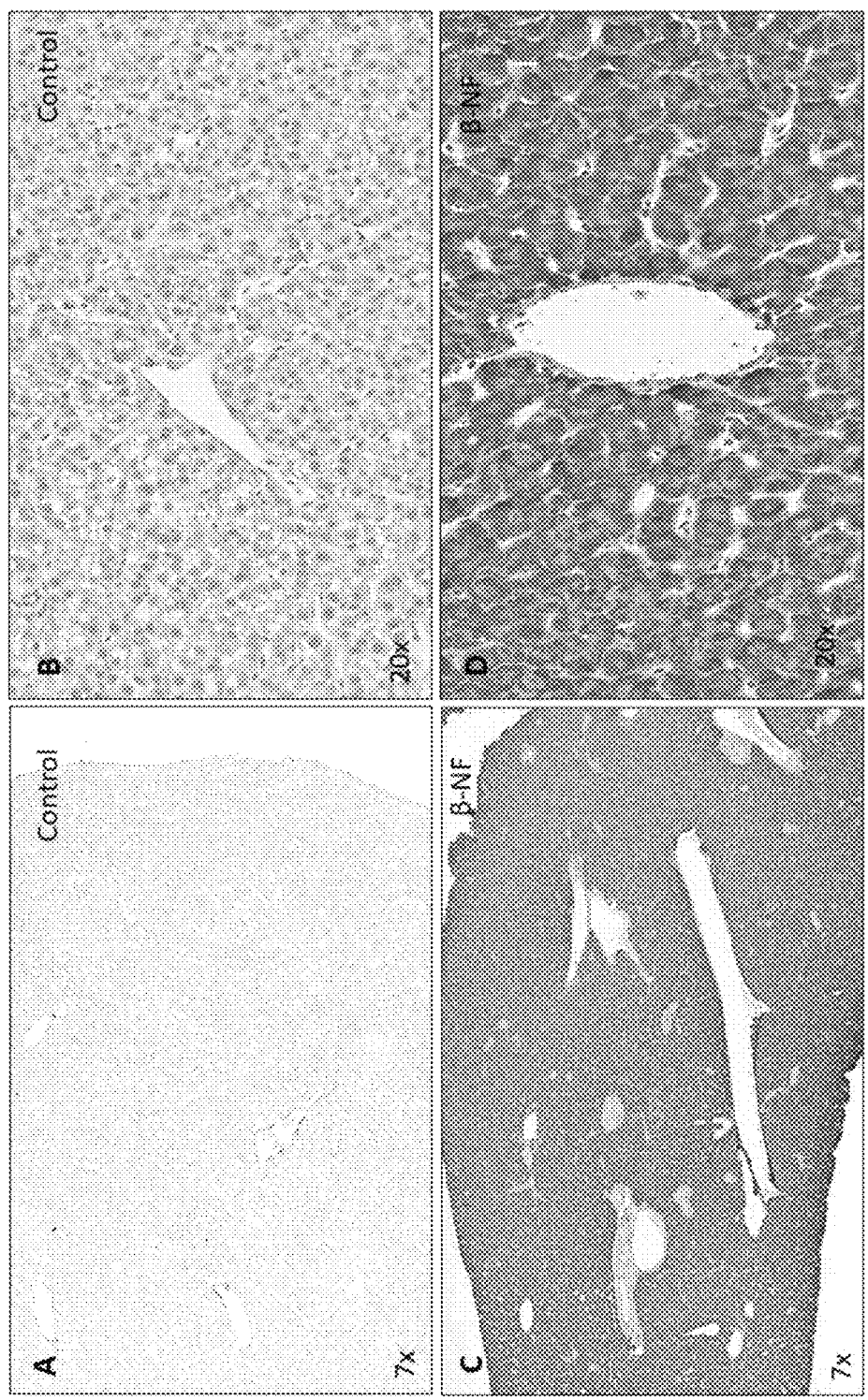
FIG. 6 shows additional images (panels A, B, C and D) of histology as related to FIG. 3. β-NF induced CYP1A expression in rainbow trout liver. Conditions shown are primary antibody mouse mAb CRC4 and VECTASTAIN Elite ABC peroxidase kit with Impact NovaRed stain.
Figure 7:
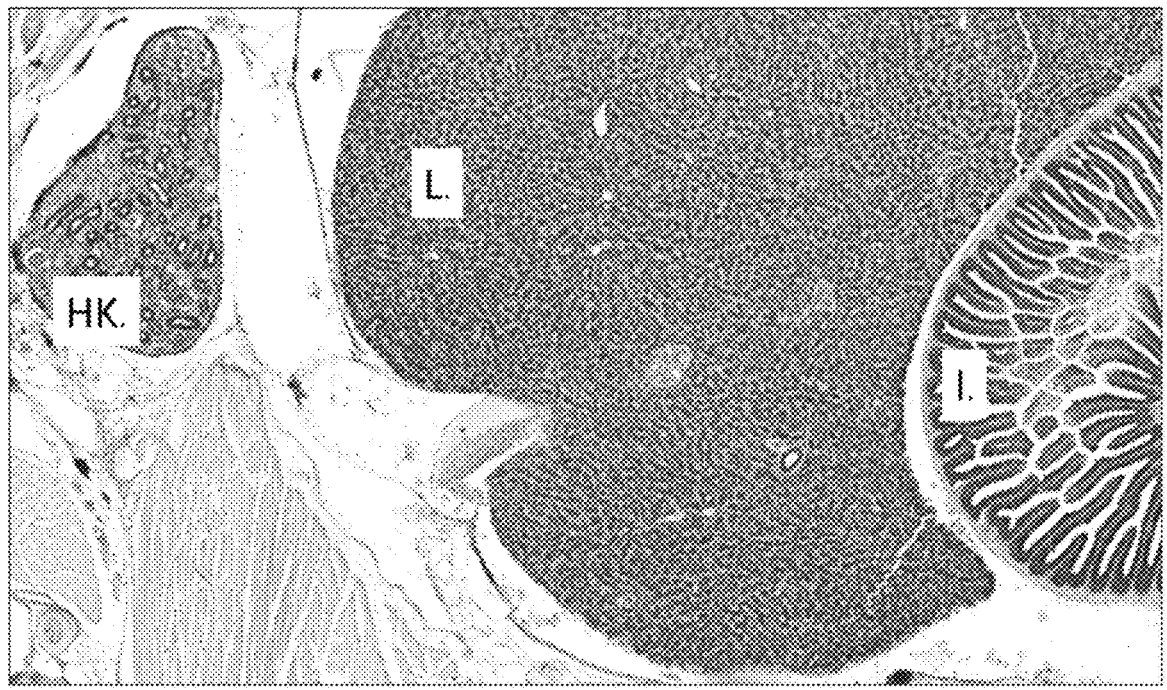
FIG. 7 shows an image of IHC histology showing CYP1A expression in PCB-126 exposed adult zebrafish. Whole fish were FFPE and 6 um sagittal slices cut followed by IHC using mouse mAb CRC4 and VECTASTAIN Elite ABC peroxidase kit with Impact NovaRed stain. Liver (L), Intestine (I), and Head Kidney (HK).
Figure 8:
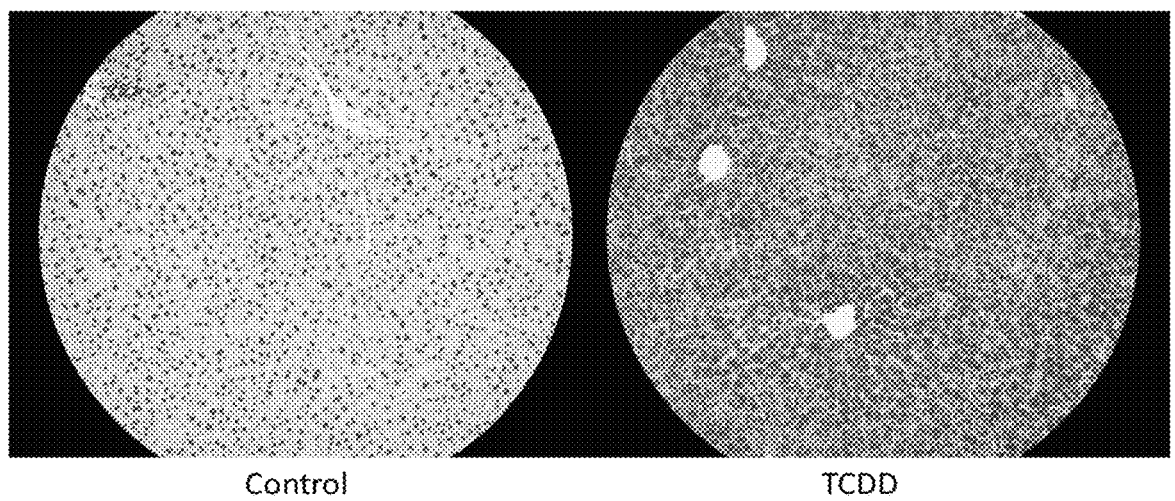
FIG. 8 shows images of IHC histology showing CYP1A expression in TCDD exposed adult mouse liver. Livers were FFPE and 5 um slices cut followed by IHC using mAb CRC4 (rabbitized) and VECTASTAIN Elite ABC peroxidase kit with Impact NovaRed stain.

Detecting induced CYP1A expression in juvenile zebrafish tissue using mAb CRC4: Using standard immunohistochemistry protocols, we show that CYP1A is easily detected in PCB-126-exposed mouse livers but not unexposed controls (FIG. 3 panels A and B), as well as chicken embryo livers exposed to vapors from crude oil 18 days post fertilization (DPF) (FIG. 3 panels C and D). Likewise, crude oil-induced CYP1A expression is easily detected in adult gulf killifish but not in individuals from a genetically resistant population located within the upper Houston Ship Channel (FIG. 3 panels E and F). Some of the most intense staining of CYP1A by mAb CRC4 was found in rainbow trout livers treated with 3-NF just prior to tissue removal and fixation (FIG. 3 panels G and H) and in zebrafish adult livers from animals exposed to PCB-126 (FIG. 3 panels I and J) prior to tissue removal and fixation. Additional images are provided in FIGS. 6-8, which demonstrate successful CYP1A staining in rainbow trout liver (FIG. 6), whole mount adult zebrafish (FIG. 7), and adult mouse liver (FIG. 8).

Discussion: In this study we generated zebrafish CYP1A-specific mAbs that were initially intended for zebrafish-specific research. Subsequent characterization revealed that one antibody (mAb CRC4) recognized induced CYP1A not only in zebrafish, but all vertebrates examined, and that the epitope for the antibody is the highly conserved vertebrate peptide IRTIDSLI (SEQ ID NO:35). While not wishing to be bound to theory, this discovery may be beneficial in particular because of the limited availability of other commonly used CYP1A-specific antibodies. Nearly 40 years ago, mAb 1-12-3 was generated against Scup, *Stenotomus chrysops*, CYP1A and shown to recognize CYP1A in rats as well (Park et al. 1986 *Arch. Biochem. Biophys.* 24(339-350; Kloepper-Sams et al. 1987 *Arh. Biochem. Biophys.* 253:268-278). Unfortunately, hybridoma 1-12-3 has been lost and is no longer available. Almost 30 years ago, mAb C10-7 was generated against rainbow trout CYP1A and shown to be cross reactive with all fish examined (Rice et al. 1998 *Mar. Environ. Res.* 46:87-91), and since then, mAb C10-7 has been available commercially as "anti-fish CYP1A" from several sources. To date, we have not been able to demonstrate mammalian CYP1A detection by mAb C10-7. Unfortunately, hybridoma C10-7 has also been lost, thus stressing the importance of having other CYP1A-specific mAbs available to the scientific community, and especially the ability to express recombinant forms of the antibody that supersede the need to maintain hybridomas long term. To this end, the unique complementary determining regions (epitope binding regions) of heavy and light chains of hybridoma CRC4 have been sequenced, which will allow us to produce a recombinant mAb CRC4.

We demonstrated that mAb CRC4 recognizes induced CYP1A across vertebrate taxa and based on the conserved core sequence recognized by the antibody, we predict that induced reptilian CYP1A will be recognized as well. Of note, the staining intensity of induced frog CYP1A in immunoblots was less than for the other samples, which may be reflective of the low affinity of amphibian AHR for ligands (Laub et al. 2010 *Chem. Biol. Interact.* 183:202-211; Lavine et al. 2005 *Toxicol. Sci.* 88:60-72). Nonetheless, mAb CRC4 should be useful for understanding the AHR-CYP1A axis in amphibians. As we demonstrate, whole-mount zebrafish embryo CYP1A induction by the AHR ligand retene is easily detected by mAb CRC4, with the vasculature being a sensitive target. Many environmental AHR ligands are associated with embryo toxicity that involves vascular malformation, deformed heart development, and the general phenomenon of blue sac's disease (BSD); these adverse outcomes correlate with CYP1A induction in the vascular endothelium. In general, it appears that vascular endothelium is a sensitive target for strong AHR ligands regardless of taxa.

As with endothelial cells, hepatocytes (and bile duct epithelium), which form a barrier epithelium within the liver, are sensitive to AHR ligands and highly express CYP1A, as shown in our liver IHC figures using mAb CRC4. The differences in staining intensity between mouse, chicken, and fish livers by the antibody may be due to antigen retrieval details. Preliminary studies using zebrafish tissues indicated that antigen retrieval using microwave heating and Tris-EDTA, pH 9 conditions resulted in more favorable staining when compared to low pH conditions (citrate buffer, pH 6), or without antigen retrieval. Therefore, all tissues were subsequently probed using heat and high pH. Yet, it is possible that other conditions would improve staining in species other than fish, and future studies should examine alternatives. Additional caution is needed when probing whole-mouse tissues with a mouse antibody because of the high background of IgG that would be recognized by secondary antibodies. However, by using mouse-on-mouse reagents, such as VectaLabs M.O.M. kits, this can be overcome for the most part. How or if this constraint affects staining intensity in whole-mouse tissues is not yet clear. Staining of chicken tissues with mAb CRC4 yields the same intensity as seen using mAb C10-7 (Dubansky et al. 2018 *Environ. Toxicol. Pharmacol.* 58:163-169).

In summary, the development of mAb CRC4 adds to the growing toolbox of reagents that can be used for AHR-CYP1A axis research. For example, this antibody could be routinely used in studies involving drug-toxicant screening, to validate knock down or knock out of key components of AHR-CYP1A axis, as a tool for ecotoxicologists to detect exposure to environmental AHR ligands, and to immunepurify CYP1A from a variety of vertebrates that could in turn be used to generate other antibodies for use in capture ELISA assays. Recombinant mAb CRC4 expressed in HEK or CHO cells is also made to supersede the need to maintain the hybridoma along term.

Example 2: Antibody Sequencing

Sequencing was performed by whole transcriptome shotgun sequencing (RNA-Seq). If required, hybridomas were cultured in IMDM medium containing 10% FBS and incubated at 37° C. in a 5% CO2 environment. Total RNA was extracted from cells and a barcoded cDNA library generated through RT-PCR using a random hexamer. Next Generation Sequencing was performed on an Illumina HiSeq sequencer. Contigs were assembled and data was mined for antibody sequences identifying all viable antibody sequences (i.e. those not containing stop codons). Variable heavy and variable light domains were identified separately and relative abundance of each identified gene was reported in transcripts per million (TPM). The species and isotype of the identified antibody genes were confirmed. Sequences were compared with known aberrant (i.e. non-functional) antibody genes that are present in many hybridomas and these genes are removed from analysis when necessary.

Data interpretation: All identified antibody genes are shown on the "Sequence data" worksheets. One worksheet reports protein sequences and the other worksheet reports DNA sequences. Genes have been separated into heavy chains and light chains. For each chain the variable domain is reported along with the signal peptide and constant domain where it has been possible to identify these regions. If the entire constant domain is identified the integrity will be reported as complete. Where it has not been possible to identify the full constant domain sequence the integrity will be reported as partial. This does not impact the validity of the variable domain sequence but it simply a reflection of the fact the data has become truncated in the constant domain region.

The heavy chain and light chain type are identified based on the sequence of the constant domain (e.g., mouse IgG1, rat kappa etc.). If only a short fragment of constant domain has been identified it may not be possible to determine the species and isotype of antibody.

For each heavy and light chain two measurements of abundance are reported. TPM (transcripts per million) is an abundance measurement from next generation sequencing which scores the relative abundance of each gene in the whole transcriptome pool. The % column is a more relevant number which converts the TPM into a percentage antibody gene abundance. This enables simple identification of high and low abundance antibody genes. The data is automatically filtered to only report antibody genes with an abundance of greater than 1%.

CDR Identification: The complementarity determining regions (CDRs) have been automatically identified on the "CDR identification" worksheet using Excel formulas working to the Kabat definition for CDRs. CDR identification is only performed for the primary VH and VL sequences.

The sequences of the monoclonal antibody CRC4 are provided in Tables 3-7.

TABLE 1

Amino acid sequence of predicted most immunogenic CYP1A peptides (underlined) from representative vertebrates (F, fish; Rp, reptile; Avian, Av; Mammal, M) demonstrating a highly conserved core CYP1A1 epitope (IRDITDSLI; SEQ ID NO: 15). Mice were immunized with synthetic zebrafish CYP1A peptide conjugated to KLH at the C-terminus cysteine (C) and resulting hybridomas screened against the unconjugated peptide by ELISA. Positive hybridomas were subsequently re-screened by ELISA against the core sequence (IRDITDSLI; SEQ ID NO: 15) to obtain mAb CRC4 with reactivity across vertebrate taxa.

| CYP1A Amino Acid Sequence | SEQ ID NO: | Species | NCBI Accession Number |
|---|---|---|---|
| VMEHYDTFDKDNIRDITDSLINHC | 1 | Zebrafish, *D. rerio* (F) | BAB90841.1 |
| VSEHYESYDKDNIRDITDSLIDHC | 2 | Rainbow trout, *O. mykiss* (F) | AAB69383.1 |
| VSDHYDTFDKDNIRDITDSLIDHC | 3 | Fathead minnow, *P. promelas* (F) | XP_039536214.1 |
| VSEHYTTFDKDNIRDITDSLIDHC | 4 | Scup, *S. chrysops* (F) | AAA74969.1 |
| VSEHYSTFDKDNIRDITDSLIDHC | 5 | Mummichog, *F. heteroclitus* (F) | AAD01809.1 |
| VTEHYHTFDKDNIRDITDSLIDHC | 6 | Whale shark, *R. typus* (F) | XP_020387799.1 |
| VREHYDTYDKDNIRDITDSLIDHC | 7 | Channel catfish, *I. punctatus* (F) | XP_017321977.1 |
| VKEHYSSFDKDNIRDITDSLIEHC | 8 | Green Sea turtle, *C. midas* (Rp) | EMP30185.1 |
| VEEHYQTFDKNNIRDVTDSLIEQC | 9 | Chicken, *G. gallus* (Av) | NP_990477.2 |
| TKEHYKTFDKNHIRDITDSLIQHC | 10 | African clawed frog, *X. laevis* (Am) | NP_001090813.1 |
| VKEHYKTFDKSHIRDITDSLIEHC | 11 | American alligator, *A. miss.* (Rp) | KY021524.1 |

TABLE 1-continued

Amino acid sequence of predicted most immunogenic CYP1A peptides (underlined) from representative vertebrates (F, fish; Rp, reptile; Avian, Av; Mammal, M) demonstrating a highly conserved core CYP1A1 epitope (IRDITDSLI; SEQ ID NO: 15). Mice were immunized with synthetic zebrafish CYP1A peptide conjugated to KLH at the C-terminus cysteine (C) and resulting hybridomas screened against the unconjugated peptide by ELISA. Positive hybridomas were subsequently re-screened by ELISA against the core sequence (IRDITDSLI; SEQ ID NO: 15) to obtain mAb CRC4 with reactivity across vertebrate taxa.

| CYP1A Amino Acid Sequence | SEQ ID NO: | Species | NCBI Accession Number |
|---|---|---|---|
| IKEHYRTFEKGHIRDITDSLIEHC | 12 | Mouse, *M. musculus* (M) | NP_001129531.1 |
| IKEHYRTFEKGHIRDITDSLIEHC | 13 | Rat, *R. norvegicus* (M) | NP_036672.3 |
| VKEHYKTFEKGHIRDITDSLIEHC | 14 | Human, *H. sapiens* (M) | P04798.1 |
| IRDITDSLI | 15 | Conserved CYP1A1 epitope | All the above |

TABLE 2

Cells and tissues used in this study. Cells were grown and maintained as directed from the source or as modified (see Methods). Tissues from laboratory or environmentally exposed animals were processed for either tissue sub fractionation, formalin fixation and paraffin embedding followed by immunohistochemistry (IHC), or whole-mount IHC as described in the Methods section. Referenced sources were archived samples from previous studies (see Methods).

| Animal Cell Lines and Tissues | Origin | Source |
|---|---|---|
| ZFL | Zebrafish liver cells | ATCC CRL-2643 |
| PLHC-1 | Top minnow hepatocellular carcinoma | ATCC CRL-2406 |
| Hepa1c1c7 | Mouse liver hepatoma | ATCC CRL-2026 |
| XLK-WG | African clawed frog kidney epithelial | ATCC CRL-2527 |
| HEK293 | Human embryonic kidney | ATCC CRL-3467 |
| Rat liver S9 fraction | Arochlor-1254-induced P450s | MOLTOX 11101.5 |
| Rat liver S9 fraction | Non-induced livers | MOLTOX 11102.2 |
| Recombinant human CYP1A | Over-expressed in HEK293 cell lysates | OriGene LC400170 |
| Mouse livers for IHC | PCB-126-induced CYP1A (and controls) | DeLong and Rice, 1997 *J. Toxicol. Environ. Health* 51: 131-148 |
| Rainbow trout liver microsomes & tissue | B-NF-induced CYP1A (and controls) | Rice et al. 1998 *Mar. Environ. Res.* 46: 87-91 |
| Chicken embryo liver | Crude oil induced CYP1A (and controls) | De Long and Rice, 1997. |
| Adult zebrafish for IHC | PCB-126 induced CYP1A (and controls) | This study (see Methods) |
| Larval zebrafish for whole mount IHC | Retene-induced CYP1A (and controls) | This study (see Methods) |
| Gulf killifish for IHC | Tissues from Deep Water Horizon studies | Dubansky et al. 2017 *Arch. Environ. Contam. Toxicol.* 73: 63-75 |

TABLE 3

Sequence data: Protein VH

Primary heavy chain protein sequence

| Clone Name | No of HCs | No of LCs | HC type | Integrity | Signal peptide SEQ ID NO: 16 | VH SEQ ID NO: 17 | Constant SEQ ID NO: 18 | TPM | % |
|---|---|---|---|---|---|---|---|---|---|
| CRC4_1 | 1 | 1 | Mouse IgG1 | Complete | MDRLT SSFLLL IVPAY VLS | QVTLKESG PGILQPSQT LSLTCSFSG FSLSTSGM GVNWIRKP SGKGLEW LAHIFWDD DKRYNPSL KSRLTISK DTSRNQVF LMITSVDT ADTATYY CASLAMD | AKTTPPSVY PLAPGSAAQ TNSMVTLGC LVKGYFPEP VTVTWNSGS LSSGVHTFP AVLQSDLYT LSSSVTVPSS TWPSETVTC NVAHPASST KVDKKIVPR DCGCKPCIC TVPEVSSVFI | 211854.7 | 45.8 |

TABLE 3-continued

Sequence data: Protein VH

Primary heavy chain protein sequence

| Clone Name | No of HCs | No of LCs | HC type | Integrity | Signal peptide SEQ ID NO: 16 | VH SEQ ID NO: 17 | Constant SEQ ID NO: 18 | TPM | % |
|---|---|---|---|---|---|---|---|---|---|
| | | | | | | YWGQGTS VTVSS | FPPKPKDVL TITLTPKVTC VVVDISKDD PEVQFSWFV DDVEVHTA QTQPREEQF NSTFRSVSEL PIMHQDWLN GKEFKCRVN SAAFPAPIEK TISKTKGRPK APQVYTIPPP KEQMAKDK VSLTCMITD FFPEDITVEW QWNGQPAE NYKNTQPIM DTDGSYFIYS KLNVQKSN WEAGNTFTC SVLHEGLHN HHTEKSLSH SPGK | | |

TABLE 4

Sequence data: Protein VL

Primary light chain protein sequence

| Clone Name | No of HCs | No of LCs | LC type | Integrity | Signal peptide SEQ ID NO: 19 | VL SEQ ID NO: 20 | Constant SEQ ID NO: 21 | TPM | % |
|---|---|---|---|---|---|---|---|---|---|
| CRC4_1 | 1 | 1 | Mouse kappa | Complete | MRCLA EFLGL LVLWI PGAIG | DIVMTQGASS VTVTPGESVSI SCRSSKSLLHS NGRTFLYWFL QRPGQSPQLLI YRMSNLASGV PDRVSGSGSG TAFTLRISRVE AEDVGVYYC MQHLEYPFTF GGGTRLELK | RADAAPTVSIF PPSSEQLTSGG ASVVCFLNNFY PKDINVKWKID GSERQNGVLNS WTDQDSKDST YSMSSTLTLTK DEYERHNSYTC EATHKTSTSPIV KSFNRNEC | 250658.8 | 54.2 |

TABLE 5

Sequence data: DNA VH

Primary heavy chain DNA sequence

| Clone Name | No of HCs | No of LCs | HC type | Integrity | Signal Peptide SEQ ID NO: 22 | VH SEQ ID NO: 23 | Constant SEQ ID NO: 24 | TPM | % |
|---|---|---|---|---|---|---|---|---|---|
| CRC4_1 | 1 | 1 | Mouse IgG1 | Complete | ATGGA CAGGC TTACT TCCTC ATTCC TGCTG | CAGGTTAC TCTGAAA GAGTCTG GCCCTGG GATATTGC AGCCCTCC | GCCAAAACGACACC CCCATCTGTCTATCC ACTGGCCCCTGGAT CTGCTGCCCAAACT AACTCCATGGTGAC CCTGGGATGCCTGG | 211854.7 | 45.8 |

TABLE 5-continued

Sequence data: DNA VH

Primary heavy chain DNA sequence

| Clone Name | No of HCs | No of LCs | HC type | Integrity | Signal Peptide SEQ ID NO: 22 | VH SEQ ID NO: 23 | Constant SEQ ID NO: 24 | TPM | % |
|---|---|---|---|---|---|---|---|---|---|
| | | | | | CTGAT TGTCC CTGCA TATGT CCTGT CC | CAGACCCT CAGTCTGA CTTGTTCT TTCTCTGG GTTTTCAC TGAGCACT TCTGGTAT GGGTGTG AACTGGA TTCGTAAG CCTTCAGG AAAGGGT CTGGAGT GGCTGGC ACACATTT TCTGGGAT GATGACA AGCGCTAT AACCCATC CCTGAAG AGCCGGC TCACAATC TCCAAGG ATACCTCC AGGAACC AGGTATTC CTCATGAT CACCAGT GTGGATA CTGCAGAT ACTGCCAC ATACTACT GTGCTTCC TTGGCTAT GGACTACT GGGGTCA AGGAACC TCAGTCAC CGTCTCCT CA | TCAAGGGCTATTTC CCTGAGCCAGTGAC AGTGACCTGGAACT CTGGATCCCTGTCC AGCGGTGTGCACAC CTTCCCAGCTGTCCT GCAGTCTGACCTCT ACACTCTGAGCAGC TCAGTGACTGTCCC CTCCAGCACCTGGC CCAGCGAGACCGTC ACCTGCAACGTTGC CCACCCGGCCAGCA GCACCAAGGTGGAC AAGAAAATTGTGCC CAGGGATTGTGGTT GTAAGCCTTGCATA TGTACAGTCCCAGA AGTATCATCTGTCTT CATCTTCCCCCCAA AGCCCAAGGATGTG CTCACCATTACTCTG ACTCCTAAGGTCAC GTGTGTTGTGGTAG ACATCAGCAAGGAT GATCCCGAGGTCCA GTTCAGCTGGTTTGT AGATGATGTGGAGG TGCACACAGCTCAG ACGCAACCCCGGGA GGAGCAGTTCAACA GCACTTTCCGCTCA GTCAGTGAACTTCC CATCATGCACCAGG ACTGGCTCAATGGC AAGGAGTTCAAATG CAGGGTCAACAGTG CAGCTTTCCCTGCCC CCATCGAGAAAACC ATCTCCAAAACCAA AGGCAGACCGAAGG CTCCACAGGTGTAC ACCATTCCACCTCC CAAGGAGCAGATGG CCAAGGATAAAGTC AGTCTGACCTGCAT GATAACAGACTTCT TCCCTGAAGACATT ACTGTGGAGTGGCA GTGGAATGGGCAGC CAGCGGAGAACTAC AAGAACACTCAGCC CATCATGGACACAG ATGGCTCTTACTTCA TCTACAGCAAGCTC AATGTGCAGAAGAG CAACTGGGAGGCAG GAAATACTTTCACC TGCTCTGTGTTACAT GAGGGCCTGCACAA CCACCATACTGAGA AGAGCCTCTCCCAC TCTCCTGGTAAA | | |

TABLE 6

Sequence data: DNA VL

Primary light chain DNA sequence

| Clone Name | No of HCs | No of LCs | LC type | Integrity | Signal peptide SEQ ID NO: 25 | VL SEQ ID NO: 26 | Constant SEQ ID NO: 27 | TPM | % |
|---|---|---|---|---|---|---|---|---|---|
| CRC4_1 | 1 | 1 | Mouse kappa | Complete | ATGAGGTGCCTAGCTGAGTTCCTGGGGCTGCTTGTGCTCTGGATCCCTGGAGCCAAGCCATTGGG | GATATTGTGATGACTCAGGGTGCATCCTCTGTAACTGTCACTCCTGGAGAGTCAGTATCCATCTCCTGCAGGTCTAGTAAGAGTCTCCTGCATAGTAATGGCAGAACTTTCTTGTATTGGTTCCTGCAGAGGCCAGGCCAGTCTCCTCAGCTCCTGATATATCGGATGTCCAACCTTGCCTCAGGAGTCCCAGACAGGGTCAGTGGCAGTGGGTCAGGAACTGCTTTCACACTGAGAATCAGTAGAGTGGAGGCTGAGGATGTGGGTGTTTATTACTGTATGCAACATCTAGAATATCCTTTCACGTTCGGTGGTGGGACCAGGCTGGAGCTGAAA | CGGGCTGATGCTGCACCAACTGTATCCATCTTCCCACCATCCAGTGAGCAGTTAACATCTGGAGGTGCCTCAGTCGTGTGCTTCTTGAACAACTTCTACCCCAAAGACATCAATGTCAAGTGGAAGATTGATGGCAGTGAACGACAAAATGGCGTCCTGAACAGTTGGACTGATCAGGACAGCAAAGACAGCACCTACAGCATGAGCAGCACCCTCACGTTGACCAAGGACGAGTATGAACGACATAACAGCTATACCTGTGAGGCCACTCACAAGACATCAACTTCACCCATTGTCAAGAGCTTCAACAGGAATGAGTGT | 250658.8 | 54.2 |

TABLE 7

CDR identification

| Ab ID | | CRC4_1 |
|---|---|---|
| Scheme | | Kabat |
| Primary VH sequence | SEQ ID NO: (below) 17 | QVTLKESGPGILQPSQTLSLTCSFSGFSLSTSGMGVNWIRKPSGKGLEWLAHIFWDDDKRYNPSLKSRLTISKDTSRNQVFLMITSVDTADTATYYCASLAMDYWGQGTSVTVSS |
| CDR-H1 | 28 | TSGMGVN |
| CDR-H2 | 29 | HIFWDDDKRYNPSLKS |
| CDR-H3 | 30 | LAMDY |
| Primary VL sequence | 20 | DIVMTQGASSVTVTPGESVSISCRSSKSLLHSNGRTFLYWFLQRPGQSPQLLIYRMSNLASGVPDRVSGSGSGTAFTLRISRVEAEDVGVYYCMQHLEYPFTFGGGTRLELK |
| CDR-L1 | 31 | RSSKSLLHSNGRTFLY |
| CDR-L2 | 32 | RMSNLAS |
| CDR-L3 | 33 | MQHLEYPFT |

The foregoing is illustrative of the present invention, and is not to be construed as limiting thereof. The invention is defined by the following claims, with equivalents of the claims to be included therein.

---

SEQUENCE LISTING

Sequence total quantity: 35
SEQ ID NO: 1          moltype = AA  length = 24
FEATURE               Location/Qualifiers -continued

```
source                  1..24
                        mol_type = protein
                        organism = Danio rerio
SEQUENCE: 1
VMEHYDTFDK DNIRDITDSL INHC                                          24

SEQ ID NO: 2            moltype = AA  length = 24
FEATURE                 Location/Qualifiers
source                  1..24
                        mol_type = protein
                        organism = Oncorhynchus mykiss
SEQUENCE: 2
VSEHYESYDK DNIRDITDSL IDHC                                          24

SEQ ID NO: 3            moltype = AA  length = 24
FEATURE                 Location/Qualifiers
source                  1..24
                        mol_type = protein
                        organism = Pimephales promelas
SEQUENCE: 3
VSDHYDTFDK DNIRDITDSL IDHC                                          24

SEQ ID NO: 4            moltype = AA  length = 24
FEATURE                 Location/Qualifiers
source                  1..24
                        mol_type = protein
                        organism = Stenotomus chrysops
SEQUENCE: 4
VSEHYTTFDK DNIRDITDSL IDHC                                          24

SEQ ID NO: 5            moltype = AA  length = 24
FEATURE                 Location/Qualifiers
source                  1..24
                        mol_type = protein
                        organism = Fundulus heteroclitus
SEQUENCE: 5
VSEHYSTFDK DNIRDITDSL IDHC                                          24

SEQ ID NO: 6            moltype = AA  length = 24
FEATURE                 Location/Qualifiers
source                  1..24
                        mol_type = protein
                        organism = Rhincodon typus
SEQUENCE: 6
VTEHYHTFDK DNIRDITDSL IDHC                                          24

SEQ ID NO: 7            moltype = AA  length = 24
FEATURE                 Location/Qualifiers
source                  1..24
                        mol_type = protein
                        organism = Ictalurus punctatus
SEQUENCE: 7
VREHYDTYDK DNIRDITDSL IDHC                                          24

SEQ ID NO: 8            moltype = AA  length = 24
FEATURE                 Location/Qualifiers
source                  1..24
                        mol_type = protein
                        organism = Chelonia mydas
SEQUENCE: 8
VKEHYSSFDK DNIRDITDSL IEHC                                          24

SEQ ID NO: 9            moltype = AA  length = 24
FEATURE                 Location/Qualifiers
source                  1..24
                        mol_type = protein
                        organism = Gallus gallus
SEQUENCE: 9
VEEHYQTFDK NNIRDVTDSL IEQC                                          24

SEQ ID NO: 10           moltype = AA  length = 24
FEATURE                 Location/Qualifiers
source                  1..24
                        mol_type = protein
                        organism = Xenopus laevis
SEQUENCE: 10
TKEHYKTFDK NHIRDITDSL IQHC                                          24

SEQ ID NO: 11           moltype = AA  length = 24
```

| | | |
|---|---|---|
| FEATURE | Location/Qualifiers | |
| source | 1..24 | |
| | mol_type = protein | |
| | organism = Alligator mississippiensis | |
| SEQUENCE: 11 | | |
| VKEHYKTFDK SHIRDITDSL IEHC | | 24 |
| | | |
| SEQ ID NO: 12 | moltype = AA  length = 24 | |
| FEATURE | Location/Qualifiers | |
| source | 1..24 | |
| | mol_type = protein | |
| | organism = Mus musculus | |
| SEQUENCE: 12 | | |
| IKEHYRTFEK GHIRDITDSL IEHC | | 24 |
| | | |
| SEQ ID NO: 13 | moltype = AA  length = 24 | |
| FEATURE | Location/Qualifiers | |
| source | 1..24 | |
| | mol_type = protein | |
| | organism = Rattus norvegicus | |
| SEQUENCE: 13 | | |
| IKEHYRTFEK GHIRDITDSL IEHC | | 24 |
| | | |
| SEQ ID NO: 14 | moltype = AA  length = 24 | |
| FEATURE | Location/Qualifiers | |
| source | 1..24 | |
| | mol_type = protein | |
| | organism = Homo sapiens | |
| SEQUENCE: 14 | | |
| VKEHYKTFEK GHIRDITDSL IEHC | | 24 |
| | | |
| SEQ ID NO: 15 | moltype = AA  length = 9 | |
| FEATURE | Location/Qualifiers | |
| source | 1..9 | |
| | mol_type = protein | |
| | organism = synthetic construct | |
| SEQUENCE: 15 | | |
| IRDITDSLI | | 9 |
| | | |
| SEQ ID NO: 16 | moltype = AA  length = 19 | |
| FEATURE | Location/Qualifiers | |
| source | 1..19 | |
| | mol_type = protein | |
| | organism = synthetic construct | |
| SEQUENCE: 16 | | |
| MDRLTSSFLL LIVPAYVLS | | 19 |
| | | |
| SEQ ID NO: 17 | moltype = AA  length = 115 | |
| FEATURE | Location/Qualifiers | |
| source | 1..115 | |
| | mol_type = protein | |
| | organism = synthetic construct | |
| SEQUENCE: 17 | | |
| QVTLKESGPG ILQPSQTLSL TCSFSGFSLS TSGMGVNWIR KPSGKGLEWL AHIFWDDDKR | | 60 |
| YNPSLKSRLT ISKDTSRNQV FLMITSVDTA DTATYYCASL AMDYWGQGTS VTVSS | | 115 |
| | | |
| SEQ ID NO: 18 | moltype = AA  length = 324 | |
| FEATURE | Location/Qualifiers | |
| source | 1..324 | |
| | mol_type = protein | |
| | organism = synthetic construct | |
| SEQUENCE: 18 | | |
| AKTTPPSVYP LAPGSAAQTN SMVTLGCLVK GYFPEPVTVT WNSGSLSSGV HTFPAVLQSD | | 60 |
| LYTLSSSVTV PSSTWPSETV TCNVAHPASS TKVDKKIVPR DCGCKPCICT VPEVSSVFIF | | 120 |
| PPKPKDVLTI TLTPKVTCVV VDISKDDPEV QFSWFVDDVE VHTAQTQPRE EQFNSTFRSV | | 180 |
| SELPIMHQDW LNGKEFKCRV NSAAFPAPIE KTISKTKGRP KAPQVYTIPP PKEQMAKDKV | | 240 |
| SLTCMITDFF PEDITVEWQW NGQPAENYKN TQPIMDTDGS YFIYSKLNVQ KSNWEAGNTF | | 300 |
| TCSVLHEGLH NHHTEKSLSH SPGK | | 324 |
| | | |
| SEQ ID NO: 19 | moltype = AA  length = 20 | |
| FEATURE | Location/Qualifiers | |
| source | 1..20 | |
| | mol_type = protein | |
| | organism = synthetic construct | |
| SEQUENCE: 19 | | |
| MRCLAEFLGL LVLWIPGAIG | | 20 |
| | | |
| SEQ ID NO: 20 | moltype = AA  length = 112 | |
| FEATURE | Location/Qualifiers | |

```
                         source           1..112
                                          mol_type = protein
                                          organism = synthetic construct
SEQUENCE: 20
DIVMTQGASS VTVTPGESVS ISCRSSKSLL HSNGRTFLYW FLQRPGQSPQ LLIYRMSNLA    60
SGVPDRVSGS GSGTAFTLRI SRVEAEDVGV YYCMQHLEYP FTFGGGTRLE LK           112

SEQ ID NO: 21            moltype = AA   length = 107
FEATURE                  Location/Qualifiers
source                   1..107
                                          mol_type = protein
                                          organism = synthetic construct
SEQUENCE: 21
RADAAPTVSI FPPSSEQLTS GGASVVCFLN NFYPKDINVK WKIDGSERQN GVLNSWTDQD    60
SKDSTYSMSS TLTLTKDEYE RHNSYTCEAT HKTSTSPIVK SFNRNEC                 107

SEQ ID NO: 22            moltype = DNA   length = 57
FEATURE                  Location/Qualifiers
source                   1..57
                                          mol_type = other DNA
                                          organism = synthetic construct
SEQUENCE: 22
atggacaggc ttacttcctc attcctgctg ctgattgtcc ctgcatatgt cctgtcc       57

SEQ ID NO: 23            moltype = DNA   length = 345
FEATURE                  Location/Qualifiers
source                   1..345
                                          mol_type = other DNA
                                          organism = synthetic construct
SEQUENCE: 23
caggttactc tgaaagagtc tggccctggg atattgcagc cctcccagac cctcagtctg    60
acttgttctt ctctgggtt ttcactgagc acttctggta tgggtgtgaa ctggattcgt    120
aagccttcag gaaagggtct ggagtggctg gcacacattt tctgggatga tgacaagcgc   180
tataacccat ccctgaagag ccggctcaca atctccaagg atacctccag gaaccaggta   240
ttcctcatga tcaccagtgt ggatactgca gatactgcca catactactg tgcttccttg   300
gctatggact actggggtca aggaacctca gtcaccgtct cctca                  345

SEQ ID NO: 24            moltype = DNA   length = 1353
FEATURE                  Location/Qualifiers
source                   1..1353
                                          mol_type = other DNA
                                          organism = synthetic construct
SEQUENCE: 24
gccaaaacga cacccccatc tgtctatcca ctggccctg gatctgctgc ccaaactaac    60
tccatggtga ccctgggatg cctggtcaag ggctatttcc ctgagccagt gacagtgacc   120
tggaactctg gatccctgtc cagcggtgtg cacaccttcc cagctgtcct gcagtctgac   180
ctctacactc tgagcagctc agtgactgtc ccctccagca cctggcccag cgagaccgtc   240
acctgcaacg ttgcccaccc ggccagcagc accaaggtgg acaagaaaat tgtgcccagg   300
gattgtggtt gtaagccttg catatgtaca gtcccagaag tatcatctgt cttcatcttc   360
cccccaaagc caaggatgt gctcaccatt actctgactc ctaaggtcac gtgtgttgtg    420
gtagacatca gcaaggatga tcccgaggtc cagttcagct ggtttgtaga tgatgtggag   480
gtgcacacag ctcagacgca accccgggag gagcagttca acagcacttt ccgctcagtc   540
agtgaacttc ccatcatgca ccaggactgg ctcaatggca aggagttcaa atgcagggtc   600
aacagtgcag ctttccctgc ccccatcgag aaaaccatct ccaaaaccaa aggcagaccg   660
aaggctccac aggtgtacac cattccacct cccaaggagc agatggccaa ggataaagtc   720
agtctgacct gcatgataac agacttcttc cctgaagaca ttactgtgga gtggcagtgg   780
aatgggcagc cagcggagaa ctacaagaac actcagccca tcatggacac agatggctct   840
tacttcatct acagcaagct caatgtgcag aagagcaact gggaggcagg aaatactttc   900
acctgctctg tgttacatga gggcctgcac aaccaccatg ctgagaagag cctctcccca   960
tctcctggta atgcagggt caacagtgca gctttccctg ccccatcga gaaaaccatc    1020
tccaaaacca aaggcagacc gaaggctcca caggtgtaca ccattccacc tcccaaggag   1080
cagatggcca aggataaagt cagtctgacc tgcatgataa cagacttctt ccctgaagac   1140
attactgtgg agtggcagtg gaatgggcag ccagcggaga actacaagaa cactcagccc   1200
atcatggaca cagatggctc ttacttcatc tacagcaagc tcaatgtgca gaagagcaac   1260
tgggaggcag gaaatacttt cacctgctct gtgttacatg agggcctgca caaccaccat   1320
actgagaaga gcctctccca ctctcctggt aaa                              1353

SEQ ID NO: 25            moltype = DNA   length = 60
FEATURE                  Location/Qualifiers
source                   1..60
                                          mol_type = other DNA
                                          organism = synthetic construct
SEQUENCE: 25
atgaggtgcc tagctgagtt cctggggctg cttgtgctct ggatccctgg agccattggg   60

SEQ ID NO: 26            moltype = DNA   length = 336
FEATURE                  Location/Qualifiers
source                   1..336
                                          mol_type = other DNA
```

```
                         organism = synthetic construct
SEQUENCE: 26
gatattgtga tgactcaggg tgcatcctct gtaactgtca ctcctggaga gtcagtatcc    60
atctcctgca ggtctagtaa gagtctcctg catagtaatg cagaactttt cttgtattgg   120
ttcctgcaga ggccaggcca gtctcctcag ctcctgatat atcggatgtc caaccttgcc   180
tcaggagtcc cagacagggt cagtggcagt gggtcaggaa ctgctttcac actgagaatc   240
agtagagtgg aggctgagga tgtgggtgtt tattactgta tgcaacatct agaatatcct   300
ttcacgttcg gtggtgggac caggctggag ctgaaa                             336

SEQ ID NO: 27            moltype = DNA   length = 321
FEATURE                  Location/Qualifiers
source                   1..321
                         mol_type = other DNA
                         organism = synthetic construct
SEQUENCE: 27
cgggctgatg ctgcaccaac tgtatccatc ttcccaccat ccagtgagca gttaacatct    60
ggaggtgcct cagtcgtgtg cttcttgaac aacttctacc ccaaagacat caatgtcaag   120
tggaagattg atggcagtga acgacaaaat ggcgtcctga cagttggact tgatcaggac   180
agcaaagaca gcacctacag catgagcagc accctcacgt tgaccaagga cgagtatgaa   240
cgacataaca gctatacctg tgaggccact cacaagacat caacttcacc cattgtcaag   300
agcttcaaca ggaatgagtg t                                             321

SEQ ID NO: 28            moltype = AA   length = 7
FEATURE                  Location/Qualifiers
source                   1..7
                         mol_type = protein
                         organism = synthetic construct
SEQUENCE: 28
TSGMGVN                                                               7

SEQ ID NO: 29            moltype = AA   length = 16
FEATURE                  Location/Qualifiers
source                   1..16
                         mol_type = protein
                         organism = synthetic construct
SEQUENCE: 29
HIFWDDDKRY NPSLKS                                                    16

SEQ ID NO: 30            moltype = AA   length = 5
FEATURE                  Location/Qualifiers
source                   1..5
                         mol_type = protein
                         organism = synthetic construct
SEQUENCE: 30
LAMDY                                                                 5

SEQ ID NO: 31            moltype = AA   length = 16
FEATURE                  Location/Qualifiers
source                   1..16
                         mol_type = protein
                         organism = synthetic construct
SEQUENCE: 31
RSSKSLLHSN GRTFLY                                                    16

SEQ ID NO: 32            moltype = AA   length = 7
FEATURE                  Location/Qualifiers
source                   1..7
                         mol_type = protein
                         organism = synthetic construct
SEQUENCE: 32
RMSNLAS                                                               7

SEQ ID NO: 33            moltype = AA   length = 9
FEATURE                  Location/Qualifiers
source                   1..9
                         mol_type = protein
                         organism = synthetic construct
SEQUENCE: 33
MQHLEYPFT                                                             9

SEQ ID NO: 34            moltype = AA   length = 9
FEATURE                  Location/Qualifiers
source                   1..9
                         mol_type = protein
                         organism = synthetic construct
SEQUENCE: 34
IRIDITSLI                                                             9

SEQ ID NO: 35            moltype = AA   length = 8
```

```
FEATURE         Location/Qualifiers
source          1..8
                mol_type = protein
                organism = synthetic construct
SEQUENCE: 35
IRDITSLI                                                          8
```

What is claimed is:

1. A monoclonal antibody or an antigen binding fragment thereof that specifically binds cytochrome P450 1A1 (CYP1A1) protein conserved sequence SEQ ID NO: 15, SEQ ID NO:34 and/or SEQ ID NO:35, wherein the antibody or antigen binding fragment thereof comprises the CDR-H1, CDR-H2, CDR-H3, CDR-L1, CDR-L2, and CDR-L3 sequences of SEQ ID NO: 28-33, respectively.

2. The monoclonal antibody or antigen binding fragment thereof of claim 1, comprising a primary heavy chain and light chain variable sequence of SEQ ID NOs: 17 and 20.

3. The monoclonal antibody or antigen binding fragment thereof of claim 1, comprising a heavy chain and light chain constant sequence of SEQ ID NOs: 18 and 21.

4. The monoclonal antibody or antigen binding fragment thereof of claim 1, comprising a signal peptide comprising an amino acid selected from SEQ ID NOs: 16 and 19.

5. The monoclonal antibody or antigen binding fragment thereof of claim 2, wherein the primary heavy chain and light chain variable sequence is encoded by a nucleic acid sequence comprising a nucleic acid sequence selected from any one of SEQ ID NOs: 23 and 26.

6. The monoclonal antibody or antigen binding fragment thereof of claim 3, wherein the heavy chain and light chain constant sequence is encoded by a nucleic acid sequence comprising a nucleic acid sequence selected from any one of SEQ ID NOs: 24 and 27.

7. The monoclonal antibody or antigen binding fragment thereof of claim 4, wherein the signal peptide sequence is encoded by a nucleic acid sequence comprising a nucleic acid sequence selected from any one of SEQ ID NOs: 22 and 25.

8. The monoclonal antibody or antigen binding fragment thereof of claim 1, being humanized and/or chimeric.

9. An isolated nucleic acid molecule comprising a sequence encoding the monoclonal antibody or an antigen binding fragment thereof of claim 1.

10. A vector comprising the nucleic acid molecule of claim 9.

11. A host cell comprising the nucleic acid molecule of claim 9.

12. A composition comprising the monoclonal antibody or antigen binding fragment thereof of claim 1 and further a suitable carrier, diluent, or excipient.

13. A method of producing the monoclonal antibody or antigen binding fragment thereof of claim 1, the method comprising:
    cultivating the host cell of claim 12 thereby allowing the monoclonal antibody or antigen binding fragment thereof to be expressed;
    recovering the monoclonal antibody or antigen binding fragment thereof; and
    optionally purifying the monoclonal antibody or antigen binding fragment thereof.

14. A method of producing the monoclonal antibody or antigen binding fragment thereof of claim 1, the method comprising:
    (a) contacting a cell-free expression system with a nucleic acid product template, the nucleic acid product template encoding the monoclonal antibody or antigen binding fragment thereof according to claim 1;
    (b) allowing transcription and translation of the nucleic acid product template to occur, thereby allowing a reaction mixture to be formed;
    (c) recovering the monoclonal antibody or antigen binding fragment thereof from the reaction mixture; and
    (d) optionally purifying the monoclonal antibody or antigen binding fragment thereof.

15. A method of diagnosing a disease or disorder associated with activated CYP1A in a subject, the method comprising:
    (i) contacting a biological sample from the subject with the monoclonal antibody or antigen binding fragment thereof of claim 1 under conditions permissive for specific binding of the monoclonal antibody or antigen binding fragment thereof to CYP1A, and
    (ii) detecting whether a complex between the monoclonal antibody or antigen binding fragment thereof and CYP1A is formed;
    wherein detection of the complex indicates the presence of activated CYP1A in the subject.

16. A kit comprising the monoclonal antibody or antigen binding fragment thereof of claim 1 together with a packaged combination of reagents with instructions.

* * * * *